(12) United States Patent
Thirumalai et al.

(10) Patent No.: US 11,012,428 B1
(45) Date of Patent: May 18, 2021

(54) CLOUD MESSAGING SYSTEM

(71) Applicant: Apple Inc., Cupertino, CA (US)

(72) Inventors: Gokul Thirumalai, Santa Clara, CA (US); Ori Herrnstadt, Sunnyvale, CA (US); Roberto Garcia, Santa Clara, CA (US); Yannick Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 454 days.

(21) Appl. No.: 15/907,458

(22) Filed: Feb. 28, 2018

Related U.S. Application Data

(60) Provisional application No. 62/514,938, filed on Jun. 4, 2017, provisional application No. 62/466,325, filed on Mar. 2, 2017.

(51) Int. Cl.
| | |
|---|---|
| *H04L 29/06* | (2006.01) |
| *H04L 12/58* | (2006.01) |
| *H04L 9/32* | (2006.01) |
| *H04L 9/30* | (2006.01) |
| *H04L 9/14* | (2006.01) |
| *H04L 29/08* | (2006.01) |

(52) U.S. Cl.
CPC .......... *H04L 63/0478* (2013.01); *H04L 9/14* (2013.01); *H04L 9/30* (2013.01); *H04L 9/3273* (2013.01); *H04L 51/04* (2013.01); *H04L 67/1097* (2013.01)

(58) Field of Classification Search
CPC ....... H04L 9/0822; H04L 9/0833; H04L 9/14; H04L 9/30; H04L 9/32; H04L 2209/42; H04L 63/0428; H04L 63/0478; H04L 63/126; H04L 2463/062; H04L 67/1097; H04L 67/24; H04L 67/2842; H04L 67/2852; H04L 51/04

See application file for complete search history.

(56) References Cited

U.S. PATENT DOCUMENTS

| | | | |
|---|---|---|---|
| 5,751,813 A * | 5/1998 | Dorenbos | H04L 63/0442 380/270 |
| 6,295,361 B1 * | 9/2001 | Kadansky | H04L 29/06 380/273 |
| 8,117,464 B1 | 2/2012 | Kogelnik | |
| 9,086,819 B2 | 7/2015 | Panchbudhe et al. | |
| 9,129,095 B1 * | 9/2015 | Lam | H04L 63/061 |
| 9,225,691 B1 | 12/2015 | Balasubramanian et al. | |
| 9,590,958 B1 * | 3/2017 | Howell | H04L 9/3234 |

(Continued)

*Primary Examiner* — Eric W Shepperd
(74) *Attorney, Agent, or Firm* — Womble Bond Dickinson (US) LLP

(57) ABSTRACT

Data items such as files or database records associated with particular applications (such as messaging applications and other applications) can be stored in one or more remote locations, such as a cloud storage system, and synchronized with other devices. The remote storage can be configured such that each application executing on a client device can only view data items stored at the remote location to which the application has permission to access. An access manager on each client device enforces application specific access policies. Storage at the remote location can be secured for each application associated with a user or user account, for example, using isolated containers. The cloud storage of data can be anonymized and anonymous group data can be stored in the cloud storage.

20 Claims, 35 Drawing Sheets

(56) References Cited

U.S. PATENT DOCUMENTS

| | | | |
|---|---|---|---|
| 10,579,826 B2* | 3/2020 | Rhim | H04L 51/28 |
| 2005/0108435 A1* | 5/2005 | Nowacki | G06Q 10/107 |
| | | | 709/246 |
| 2008/0095337 A1* | 4/2008 | Cai | H04L 51/30 |
| | | | 379/88.22 |
| 2008/0123850 A1* | 5/2008 | Bhatnagar | H04L 63/0428 |
| | | | 380/259 |
| 2009/0147958 A1* | 6/2009 | Calcaterra | H04L 9/0833 |
| | | | 380/260 |
| 2011/0142230 A1* | 6/2011 | Zuili | H04L 9/3073 |
| | | | 380/28 |
| 2012/0297001 A1* | 11/2012 | Reistad | G06Q 30/0239 |
| | | | 709/206 |
| 2013/0198521 A1* | 8/2013 | Wu | H04L 9/0894 |
| | | | 713/175 |
| 2014/0201541 A1* | 7/2014 | Paul | G06F 21/6245 |
| | | | 713/193 |
| 2015/0350362 A1* | 12/2015 | Pollack | H04L 67/2833 |
| | | | 709/217 |
| 2015/0350854 A1* | 12/2015 | Pollack | H04L 45/22 |
| | | | 455/466 |
| 2016/0291891 A1 | 10/2016 | Cheriton | |
| 2017/0366478 A1* | 12/2017 | Mohammed | H04L 51/02 |
| 2019/0213356 A1* | 7/2019 | Vagujhelyi | G06F 21/6254 |

* cited by examiner

Generate seeds KG, KT, dg, dw　　　　　　　　　　　　　　800

Compute key KT

Compute key KG

Compute ephemeral key pair {dg,Pg}

Compute ephemeral key pair {dw,Pw}

ENID:1, Pg, Sign_dg(...)

Group privacy key material (UKM)　　　　　　　810
　PkEnc_dw_Pe_1(KT)
　PkEnc_dw_Pe_2(KT)
　PkEnc_dw_Pe_3(KT)

Privacy protected blob (PPB), encrypted with KT　　820
　− User list (Ui) − {U1, U2, U3}
　− Group Key creation (GKC) info
　Used to derive KT, KG, UKM_key_pair, dg
　− Conversation binding (CB)
　empty
　− Payload
　(Group name)
　− KG verifier: wrapSym_KG(**)
　− Sponsor Signature
　Sign_dsm_1(UKM || ADK || GKC || CB)

FIG. 8A

Group Change: 850
New Group + Forward

Generate seeds KG2, KT2, dg2, dw2

Compute key KT2

Compute key KG2

Compute ephemeral key pair {dg2, Pg2}

Compute ephemeral key pair {dw2, Pw2}

ENID:1, Pg2, Sign_dg2(...)

Group privacy key material (UKM) 860
PkEnc_dw2_Pe_1(KT2)
PkEnc_dw2_Pe_2(KT2)

Privacy protected blob (PPB), encrypted with KT2 870
– User list (Ui) – (U1, U2)
– Group Key creation (GKC) info
Used to derive KT2, KG2, UKM_key_pair, dg2
– Conversation binding (CB)
Pg, forward_ticket_signature
– Payload
Group name
– KG verifier: wrapSym_KG2(**)
– Sponsor Signature
Sign_dsm_2(UKM || ADK || GKC || CB)
– Link to previous
Sign_dg(ENID:1 || Pg || Pg2)

Pg, Sign_dg(...)

Forward 890
Pg2
Sign_dg(ENID:1 || Pg || Pg2)

FIG. 8B

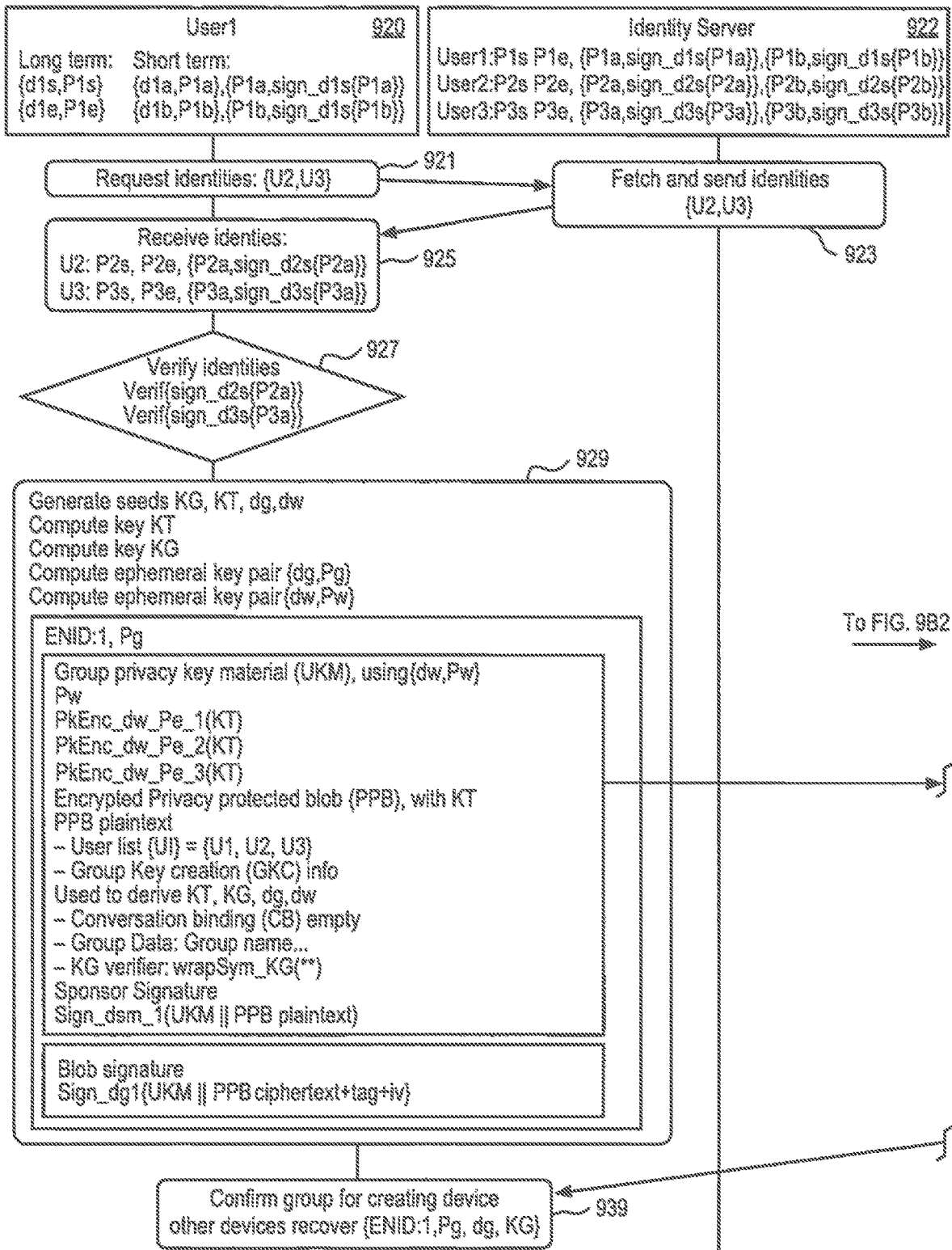
FIG. 9B1

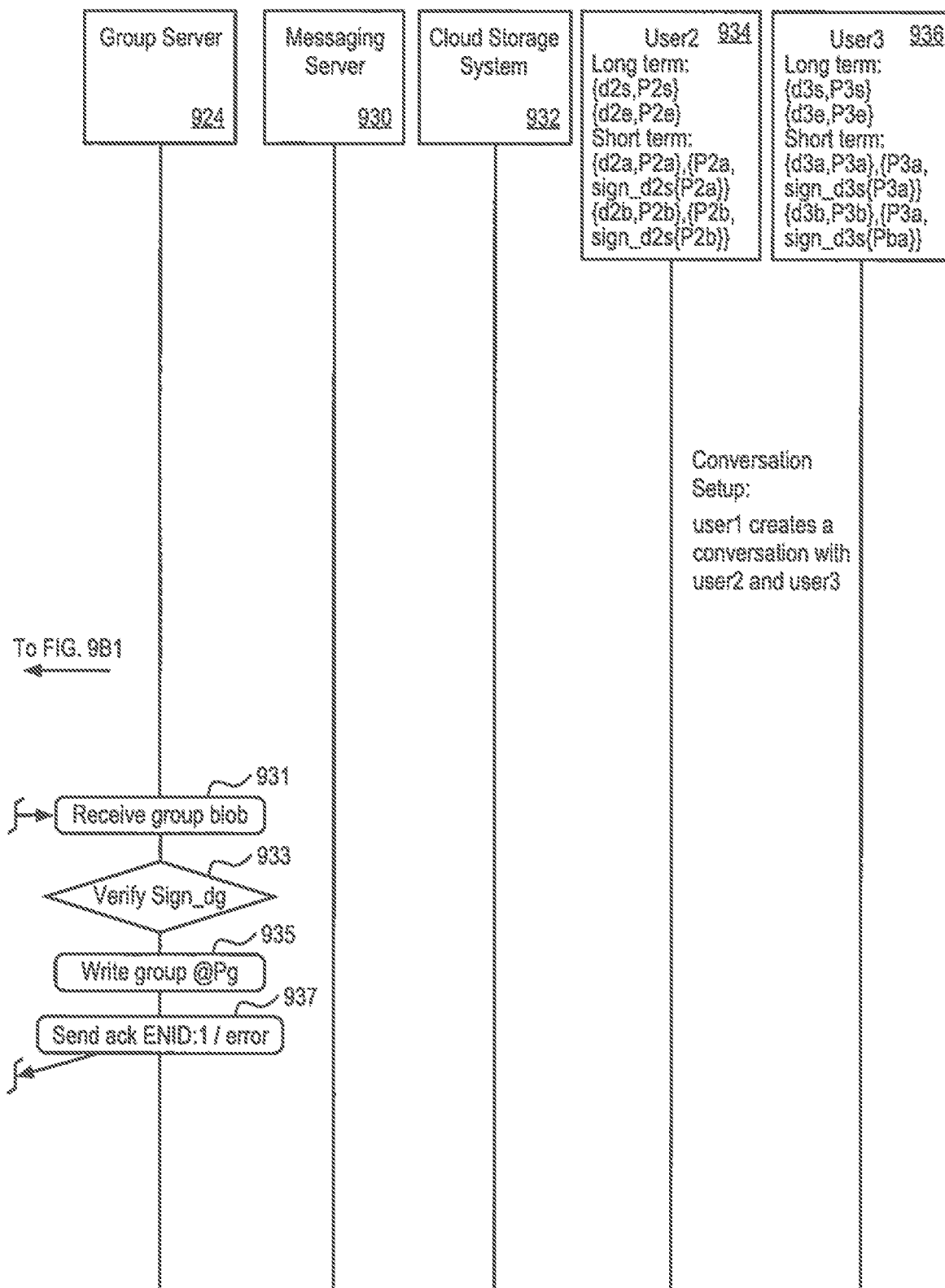
FIG. 9B2

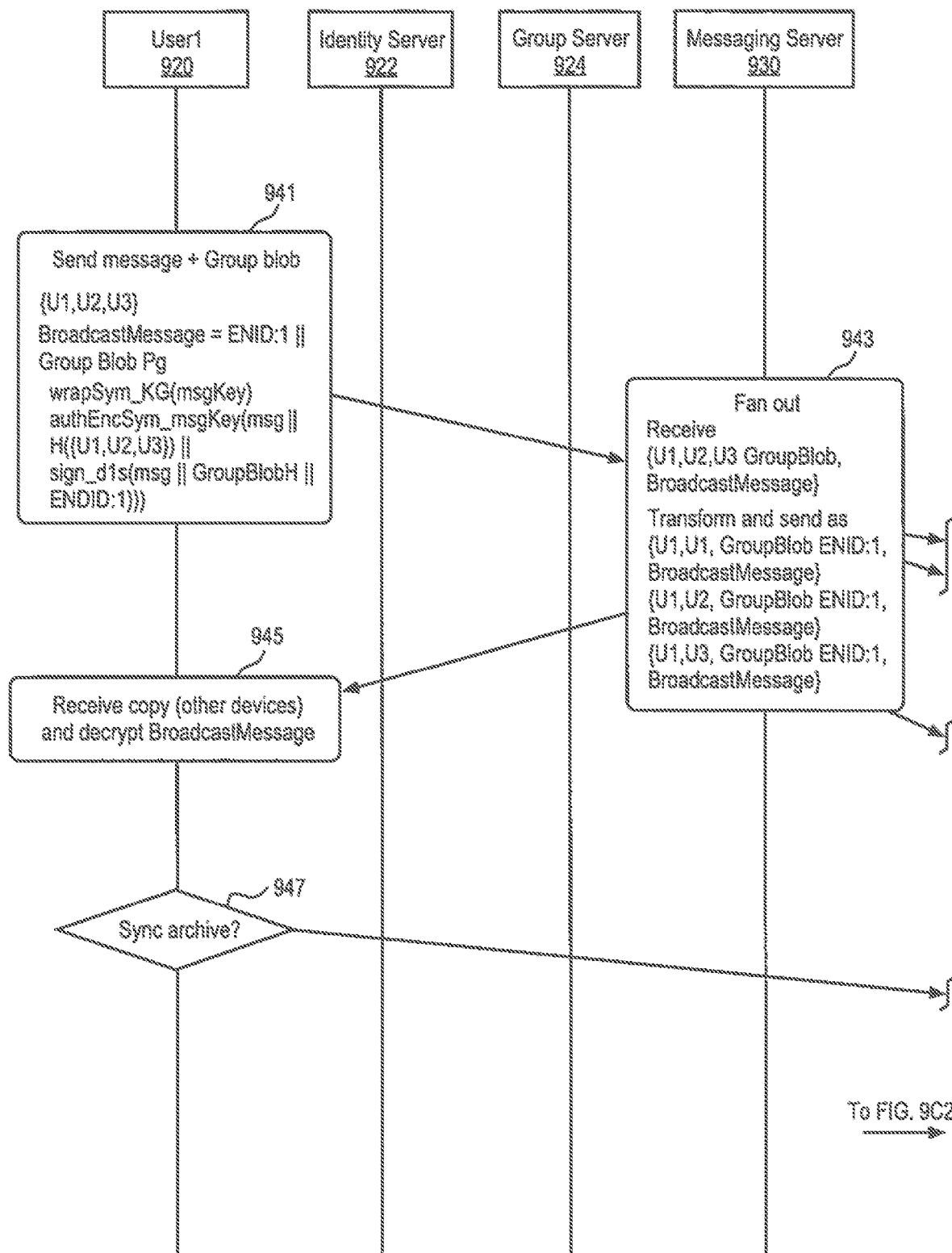
FIG. 9C1

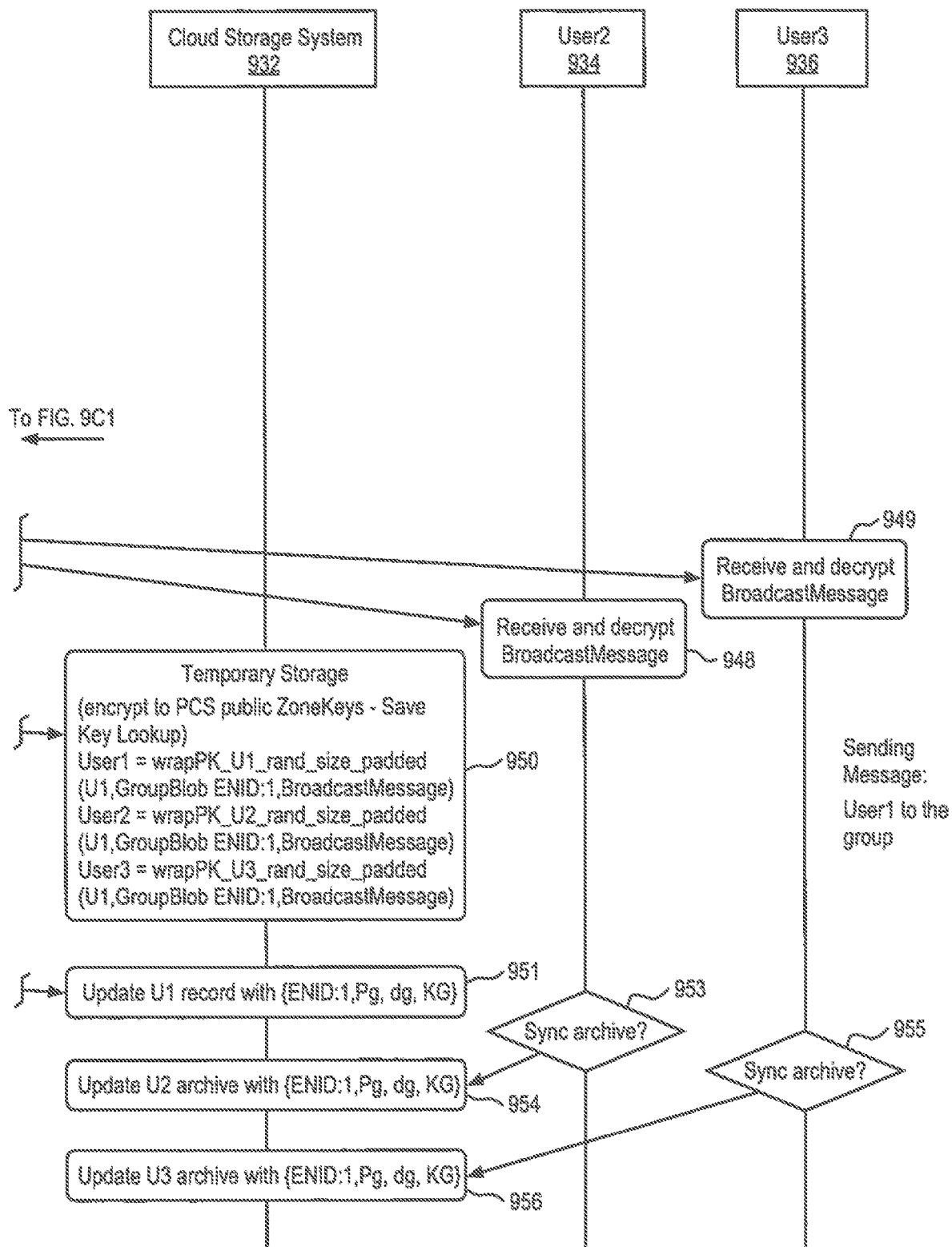
FIG. 9C2

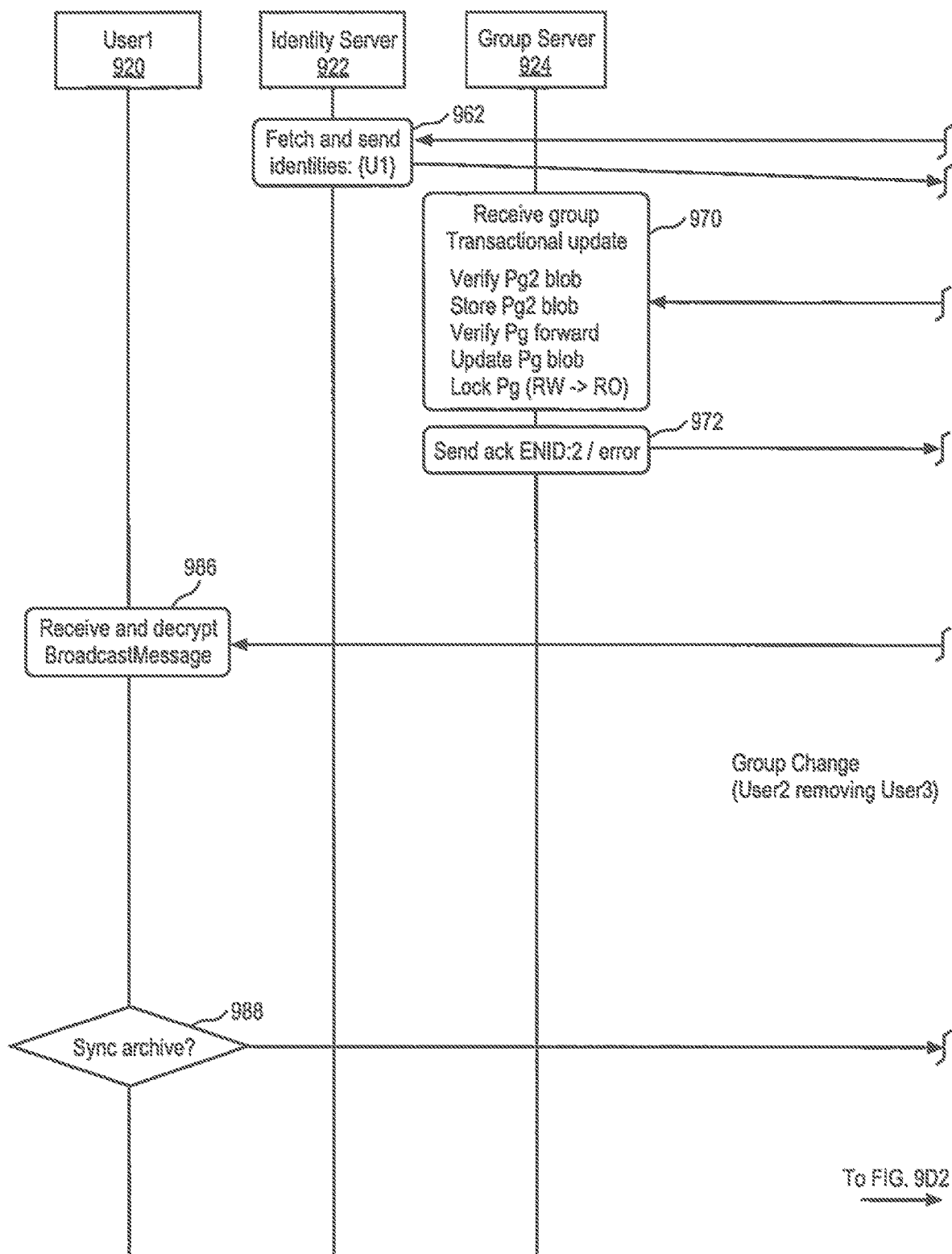
FIG. 9D1

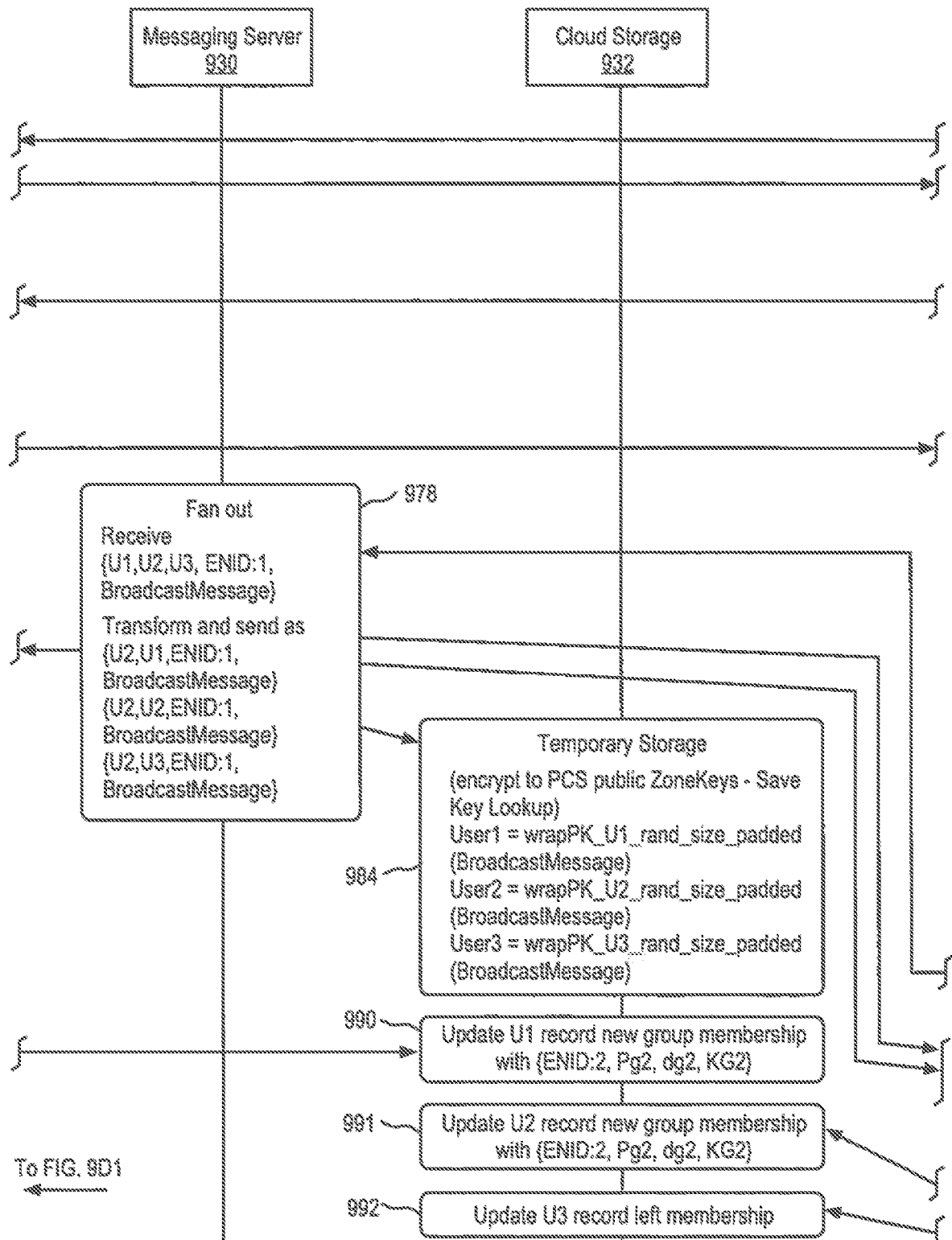
FIG. 9D2

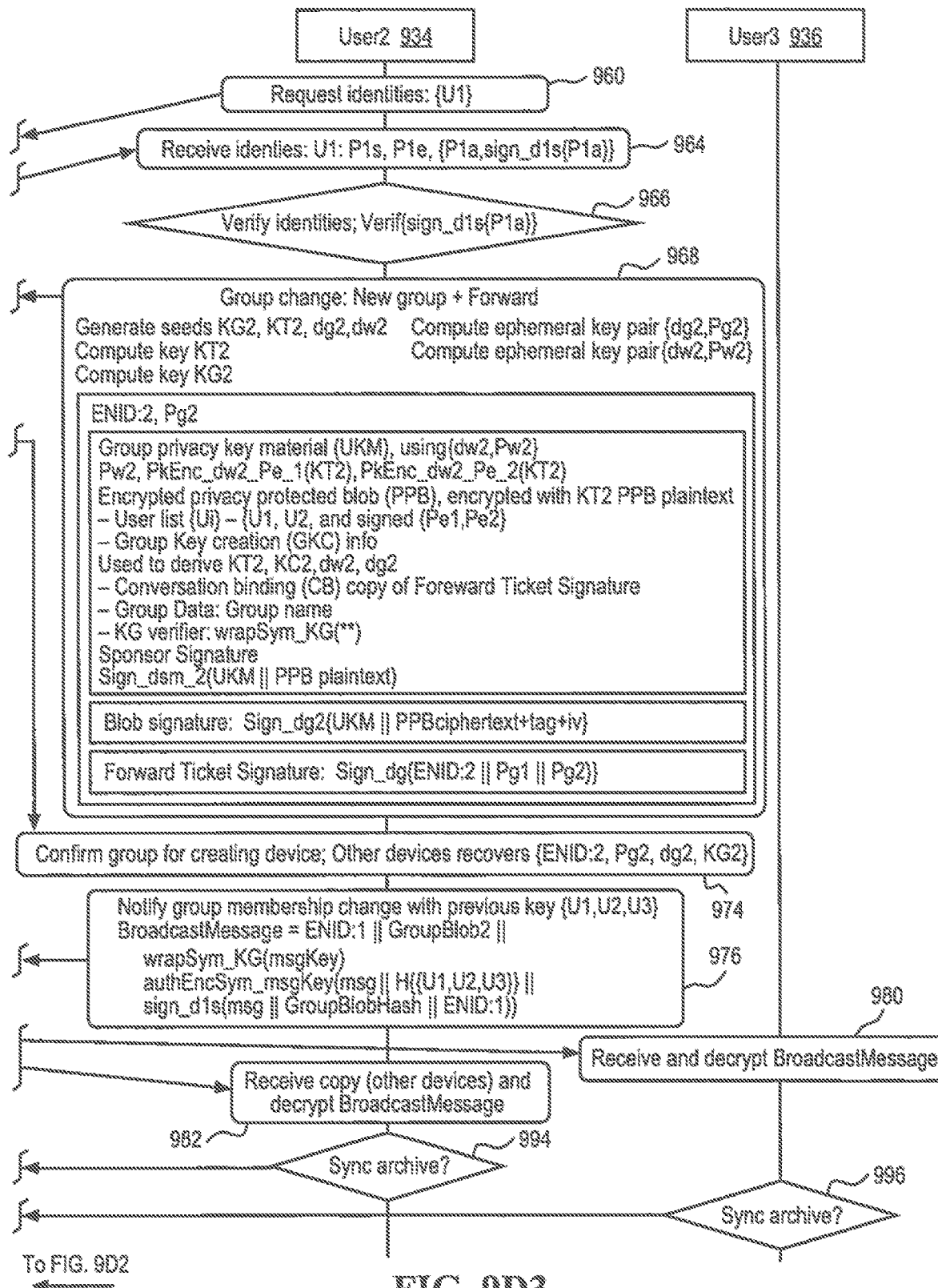
FIG. 9D3

CLOUD MESSAGING SYSTEM

This application claims the benefit of U.S. Provisional Application No. 62/514,938 filed on Jun. 4, 2017 entitled "Cloud Messaging System", and U.S. Provisional Application No. 62/466,325 filed on Mar. 2, 2017, entitled "Cloud Messaging System", both which are incorporated herein by reference.

BACKGROUND OF THE DISCLOSURE

Cloud storage is a model of data storage in which digital data is stored in logical pools and the physical storage underlying the logical pools can span multiple servers and/or locations. A cloud service provider can a provide access to the cloud storage system to remote client devices. The cloud service provider can host the physical environment of the cloud storage or contract a portion of the underlying storage from an enterprise cloud storage vendor. Users of a cloud storage system can store data within the cloud storage system and such data can be accessed from multiple devices. Additionally, applications can be configured to store configuration data within the cloud storage system. Cloud storage systems can be configured using any number of underlying storage systems. These storage systems can be encrypted using one of several types of encryption algorithms and techniques.

BRIEF DESCRIPTION OF THE DRAWINGS

The present invention is illustrated by way of example, and not limitation, in the figures of the accompanying drawings in which like references indicate similar elements, and in which:

FIG. 8A-B illustrate group blobs, according to an embodiment;

FIGS. 9B1, 9B2, 9C1, 9C2, 9D1, 9D2, and 9D3 show messaging within a cloud based messaging system with a group that begins as 3 users and transitions to a revised group with 2 of the 3 users.

DETAILED DESCRIPTION

Figure 1:
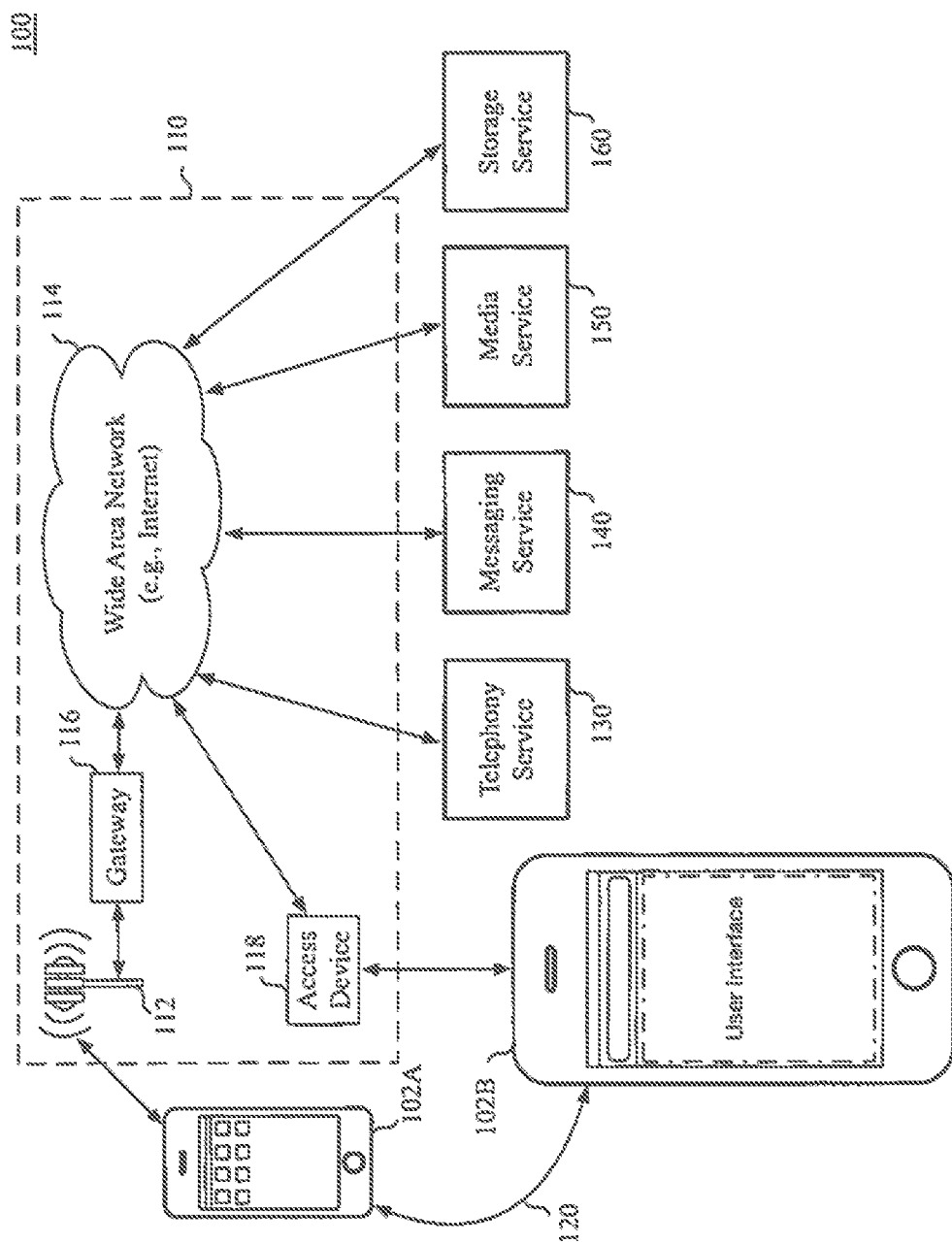
FIG. 1 is a block diagram of an exemplary network operating environment for mobile devices.

Various embodiments and aspects of secure cloud storage will be described with reference to details discussed below; the accompanying drawings will illustrate the various embodiments. It is to be noted that the following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Data items such as files or database records associated with particular applications can be stored in one or more remote locations, such as a cloud storage system, and synchronized with other devices. The remote storage can be configured such that each application executing on a client device can only view data items stored at the remote location to which the application has permission to access. An access manager on each client device enforces application specific access policies. Storage at the remote location can be secured for each application associated with a user or user account, for example, using isolated containers.

In embodiments described herein, a remote storage location is provided that has security and privacy features that are sufficient for use in facilitating secure encrypted messaging between multiple users or user accounts, where each of the multiple users or user accounts can be associated with multiple client devices. The client devices can be authenticated and associated with a user account. Messaging (e.g., e-mail messaging, text messaging, instant messaging, etc.) between client devices can be facilitated using remote storage that is associated with the respective user accounts of the client devices. Data (e.g., text content or other content of the messages), metadata, attachments, and other information associated with the messages can be encrypted to maintain the privacy and security of the communicating participants. Such information can also be integrity protected to ensure that the message contents are authentic and have not been accidentally or maliciously altered during transit or storage. Various privacy and integrity protection techniques can be employed by the various embodiments and exemplary but non-limiting encryption techniques will be described. Additionally, details as to various techniques are described to prevent leakage of private and/or secure user information. User privacy and security can be protected not only from third parties, but also from the cloud storage provider and any storage vendors associated with the cloud storage provider.

In the figures and description to follow, reference numbers are often indicative of the figure in which the referenced element is introduced, such that an element having a reference number of N00 is first introduced in FIG. N. For example, an element having a reference number between 100 and 199 may be first shown in FIG. 1, while an element having a reference number between 200 and 299 may be first shown in FIG. 2, etc. Within a description of a given figure, previously introduced elements may or may not be referenced.

Network-Based Services for a Client Device

FIG. 1 is a block diagram of an exemplary network operating environment 100 for mobile devices. Mobile device 102A and mobile device 102B can establish a communication link 120 over one or more wired and/or wireless networks 110 to perform data communication. For example, a wireless network 112, e.g., a cellular network, can communicate with a wide area network (WAN) 114, such as the Internet, by use of a gateway 116. Likewise, an access device 118, such as a mobile hotspot wireless access device (e.g., using WiFi), can provide communication access to the wide area network 114.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over one or more of the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables and the access device 118 can be a personal computer. In this configuration, mobile device 102A or mobile device 102B can be referred to as a "tethered" device.

Mobile device 102A or mobile device 102B can communicate with one or more networked and/or cloud-based services, such as a telephony service 130, a messaging service 140, a media service 150, and a storage service 160 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail, text messaging and/or other messaging services. The media service 150 can, for example, provide access to media files, such as song files, audio books, movie files, video clips, and other media data. A storage service 160 can provide network storage capabilities to mobile device 102A and mobile device 102B to store documents and media files. Other services can also be provided, including a software update service to update operating system software or client software on the mobile devices. In one embodiment the storage service 160 is a cloud-based service that can provide temporary or long-term storage to the messaging service 140 and/or the media service 150.

Mobile device 102A or 102B can also access other data and content over the one or more wired and/or wireless networks 110. For example, content publishers, such as news sites, RSS feeds, web sites, blogs, social networking sites, developer networks, etc., can be accessed via a web browser as described herein. Mobile device 102A and/or mobile device 102B can execute browser software to access web sites provided by servers accessible via the wide area network 114.

It will be apparent from this description that aspects and embodiments of the present invention may be implemented at least in part via software that is configured to execute on a data processing system. That is, the techniques may be carried by the data processing system in response to execution of a sequence of instructions on one or more processors of the data processing system. The instructions can be contained in a storage medium such as a tangible and non-transitory machine-readable storage medium such as volatile DRAM or non-volatile flash memory. In various embodiments, hardwired circuitry may be used in combination with software instructions to implement the various embodiments. In some embodiments firmware logic can be configured to implement a portion of the techniques described herein. Thus the techniques are not limited to any specific combination of hardware circuitry, firmware, and software or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices (e.g., smart watch devices).

Figure 2:
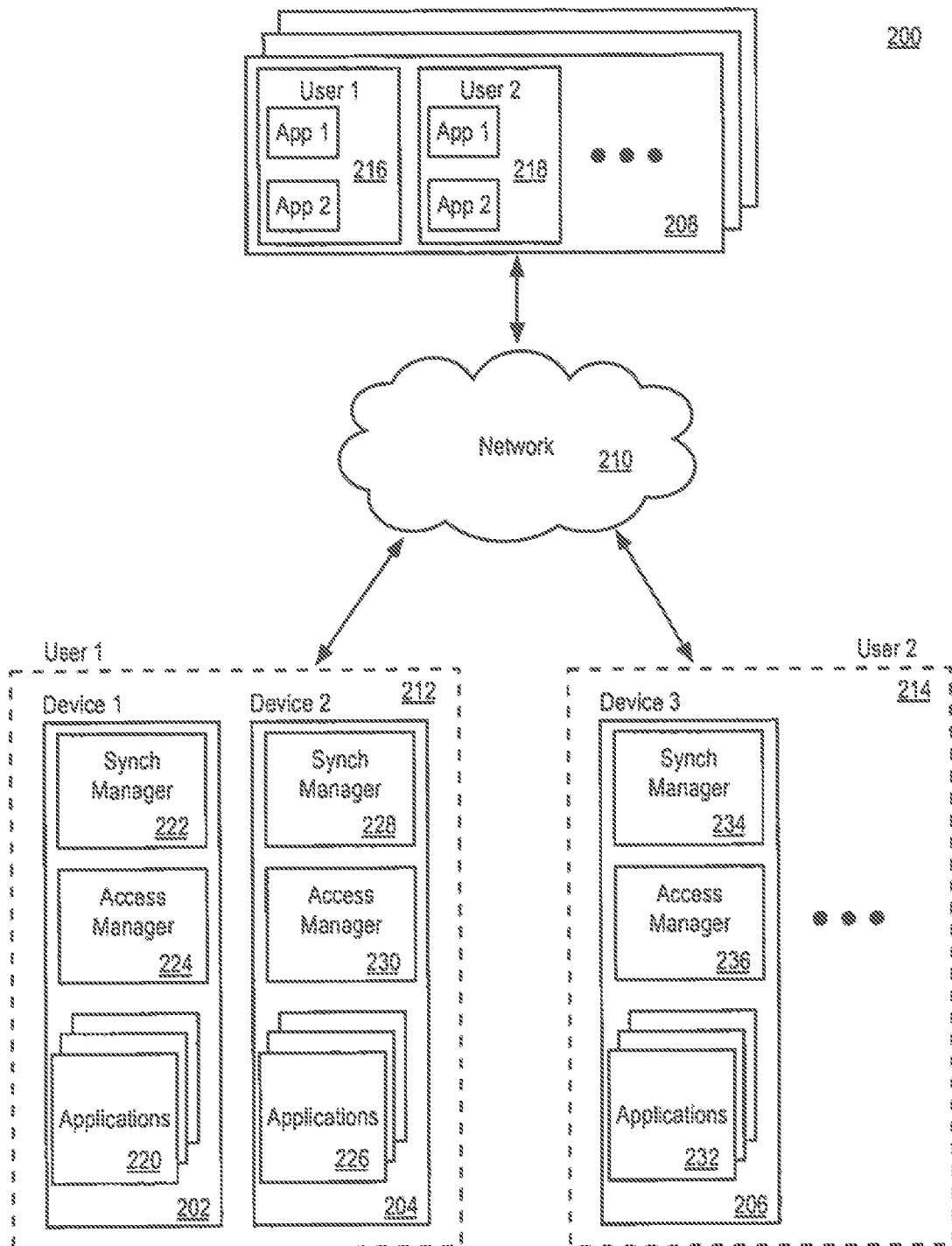
FIG. 2 is a diagram illustrating system for securely storing data items, according to an embodiment.

FIG. 2 is a diagram illustrating a system 200 for securely storing data items, according to an embodiment. The system 200 includes a first device 202, a second device 204, a third device 206, and a remote storage location 208.

The first device 202, second device 204, third device 206, and remote storage location 208 are communicatively coupled together using one or more networks 210. The one or more networks 210 can include both wired and wireless networks. The network 210 can be, for example, part of a local area network, wide area network, or the Internet.

The first device 202, the second device 204, and the third device 206 can include, for example, desktop or laptop computing devices, mobile devices, tablet devices, personal data assistants, wearable devices, or other computing devices. In particular, each of the first device 202 and the second device 204 can be associated with a first user or user account 212. Similarly, the third device 206, and one or more other devices not shown can be associated with a second user or user account 214. The remote storage location 208 can additionally be coupled to many other devices, not shown, that are associated with one or more different users or different user accounts.

In one embodiment the devices can be associated with the respective users or user accounts by forming an association between a unique or quasi-unique device key or device identifier for each device with a unique or quasi-unique account key or account identifier for each account. For example a key or device identifier for the first device 202 and second device 204 can be associated with a key or account identifier for user or user account 212. A key or device identifier for the third device 206 can be associated with a key or user account identifier for user or user account 214. Such association can be used to enable authenticated access to account-based storage on the remote storage location 208.

The remote storage location 208 can be a single storage location or multiple storage locations. For example, a server, a network addressed storage location, a collection of computing devices, or as part of a cloud storage system presenting virtualized network storage.

The remote storage location 208 includes separate logical containers for storing data from different users/user accounts and application combinations. In some examples, a logical container could be a directory in a file system, a data structure, a database, or another kind of data organizational unit. For example, the first user or user account 212 can have containers 216 on the remote storage location 208, one for each individual application associated with the user or user account. Similarly the second user or user account 214 can have containers 218 for respective applications. Application data items received from individual devices (e.g., the first device 202) are stored in respective containers for that application. The remote storage location 208 can include a storage manager that can create and manage containers as well as generate notifications for devices.

The first device 202 includes one or more applications 220, a synchronization manager 222, and an access manager 224. The one or more applications 220 can include various types of applications such as productivity applications, system applications, games, etc. Each application can be associated with a unique key or other identifier that can be used to identify the application and to identify particular access permissions of that application. In some implementations, one or more application 220 is sandboxed such that it is isolated from each other application.

The synchronization manager 222 manages sending data items to the remote storage location 208 and receiving information (e.g., data items or notifications) from the remote storage location 208, as will be described in greater detail below. The access manager 224 presents available data items to particular applications of the applications 220 in response to a query from the respective applications. The access manager 224 applies one or more access policies to determine what data items will be visible to a particular application of the applications 220.

The second device 204 similarly includes one or more applications 226, a synchronization manager 228, and an access manager 230. The applications 220 and application 226 can include one or more of the same applications. The third device 206 similarly includes one or more applications 232, a synchronization manager 234, and an access manager 236.

Cloud Storage Container Details

Figure 3A:
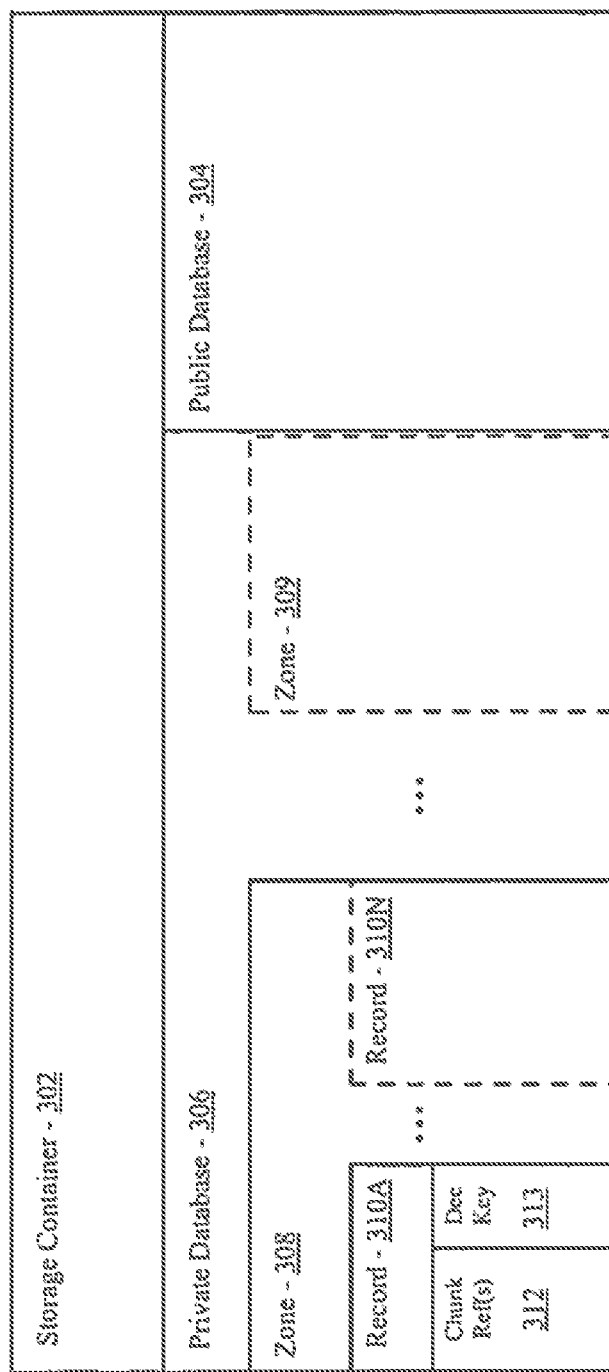
FIGS. 3A-3B illustrate details of a storage container, according to an embodiment.
Figure 3B:
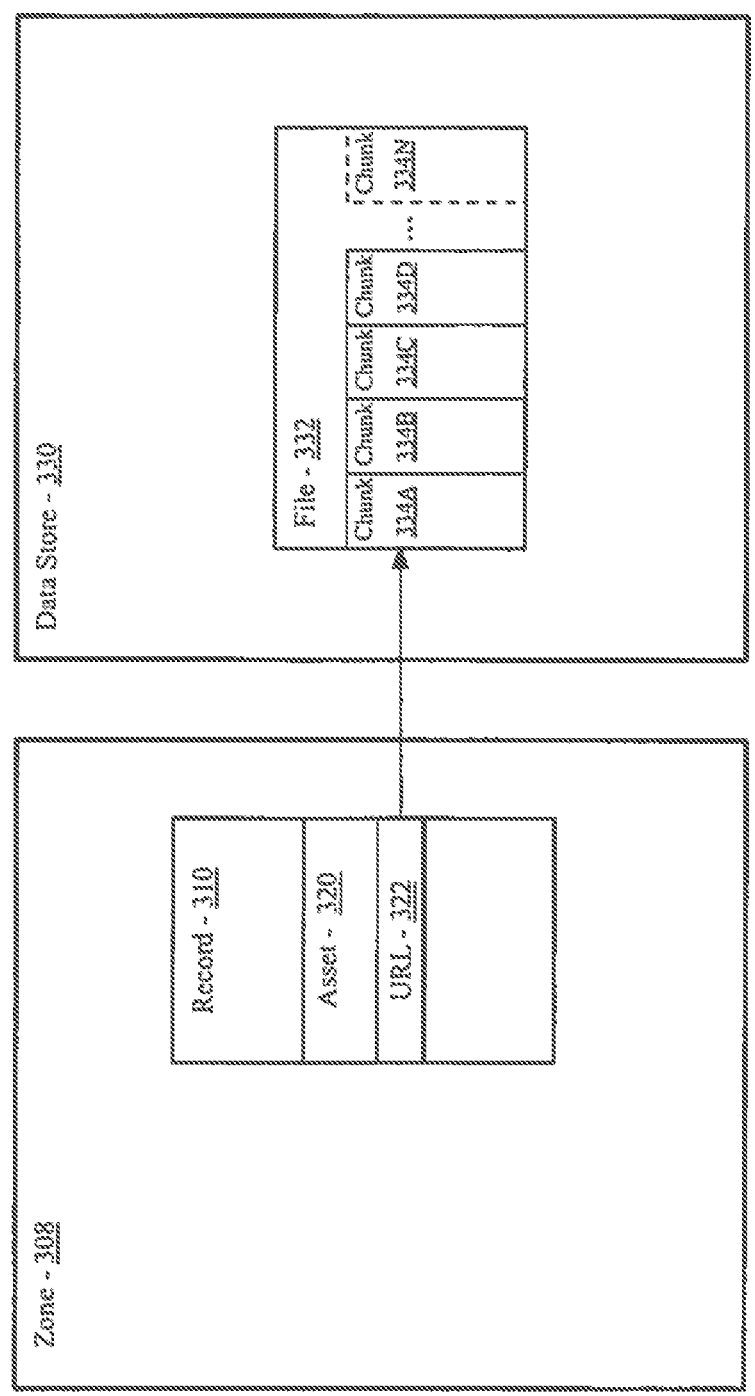

FIGS. 3A-3B illustrate details of a storage container 302, according to an embodiment. As shown in FIG. 3A, the storage container 302 can be, for example, one of containers 216 or containers 218 on the remote storage location 208 of FIG. 2. The storage container 302 can be an application specific container that is associated with an application, such as, for example, a messaging application that is used to establish an online communication session between multiple client devices. At least a portion of the storage container 302 can also be account specific and contain configuration and/or identity data and metadata for the account to which the storage container 302 is associated.

In some embodiments the storage container 302 includes a public database 304 and a private database 306, which are storage locations for public and private data respectively. Data written to the public database 304 can be visible to all users of the application to which the storage container 302 is associated. Such data can be read without requiring user-specific authentication. Data written to the private database 306 is visible only to the user to which the private database 306 is associated. Such data can be stored within a remote or cloud storage location that is specific to a user account and cannot be accessed unless the user is signed into the user account.

Data in the private database 306 can be divided into one of multiple zones (e.g., zone 308, zone 309). Each zone can be associated with a set of asymmetric encryption keys. The encryption keys can be different for each zone, such that access to each zone can be separately managed. For example and in one embodiment, an Elliptic Curve Integrated Encryption Scheme (ECIES) is used in which each zone has an associated EC key pair. However, various asymmetric encryption techniques can be used to encrypt the zones and the encryption used for the zones is not limited to any particular encryption algorithm or technique.

Each zone can include multiple records. For example, zone 308 can include multiple records 310A-310N. In one embodiment each record 310A-310N can store a set of fields, where each field can contain various types of data, such as strings, numbers, dates, locations, references, or files). Each record stores references to chunks (chunk ref(s) 312) that make up the record, as well as a decryption key (dec key 313) that is used to decrypt the encrypted chunk data. The specific number of chunks used for each record can vary. Zone 309 can store records in a manner similar to zone 308.

FIG. 3B illustrates exemplary record and file storage within a zone. As illustrated, zone 308 can include a record 310, which can be any one of records 310A-310N. The record 310 can include a field that defines an asset 320, which can be a binary file associated with the record. For example, the asset 320 can reference an image or photo that is stored in a cloud-based photo library or a word processing document of a cloud-based word processing application. The asset 320 can also be file that is sent as a message attachment via a messaging system. The field within the record 310 that defines the asset 320 can include a uniform resource locator (e.g., URL 322) or another type of resource locator that identifies the location of a file 332 that contains the underlying data of the asset. The file 332 is stored in a data store 330, which in one embodiment can be a third party storage vendor that provides a backing store for the cloud service provider. The file 332 can be stored as a series of multiple chunks (e.g., chunk 334A, chunk 334B, chunk 334C, chunk 334D, through chunk 334N) that contain the data of the file 332.

Deduplication of Remotely Stored Data while Maintaining User Privacy

A cloud storage provider or other remote storage provider can enable deduplicated storage to enhance the storage efficiency of stored data. Deduplication increases the storage efficiency for a given set of data by only storing a single instance of a given block of data. In the storage system described herein, chunk level deduplication can be enabled such that for a given set of duplicate chunks, only a single instance of the chunk is stored.

However, in a system in which deduplication is performed on a storage volume containing data for multiple user accounts, the deduplication metadata that is gathered during the deduplication process can be leak private user information. For example, if an adversary were to gain access to a deduplicated storage volume containing data for multiple users, the contents of encrypted file data will not be readily accessible to the adversary. However, it may be possible for the adversary to determine which users store common data due to the deduplication metadata associated with the compromised storage volume.

Embodiments described herein enable deduplication of remotely stored data while maintaining user privacy via the use of boundary encryption keys. A deduplication boundary can be defined for private user data and an encryption key can be associated with the boundary. Each boundary can have a different encryption key and the data within a boundary can be encrypted using encryption keys derived from the boundary key. Using this technique duplicate plaintext for stored data will result in duplicate ciphertext only within the same boundary. Duplicate data that is stored in different boundaries will result in differing ciphertext and will not be deduplicated by the deduplication system.

The specific details of boundary-based deduplication as described herein can vary across embodiments. Differing embodiments can enable differing levels of security and privacy based on the selected encryption and deduplication techniques applied on the remote storage system.

Figure 4:
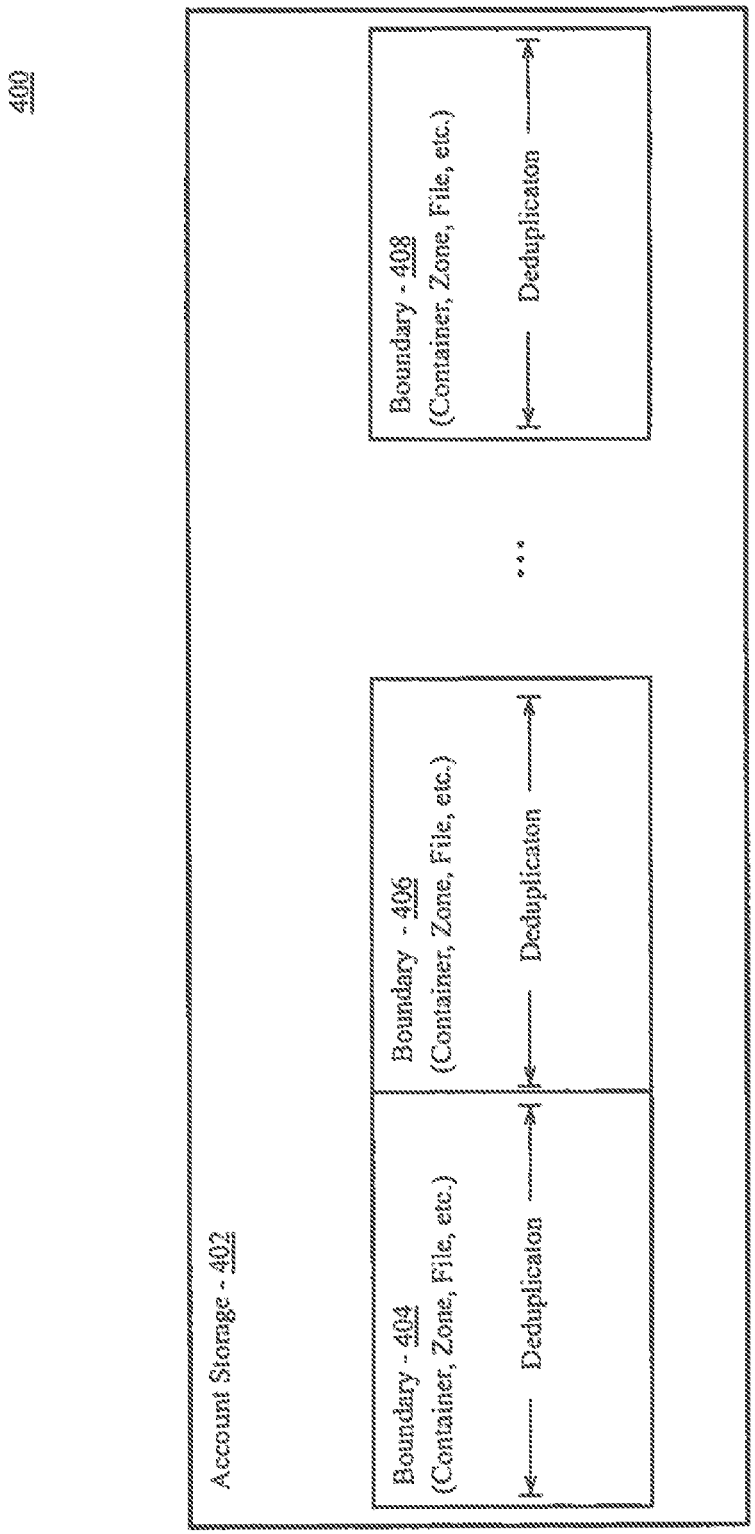
FIG. 4 is a block diagram illustrating boundary deduplication of a storage system, according to an embodiment.

FIG. 4 is a block diagram illustrating boundary deduplication of a storage system 400, according to an embodiment. In one embodiment the storage system 400 can include account storage 402, which can be any user-private storage associated with a remote storage system and the entire account storage 402 of a user can be treated as a single boundary in one embodiment. The account storage 402 can be divided in another embodiment into multiple boundaries including but not limited to a first boundary 404, a second boundary 406, and a third boundary 408. The account storage 402 can be for a single user's cloud storage account in which the user can store content from or used by multiple devices of the single user (such as a smartphone, a tablet computer and a desktop computer used by the single user). Each boundary can be defined at differing storage unit granularities such as, but not limited to the storage unit granularities illustrated in FIGS. 3A-3B. For example, the first boundary 404 can be defined at the container level (e.g., storage container 302) to allow deduplication to be performed for data within the container. The second boundary 406 can be defined at the zone level (e.g., zone 308, zone 309) to allow deduplication to be limited to duplicate data within the zone. The third boundary 408 can be defined at the file level (e.g., file 332), such that only duplicate data within a file will be deduplicated. A boundary can also be defined at other storage granularities. For example, a boundary can be defined such that a duplicate data within a record (e.g., record 310) and any files or data associated the record (e.g., file 332) will be deduplicated. In one embodiment, deduplication can be employed across multiple versions of a document as it changes over time; for example, if a server in a remote cloud storage system contains a first version of a document, when a client device uploads a second version of the same document, identical chunks between the first and second versions will be deduplicated while new or revised chunks will be added to the user's cloud storage account.

The user account stores associated with the account storage 402 can maintain one boundary key per boundary. In one embodiment the set of boundary keys remain secret from the cloud service provider associated with the account. Instead, the set of boundary keys are maintained as a user-specific secret that can be stored in a common cloud key-chain that is synced between each client device associated with the user account. Deduplication granularity can vary across embodiments. However, in one embodiment deduplication is performed at the chunk level (e.g., chunk 334A-334N as in FIG. 3B), such that, within a deduplication boundary, only a single instance of a chunk will be stored, and deduplication is preformed within only that deduplication boundary such that the same chunk in another boundary is not deduplicated as part of the deduplication within the deduplication boundary. In one embodiment deduplication can be based on the signature of a chunk. If the signature of a chunk indicates that a given chunk already exists within a deduplication boundary, encryption and remote storage of the chunk can be bypassed.

Figure 5:
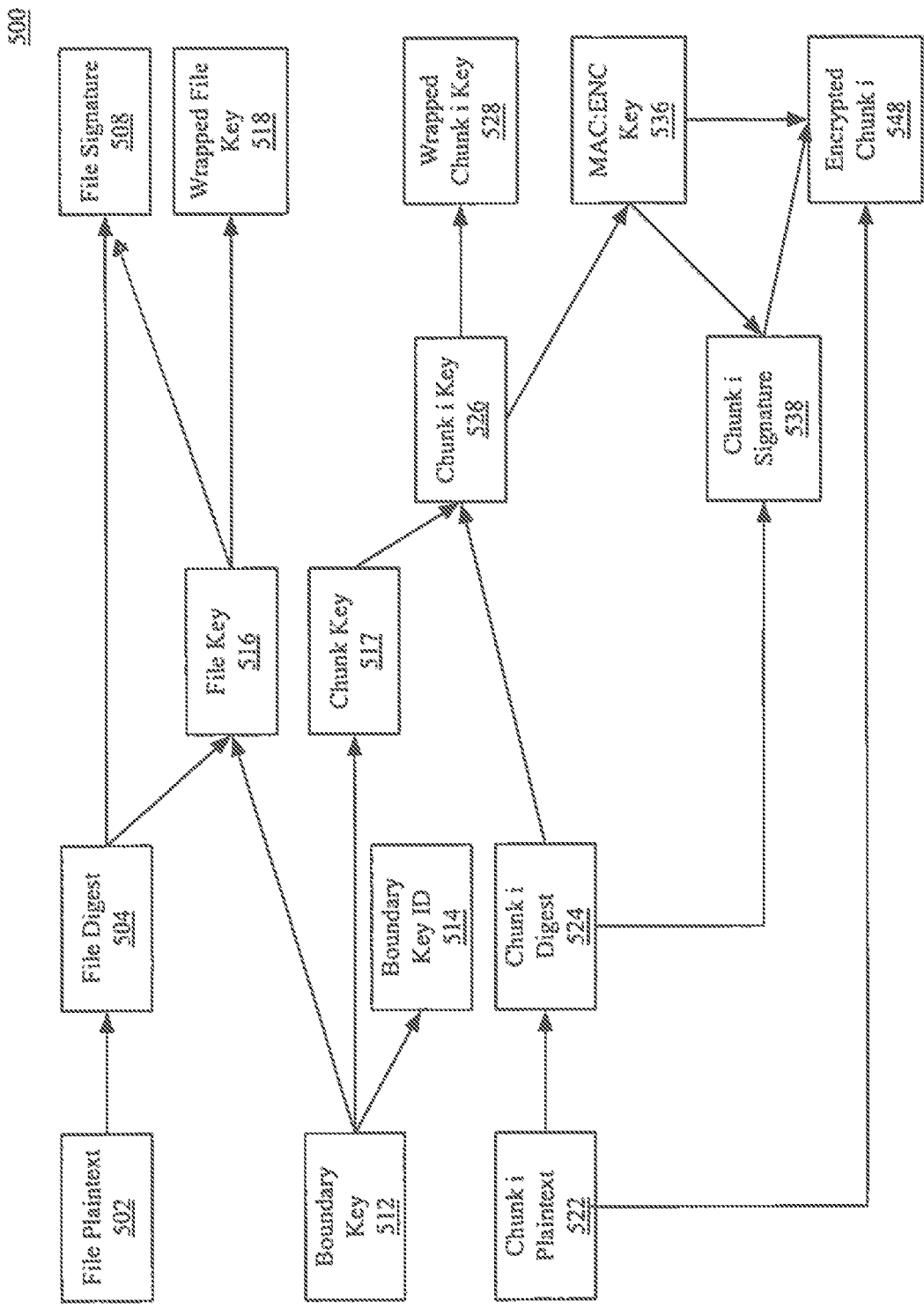
FIG. 5 illustrates a key derivation and encryption scheme, according to an embodiment.

FIG. 5 illustrates a key derivation and encryption scheme 500, according to an embodiment. In one embodiment the keys that are used for boundary deduplication are derived using a key derivation function of the pseudorandom function family using 256-bit hash and encryption keys are used. For example, hash keys can be generated using SHA256 and plaintext can be encrypted using AES 256. However, embodiments are not limited to any specific algorithm. To encrypt a file, the file plaintext 502, a boundary key 512 for the boundary of the file, and the chunk plaintext for each chunk of the file (e.g., chunk i plaintext 522) are input into the algorithm. Operations for chunk i plaintext 522 are performed for each chunk within a file. The file plaintext 502 is the plaintext (unencrypted data) for the entire file. The boundary key 512 can be the private secret key defined for a deduplication boundary. The boundary key 512 is used to derive a file key 516, a chunk key 517, and a boundary key identifier 514 that is used to identify the boundary key 512. In one embodiment, the boundary key 512 is created at a client device (of a user who also uses the user's cloud storage account) and secretly shared with other devices of that user without revealing the boundary key 512 to the cloud storage account (so the boundary key 512 remains a secret relative to the cloud storage system that stores the user's cloud storage account).

The file plaintext 502 is used to generate a file digest 504 using a secure hashing algorithm. The file digest 504 is input into a message authentication code algorithm to generate a file signature 508. The file signature 508 can be used to verify the integrity and authenticity of the file. The file key 516 can also be used for metadata encryption prevent key reuse. The file digest 504 is also used to provide context information for a key derivation function that derives the file key 516 from the boundary key 512. The file key 516 is a sharable secret. A key wrap algorithm is used to wrap the file key to generate a wrapped file key 518. Other users authorized to access the file can decrypt the wrapped file key 518 using a pre-determined group key.

Each chunk of the file (e.g., chunk i plaintext 522) is separately encrypted. Separately encrypting each chunk is performed, at least in part, to enhance the granularity of the deduplication process for the encrypted data. The chunk size used for a file can be dynamically chosen based on content type to optimize the de-duplication results or alternatively the chunk size can be a static, fixed size. A secure hashing algorithm is applied to the chunk i plaintext 522 to generate a chunk i digest 524. A message authentication code algorithm is applied to the chunk i digest 524 to generate a chunk i signature 538. The chunk i digest 524 can also provide context for a key derivation function to derive a chunk i key 526 from the chunk key. The chunk i key 526 is a sharable secret that can be shared to enable other users to access the chunk. The chunk i key 526 can be wrapped to generate a wrapped chunk i key 528. Other users authorized to access the file can decrypt the wrapped chunk i key 528 using a pre-determined group key.

The chunk i key 526 is also used to derive a combination message authentication and encryption key (MAC:ENC key 536). Using the MAC:ENC key 536, a chunk i signature 538 can be derived from the chunk i digest 524 to authenticate and verify the chunk and the chunk i plaintext 522 can be encrypted into encrypted chunk i 548. To encrypt the chunk i plaintext 522, the chunk i signature 538 is used in one embodiment as an initialization vector to the encryption algorithm.

Should any duplicate instances of encrypted chunk i 548 result from the encryption process, only one instance of encrypted chunk i 548 will be stored (e.g., only one such instance will be uploaded to a cloud storage account of the user). However, duplicate instances of encrypted chunk i 548 will not arise unless the plaintext of the duplicate chunks is encrypted using the same boundary key 512. The boundary key 512 is used to define deduplication boundaries as well as to enhance security and privacy, as the boundary keys are unknown to the cloud service provider or any vendors of the cloud service provider, such as a storage vendor that provides the data store 330 as in FIG. 3B.

Deduplication can be performed based on chunk signature (e.g., chunk i signature 538) and the encryption process for a chunk can be skipped if the chunk signature matches an existing chunk. A longer version of the chunk i signature 538 can be used as a database index for the chunk. For example, an 128-bit chunk i signature 538 may be sufficient for message authentication, while an 160-bit index can be used to identify the chunk within the storage system database. This storage system database can be used in operation 609 in FIG. 6 when a chunk currently being processed is evaluated to determine whether the chunk has already been uploaded to the cloud storage account.

Sharing a file outside of a boundary is possible by sharing each chunk key (e.g. chunk i key 526) as well as the file key (e.g. file key 516), the encrypted chunks (e.g. encrypted chunk i 548), chunk signature (e.g. chunk i signature 538) and file signature (e.g. file signature 508). The receiver of the key material can decrypt the chunk and reconstruct the file. The receiver can also verify the integrity of each chunk and the whole file. Copying the encrypted bytes and signatures into the destination account creates a relationship graph link between the "sharer" (e.g., a first user having a first cloud storage account) and the person (e.g., a second user having a second cloud storage account that is different than the first cloud storage account) to which the content is shared. To preserve privacy, the encrypted bytes can be re-encrypted by the receiver with a key derived from the boundary key of the receiver. The re-encryption ensures that identical plaintext cannot be used to link the two accounts on the cloud storage system database.

Figure 6:
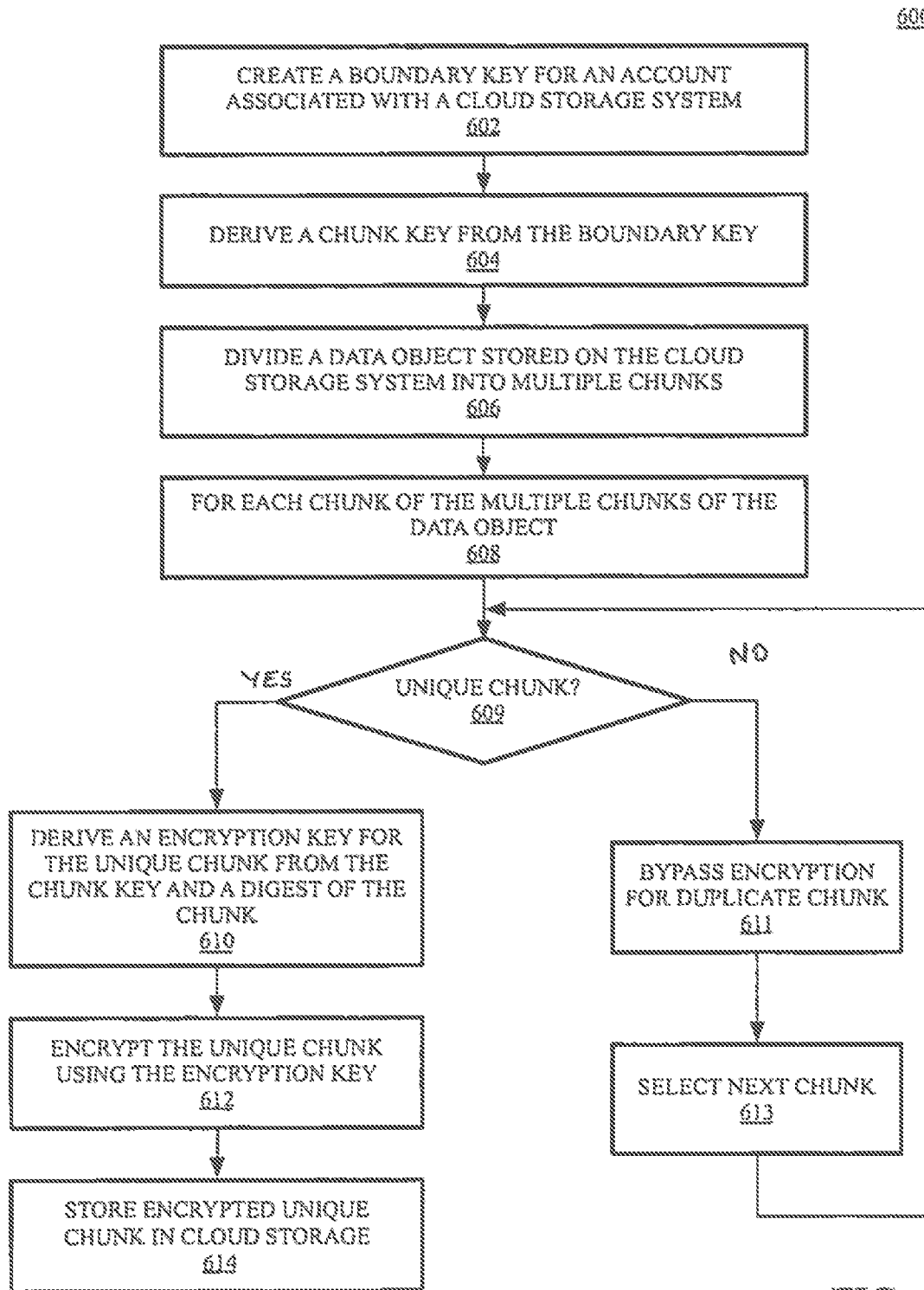
FIG. 6 is a flow diagram of logic to perform privacy preserving deduplication of a remote or cloud storage system, according to an embodiment.

FIG. 6 is a flow diagram of logic 600 to perform privacy preserving deduplication of a remote or cloud storage system, according to an embodiment. A system, such as a client device of a user who has a cloud storage account, that implements an encryption system for the remote or cloud storage environment can implement the logic 600 described herein. The logic 600 can implement a process or method of storing data on a cloud storage system using the scheme 500 to perform privacy-preserving deduplication. While a cloud storage system is described below, the logic is generally applicable to any networked and encrypted multi-user storage system and the logic 600 can be implemented by a client device that uploads content to a cloud storage account used by the client device which performs the deduplication before uploading the content. In an alternative embodiment, the logic 600 can be implemented by a server system that creates data for storage in the cloud storage account.

In one embodiment the logic 600 can create a boundary key for an account associated with a cloud storage system, as shown at 602. The boundary key can be based on the scheme 500 shown in FIG. 5. The logic 600 can then derive a chunk key from the boundary key, as shown at 604. The logic 600 can then divide a data object for storage on the cloud storage system into multiple chunks, as shown at 606. The division into multiple chunks can occur during the initial storage of the data object.

For each chunk of the multiple chunks of the data object, the logic can determine if the chunk is a unique chunk, as shown at 609. In one embodiment, the chunk is not unique if the same chunk has already been uploaded for storage on the cloud storage account. Determining if the chunk is a unique chunk can be performed by deriving a digest of the chunk using a message digest algorithm and comparing the digest of the chunk with digests of other stored chunks of data/content that has been uploaded to the cloud storage account. If the chunk is a unique chunk, as determined at 609, the logic 600 can derive an encryption key for the unique chunk from the chunk key and a digest of the chunk, as shown at 610. The logic 600 can then encrypt the unique chunk using the encryption key at 612, and upload the encrypted chunk into cloud storage, as shown at 614, thereby allowing the encrypted chunk to be stored in the cloud storage account.

If at 609 the logic 600 determines that the chunk is not a unique chunk, then the chunk has been previously stored to the cloud storage and the logic can bypass encryption (and uploading if the client device is performing logic 600) for the duplicate chunk at 611. The logic 600 can then select the next chunk at 613. The logic 600 can continue operations for each of the multiple chunks of the data object until the entire data object has been processed.

Anonymous Sharing and Group Collaboration

To provide true anonymous sharing, a collaboration document (such as an attachment to a message) should not contain any reference to the account from which the document is shared and references to the shared file or chunks of the shared file should be encrypted in different ways if the encrypted data is to be stored in any of the private database of the users to which the document is shared.

In one embodiment, anonymous sharing and group collaboration can be enabled in which shared data remains in a private database associated with a cloud storage account and access is enabled to the data via the use of a common group key. The group key is in one embodiment known to all users that have been given access to a shared document. The sharer can then generate a per document role public key pair, a per document boundary key, and a per document wrapping key. In one embodiment, the one or more group servers (described below) and other systems within a cloud storage system do not have information, based on data at rest (after server side re-encryption at a receiver's request) in a cloud storage system that specifies the members in each group, and so the members of a group who shared or collaborated on attachments (to messages) or other assets cannot be ascertained by the group server(s) or other systems within the cloud storage system based on such data at rest on the system. Thus, the sharing or collaboration of assets (such as attachments to messages or other files or documents) can be anonymous, once at rest, relative to the cloud storage system in this embodiment.

Knowledge of the private key of the role public key pair will allow a user to take a specific role. The roles include read access, read/write access, and the ability to perform group changes. The per document boundary key allows for de-duplication within the document. The per document wrapping key allows users to wrap and unwrap the document "chunk i keys". Group data can be stored in the private database of the sharer.

The wrapping key is used to encrypt all of the active chunk keys for the current members, providing all current group members with access to the current state of the file without requiring re-encryption of the chunks. Modification of the file is performed by adding new chunks. Accordingly, knowledge of a chunk key does not provide information about future modifications of the document. Access control to the document can be performed using the role key pairs. The server can control access to the document, changes to the document, and changes to the group based on a valid signature with the corresponding key. Anti-replay can be achieved based on time-stamp and/or a current "eTag" for the document. If multiple owners are enabled, the system can be configured to prevent the original owner from being removed by subsequent owners.

When a boundary key is changed in one embodiment, the new boundary key is used to generate new signatures for the file and all the active chunks. When the group membership changes in one embodiment, a new boundary key is used to generate new signatures for the file and all the active chunks. The Signature is updated in the private database in one embodiment. However, the data is not required to be re-uploaded in one embodiment. The boundary key is changed when group membership changes to prevent a new user from querying to determine whether an inactive chunk matches a specific plaintext and to prevent an old user from querying to determine if a further chunk matches a specific plaintext.

The group collaboration and sharing techniques for cloud storage can be implemented as a part of a messaging protocol that enables the communication of message and asset (e.g., an attachment to a message) data between users via a cloud based messaging platform, which is described below.

Security for Seamless Messaging

Embodiments described herein can enable messaging between user accounts of the cloud storage system. The seamless messaging system described herein uses, in one embodiment, the concept of a single user identity for an online account, rather than a device specific approach. Messaging can be enabled such that a group of accounts can be created and messages can be securely exchanged between the accounts in the group. Multiple devices associated with an online account can share the same cryptographic key material using the synchronization mechanism of a cloud keychain. In this context the cloud keychain ensures that the key material is only accessible to a device belonging to the legitimate user and that the cloud service provider is not in a position to retrieve any key material. In one embodiment, a cloud keychain is a password management system that uploads, from multiple devices of a user, passwords, other credentials, account names or usernames, credit card information (and optionally other data) to a cloud storage system used by the user's cloud storage account, and the cloud storage system is configured to store the uploaded data and is configured to synchronize that uploaded data across the multiple devices of the user who owns or controls the cloud storage account. Thus, the user does not need to re-enter one or more of a password or account name or credit card information on a second device (e.g., the user's smartphone) if the second device has been synchronized through the cloud keychain with a first device of the user (e.g., the user's laptop computer on which the user previously entered the password or account name or credit card information). The uploaded data for the cloud keychain can be uploaded and stored in encrypted form on the cloud storage system.

Another aspect of the seamless experience is to improve consistency of the transcript. Every user and device in the conversation should have a similar view of the conversation. Messages should not arrive in different orders on different devices or fail to arrive at some devices. Transcript consistency is improved by enabling a three-stage communication system: immediate transport of messages, short-term storage of messages, and a long term archiving of message history. Immediate transport of messages can be performed using a global message key. Short term and long term storage can be performed on a per-user basis. Short-term cloud storage is used to keep the most recent messages to enable delivery of lost messages and/or to help offline or new devices catch up quickly to the latest messages. The transcript is a record of messages among all participants/users in a messaging group, and the messages can be shown on devices of all participants/users in chronological (or reverse chronological) order in the transcript in one embodiment. In one embodiment, messages sent by a user of a messaging account in the messaging group are shown on one side of the transcript, and messages received from all other users in the messaging group are shown on the other side of the transcript, and all messages in the transcript are shown in their chronological order (e.g., a message sent at 10:00 am appears before a message sent at 10:30 am). A conversation in this messaging group is revealed by the transcript, and the conversation can happen in real time for all users in the messaging group that are online (e.g., their devices are on and connected to one or more networks to receive the messages as they are sent). A conversation in this context is defined by the member of the messaging group and their messages exchanged between those members.

Each device possesses a set of identity server (IDS) transport keys that are used to establish communication keys between the various devices involved in a group. The device keys can be non-extractable keys that can be stored within a secure cryptographic co-processor, such as a secure enclave processor (SEP). Registering a device can be a simple process that includes uploading a set of keys derived from one or more secret device keys to the identity server. The device keys are authenticated and the device is associated with an account. All of the devices attached to an account can share a common set of keys protecting the cloud storage zone used for short term and archiving purposes. Those cloud storage keys can be protected and synchronized across the user devices through a cloud keychain. The cloud storage keys are configured in one embodiment such that the cloud storage provider cannot access the stored data.

In order to start messaging, a group of users can first establish a group key. The device that creates the group in one embodiment takes the role of sponsor with the assistance of a group server. The group server can be involved to store an anonymous blob containing the cryptographic material that allows the members to recover the group key. The blob in one embodiment is a binary object that is a collection of data that is stored as a single entity within the database system used for message data storage. Subsequent changes to the group membership can also go through the same server to enable atomic changes and prevent concurrent modifications of the group. Once the group blob has been created and accepted by the server, the group blob can be sent to all the devices involved in the group. Once the devices in the group have the group blob, the devices can use the group blob to derive the group key.

A group key having been established between all the devices, the devices can exchange messages. Each message can go through a three step process of group broadcast and server side fan out, short term storage on cloud storage (e.g., a receiver transport zone), and long term archival on cloud storage (e.g., a receiver truth zone) by archiving for each receiving client device.

Using a group broadcast/fan-out mechanism can reduce the bandwidth and improve the reliability of sending messages. The sender can send a single message that contains data for all the receiving devices, which reduces the amount of data transmitted and reduces the probability that the message is lost for one or more recipients. The privacy aspect of using the same blob for different destinations can be addressed by reprocessing messages outside of the user visible critical path.

Protocol Key Material

The general protocol uses the following key material: 1) Per account (user i) long term IDS account signature key pair: {dai,Pai}; 2) Per account (user i) long term IDS message administration key pair: {dmai,Pmai}; 3) Per account (user i) long term IDS message signing key pair: {dmsi,Pmsi}; and 4) Per device (user i) ephemeral encryption key pair, a.k.a. pre-key: {dei,Pei}. The ephemeral encryption key pair has a "time to live" and is updated periodically. A key pair, in one embodiment, is a pair of asymmetric keys which includes a private key and an associated public key (e.g., d=a private key and P=a public key). As is known in the art, normally one key in the pair is used for encryption and the other key in the pair is used for decryption. A symmetric key (e.g., a single key used for both encryption and decryption) is also used in the embodiments described herein (e.g., the message key (msgKey) can be a symmetric key and the group key KG can be a symmetric key).

Each key can be classified as one of multiple data protection classes. The data protection classes define when and how data is accessible. Class A data is completely protected and is accessible only when a device is unlocked. In one embodiment, unlocking a device occurs when a user enters their passcode in a passcode entry screen on the device. Class B data is protected unless open, such that read and/or write access is possible when the data has been opened for access. Class C data is protected until first user authentication. This data is accessible only after the first unlock after each boot. Class D data is available at all times, without regard to the devices locked or unlocked status.

Figure 7A:
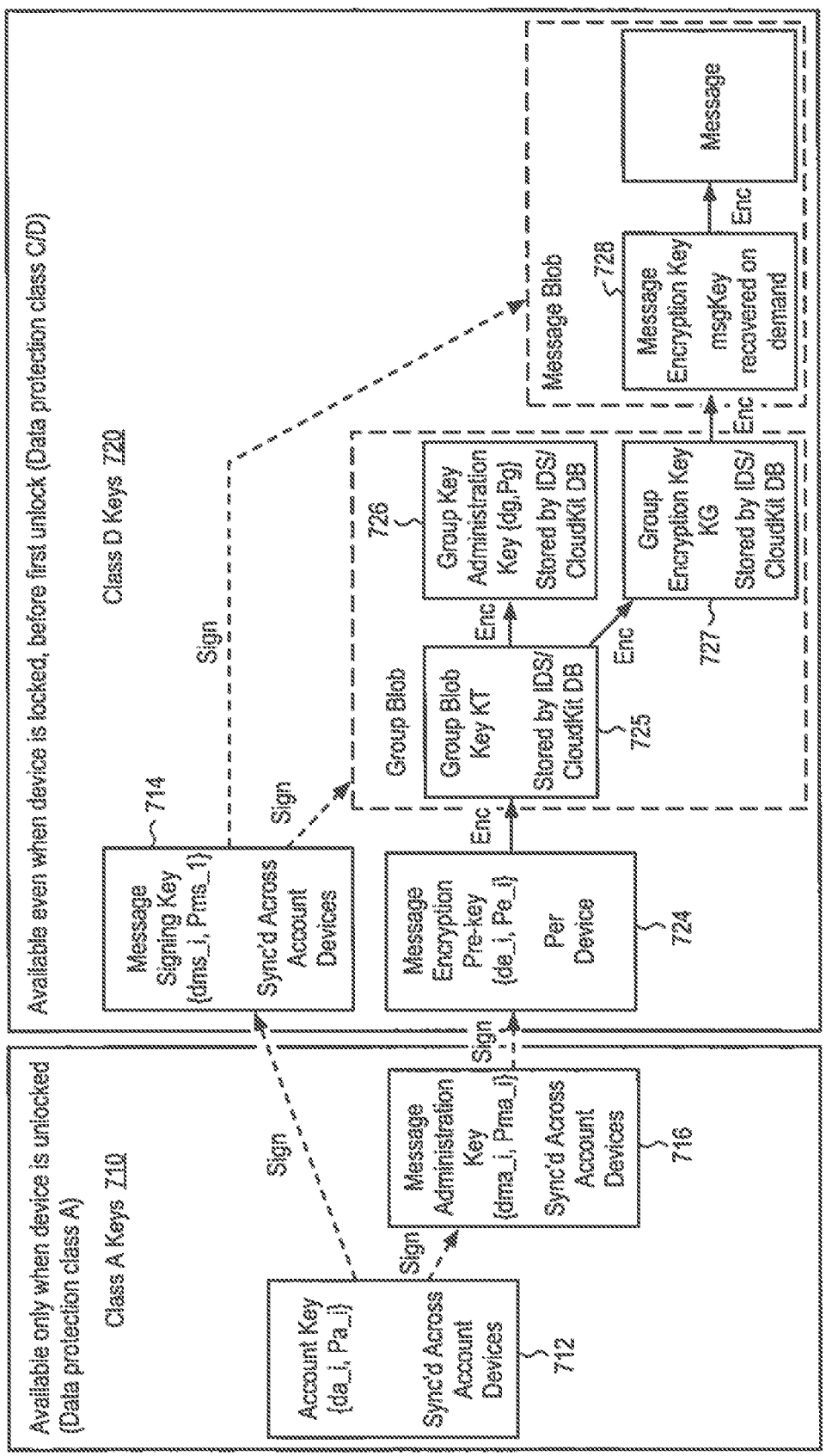
FIGS. 7A-B illustrate message key derivation and key relationships, according to an embodiment.
Figure 7B:
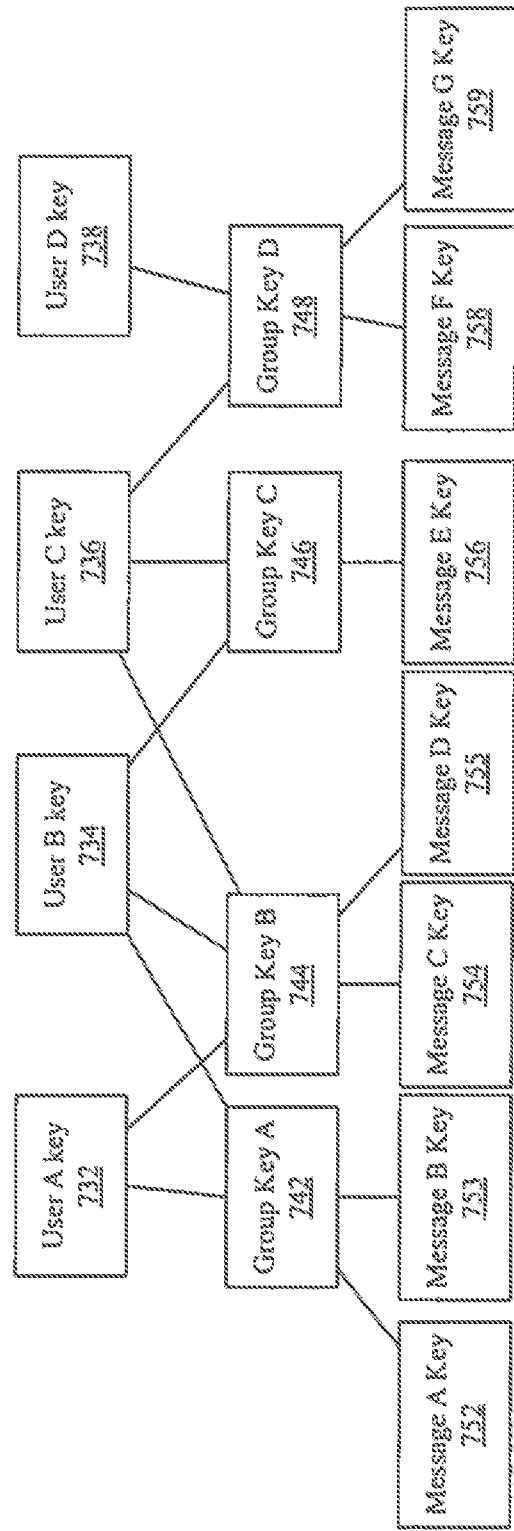

FIGS. 7A-B illustrate message key derivation and key relationships, according to an embodiment in which a group blob (such as an anonymous set of cryptographic data) can be used to derive at least one group key. In one embodiment message key material is derived from set of protected class A keys which are used to derive class D keys. The class D keys (such as message signing key pair {dms_i,Pms_i} and message encryption pre-key pair {de_i,Pe_i}) are used for message encryption and verification. As illustrated in FIG. 7A, each user has a set of class A keys associated with a user account of the user. In one embodiment the class A keys include a per account key pair {dai,Pai} 712, and message administration key pair {dmai,Pmai} 716 that are each synced across devices within the account via the cloud keychain associated with the account. The account key pair {dai,Pai} 712 can be used to derive or sign the message signing keys 714 and message administration keys 716. The account key pair {dai,Pai} 712, message signing key pair {dmsi,Pmsi} 714, and message administration key pair {dmai,Pmai} 716 can be synced using a cloud keychain associated with the devices. The key derivation can be performed using a key derivation function of the pseudo-random function family. In the example shown in FIG. 7A, the private key (dai) of the account key pair 712 is used to generate a signature for the message administration key pair 716 and is used to generate a signature for the message signing key pair 714. The message signing key pair {dmsi, Pmsi} 714 can be used to sign each message. The public key of the message signing key pair (Pmsi) can be used to verify a signature generated by the private key (dmsi). In one embodiment, the message signing key pair {dmsi, Pmsi} 714 can be maintained as a class D key to enable a user to reply to a message via the lock screen of a locked device.

In one embodiment, each user account has a message encryption pre-key pair {dei,Pei} 724 that is authenticated via the message administration key 716. The pre-keys are ephemeral keys that have a time to live, after which the pre-keys expire. A device can upload new pre-keys periodically (e.g., every week, every month, etc.). The device can also upload new pre-keys when a new account key is registered. Additionally, the server that stores the pre-keys (e.g., an identity server, in one embodiment) has a cache time to live, after which cached data expires and any un-expired pre-keys will be refreshed.

The pre-keys are used to decrypt a group blob key (KT) 725. The group blob key (KT) 725 is used to protect the group blob that contains data to enable access to group messages. The group blob key (KT) 725 is used to decrypt a group key admin key {dg,Pg} 726 and a group encryption key (KG) 727. The group key admin key {dg,Pg} 726 is used to sign the group blob and can be used to transition to another group blob when a key roll or a membership change occurs. The group encryption key (KG) 727 is used to wrap (e.g.; encrypt) the message encryption key (msgKey) 728 so that only members of the group can encrypt or decrypt messages sent or received within the group. The message encryption key (msgKey) 728 that is used to encrypt a message can be a random key that is generated for each message.

FIG. 7B illustrates the relationship between user account keys, group keys, and message keys according to an embodiment. The parties to a messaging group establish the group key before communicating as a group. The process of establishing a common key is referred to as key agreement. The group key is defined by the membership of the group. User A key 732 is an account key for user A. User B key 734 is an account key for user B. User C key 736 is an account key for user C. User D key 738 is an account key for user D. User A and user B can communicate via group A, which has an associated group A key 742. User A, user B, and user C can communicate via group B, which has an associated group key B 744. User B and user C can communicate via group C, which has an associated group key C 746. User C and user D can communicate via group D, which has an associated group key D 748. The group keys are then used to wrap the message key for each message. For example, to send message A and message B to group A, randomly generated message A key 752 and message B key 753 are wrapped with group key A 742. To send message C and message D to group B, randomly generated message C key 754 and message D key 755 are wrapped with group key B 744. To send message E to group C, randomly generated message E key 756 is wrapped with group key C 746. To send message F and message G to group D, randomly generated message F key 758 and message G key 759 are wrapped with group key D 748. Recipients of the message can use the group keys that are known to each member of the group to unwrap the message encryption keys and decrypt the encrypted messages.

Establishing a Group Key

To generate a group key for a group, in one embodiment the pre-keys for each user account (e.g., message encryption pre-key $\{d_ei, P_ei\}$ 724) associated with the group are used to derive the group key. In one embodiment the group key (KG) is generated based on a random seed picked by the sponsor which can be the device that creates the group by receiving selections from a user which specify the members of the group. The group key is generated in one embodiment as KG=KDF(seed, $\{P_e1, \ldots P_en\}$) where $P_ei$ are the pre-keys of each receiving devices. The seed is transmitted to all the participants who will each perform the Key Derivation operation. In one embodiment, for legacy identities that have not transitioned to the use of pre-keys, the existing message encryption keys for the identity can be used in place of the pre-keys. Using legacy encryption keys for legacy identities enables legacy devices to join a group before the device is able to advertise pre-keys for the updated protocol.

The key construction performed in such embodiment provides several properties. First, the encryption to each $P_ei$ insures that getting the group key is only possible to one who possesses one of the pre-key private key. Second, contributory entropy is used such that all the participants contribute to the key in one embodiment. Each participant contributes in one embodiment with a pre-key. The participant pre-keys have the potential to be used for several unrelated groups. Third, the sponsor does not chose the group key in one embodiment. Instead, the sponsor provides in one embodiment a random key as a seed that is used only once. This random seed introduces unpredictability into the group key generation process. The sponsor contributes to the key generation process but does not directly generate the key. To compromise the key generation process, the sponsor is limited to brute-force or pre-image attacks on the key derivation function. Fourth, forward secrecy is enabled in one embodiment. An attacker will require access to a pre-key private key to recover a group key. Once the pre-key used within a group has been deleted from the device it becomes impossible to recover the corresponding messages for the group unless the Group Key or messages themselves have been preserved and can be restored via a backup to an authentic device that is still an authorized member of the group. Similarly, an attacker cannot decrypt future group messages associated with a future pre-key private key. Fifth, key independence is enabled. Each group key is independent from previous group keys for a group, as well as group keys for other groups. Sixth, key freshness is enabled. Statistically, the same key is extremely unlikely to be re-used as long as the sponsor behaves correctly. When any one of participant pre-key is changed the group key will be changed without the group sponsor control.

Creating a group includes creating a group blob that is encrypted and shared with each member of the group. This group blob contains all the information necessary to generate a key based on the pre-key contribution from each recipient.

FIGS. 8A-B illustrates group blobs, according to an embodiment. FIG. 8A shows a first group blob 800, which is a binary object that contains the data to enable secure communication among members of a group and can be stored in the cloud storage database of members of the group. The first group blob 800 is signed with the private key (dg) of the group admin key pair $\{dg, Pg\}$ 726 shown in FIG. 7A. A cloud storage server can verify the signature of a group blob without leaking any information about the members of the group.

The first group blob 800 includes group privacy key material (UKM 810), and a privacy protected blob (PPB 820). The UKM 810 includes the group blob key (KT), which is wrapped using the short term encryption key ($P_ei$) of each member device (e.g., $P_{e\_2}$, $P_{e\_3}$, $P_{e\_N}$, etc.). Each member device can use an associated short-term decryption key (e.g., $d_ei$) to decrypt the group blob key. The PPB 820 is in one embodiment encrypted with a group blob key (KT).

The devices can then use the group blob key (KT) to decrypt the PPB 820. The PPB 820 contains a generation counter, a creation timestamp, and a user list. The generation counter indicates the current generation of the PPB 820 and is updated when the PPB 820 changes. The generation counter is used to validate changes to the group. Group changes made that indicate a generation counter that is different from a current generation counter will not be accepted. The creation timestamp is used to record the time of the creation of the group blob. The user list is a list of each member {Ui} that participates in the group. Each member can be identified by an e-mail address, phone number, or another identifier that can be used to query an identity server (IDS) for public keys or other identifying information for each user. The user list can also include signed pre-keys for each user, as well as an encryption key hint for legacy identities. The encryption key hint can be used to retrieve a full encryption key for a legacy identity. The full encryption key, using the hint, can be obtained from an identity server.

The PPB 820 can also contain group creation key (GCK) information, a conversation binding (CB), and a sponsor signature. The GKC information provides the information used to create the group key (KG). The Conversation Binding (CB) gives a pointer to any previous group blobs that correspond to the existing group conversation. For the initial group blob, the CB can be empty. The Sponsor Signature is used to sign each field to enable group members to verify the creator of the group.

A group blob may also contain a session encrypted blob which can contain an administration key (ADK) (e.g., group key admin key 726 as in FIG. 7A) and other data. The administration Key (ADK), contains the private key pair $\{dg,Pg\}$ which is used to sign the Group Blob and to transition the group to a new group blob. The arbitrary payload can include a first message to the group and/or define a name for a group, which can be broadcast to the group members.

Once the group blob is created, the sponsor sends the group blob to a group server, in one embodiment, in a cloud storage system. The group server choses an ENID or group identifier, which is a stable identifier that can be kept across changes to the group for the same conversation. The group identifier can be used for indexing purposes (e.g., in order to locate the group identifier on storage coupled to the group server) and to enable group updates to be performed as atomic operations. Atomic changes to the group are enabled by using the ENID to route the group change to the specific group server holding the previous iteration of the group blob. The group change can then be performed atomically on a single server, avoiding the requirement of performing multi-server atomic operations. The group server that creates the group blob can choose the ENID based on a creation timestamp and server specific information to enable ENID uniqueness across the set of group servers. The group server can then store the group blob in a location uniquely identified by "ENID:v", where v is a generation counter for the group blob. In one embodiment, the users in a group are not exposed to the group server so they are anonymous relative to the group server.

When the group server receives a new group blob having a public key, the group server can atomically verify the signature of the group blob and write the group blob at a location corresponding to the public key, the hash of the public key, or the ENID of the group blob. If a blob is already stored at the location, the group server returns an error and the new group blob is not created. After the Group Blob is confirmed to be accepted by the server, the server returns the group identifier "ENID:v". The creator of the group blob can send a first message to all of the receivers of the group and include the group blob with the first message. In parallel, the group sponsor stores the group key material {ENID:v,Pg,dg,KG} in a storage location (e.g., cloud storage zone) on cloud storage associated with the messaging system or in a cloud keychain associated with the user account. Subsequent messages within the group need only reference "ENID:v" and do not require the group blob to be included within the messages. If a device does not receive the group blob for a conversation, the device can recover the group blob from the group server with a query based on ENID:v or a value derived from public group admin key Pg. A receiver of the group blob can retrieve the public message signing keys for members via a query to the identity server (IDS). The public message signing keys received via the IDS query can then be used to evaluate the signed pre-keys included within the user list.

Group Administration

A group blob is changed when membership changes or to roll out fresh keys. FIG. 8B illustrates a second group blob 850 that can be created in response to a change to the first group blob 800 to add or remove group members. To add or remove members from a group, the device making the change to the group takes on role of sponsor and creates the second group blob 850. The second group blob 850 is associated with a new group key but can have the same ENID. The :v associated with the ENID can be incremented for each generation or version of the group blob. The sponsor completes the first group blob 800 to add a forward ticket 890 to identify the second group blob 850. The forwarding ticket 890 cryptographically insures the two groups belong to the same conversation and to enable the server to guarantee that each group version has a unique successor.

In one embodiment the forward ticket 890 is in plaintext to enable the group server to follow the evolution of group in a conversation without exposing any information about the members of the group. Exposing the link allows for a more robust implementation on the group server, for example, with respect to potential client bugs. The group server enables atomic changes to the group blob in one embodiment. To perform a group change, the second group blob 850 is created with the updated group data. The group server then atomically verifies the signature of the forwarding ticket 890 and the validity of the second group blob 850 using the public key of the first group blob 800. If the current blob 800 does not exist or already includes a forwarding ticket 890 the group server will return an error. If the forwarding ticket 890 and the second group blob 850 are correct and the first group blob 800 does not have a forwarding ticket 890 the group server can update and lock the first group blob 800 and write both the second group blob 850 and the forwarding ticket linking the first group blob 800 and the second group blob 850.

The second group blob 850 includes similar data as the first group blob 800 in one embodiment. The second group blob 850 includes updates group privacy key material (UKM 860) that includes the new group blob key (KT2) that is wrapped using a device public key of each member of the blob. The PPB 870 of the second group blob 850 is in one embodiment encrypted using a second group blob key (KT2). The sponsor signature of the second group blob 850 is the sponsor that initiated the creation of the second group blob 850. Additionally, a link to the previous blob is created as part of the conversation binding (CB) to link to the first group blob 800. The link can be based on a signature defined by Sign_dg(ENID:1∥Pg∥Pg2). This same signature is placed within the forwarding information 890 of the updated first group blob 800.

Once the second group blob 850 is successfully created, the sponsor of the group change can send a group change message to the group. In one embodiment the group change message includes the second group blob 850. In one embodiment the group change message includes a reference to the second group blob 850. The group members can then recover the second group blob from the group server. The receiver of a group change message can return an error to the sender and discard the message if the receiver receives a group change based on a group that is not the current group. This may happen if the Group Server lost or garbage collected the locked group. The receiver can also return an error to the sender if the receiver receives a group change based on an existing ENID:v and a different group key or generation counter.

In general, a receiver of a message can return an error to the message sender for every message associated with anything other than the current group. However, in one embodiment the receiver may allow for a grace period when receiving a message with an old ENID (ENID:i) shortly after the group moved to new ENID (ENID:j, where j>i). The message user interface (UI) can handle this issue and display the message in a manner that indicates that the message was sent to the previous membership. Any response to the message will be addressed to the latest group membership.

Rolling a Group Key

This operation is, in one embodiment, identical to adding/removing members of a group, where the identities are unchanged. This operation can be signaled to the server so that in case of overload, the server can refuse to perform a rolling operation on the group key.

Changing Pre-Keys

The device uploads, in one embodiment, new pre-keys periodically and when a new account key is registered Device Joins an Account The device key material is added, in one embodiment, to the identity server (IDS). The new device may receive messages for a group that the device was not previously aware of. The device is associated with an account for the cloud storage and messaging system. Once associated with the account, the device can retrieve cloud storage and keychain keys for the account. T The device can retrieve the group key. The device can then retrieve any stored short term stored encrypted message for the account. The device can then retrieve archived messages associated with the account from the cloud storage system. This system ensures that recent messages associated with the account are retrieved first to enable the user to continue participating in any conversations that were initiated on a different device before the new device joined the account.

Changing Account Keys

Account keys are changed in one embodiment when a device leaves an account or when a keychain account password is reset. When an account key changes in one embodiment, the old key is removed from the cloud keychain, the cloud storage keys are rolled to a new set of keys, and all conversations associated with the account are updated based on the new key. Members of a group have a view of the other user devices within the group. If an account key rolls or if a device is added or remove in a user account, one of the member of the group can roll the group key to adjust the group accordingly. In one embodiment an account key change can trigger a user interface notice to warn the user. Participants in a group can periodically contact the identity server to determine the availability of updated keys for group participants.

Updating the Account Long Term Key Material

To be able to verify messages after a user rolled his or her identity, in one embodiment the history of a public key is stored. One threat is for an adversary to change the history and insert keys that were not legitimately part of the account in order to impersonate a user. Therefore the stored identities are linked together in one embodiment. A broken link indicates a disruption of the trust chain, which may be the result of an attack or a voluntary re-set from a user. To create a link between identities, the previous identity can be signed using a key associated with the new identity. The new identity can then be signed using a key associated with the previous identity.

Sending and Receiving Messages

For each new message (msg), a random key (msgKey) is generated and the sending client device performs multiple operations. First a truncated hash of the sender public key is generated and stored for key disambiguation purposes. Second, the device can add padding (rand_pad) to a rounded size, with a minimum size for small messages to de-correlate the size of the ciphertext of short messages ("yes"/"no"). Third, the sending client device can sign the data and group information with the sender message signing key: sign_$d_{ms}i$ (msg||group blob hash||ENID:v)||rand_pad). The signature is used to authenticate the sender. Otherwise any member of the group could appear to be a valid sender of a message. Using the full hash of the group blob binds the message/signature to the group the message was sent.

Fourth, the sending client device can perform an Authenticated-Encrypt operation using the msgKey: authEncSym_msgKey(msg||H4($P_{ms}$i)||rand_pad||sign_$d_{sm}$i (msg||group blob hash||ENID:v) The authenticated encryption simultaneously provides confidentiality, integrity, and authenticity assurances for the encrypted data. Decryption is combined in single step with integrity verification. Fifth, the sending client device can wrap (encrypt) the msgKey with the group key (KG): wrapSym_KG(msgKey). Sixth, the sending client device can then send a message to a message server containing the encrypted message data, the list of user accounts and information to identify the group blob associated with the message group. Each recipient device in the group will decrypt the message key (msgKey) using the group key (KG) which is derived by each recipient, and then decrypt the message using the message key (msgKey).

The message server can process the list of recipients and fan out and send (transmit) the message to each of the recipient devices. The message server can temporarily store the message in a cloud storage account associated with the recipients of the message. Online recipients can receive the message immediately via the message server, with any attachments received via the cloud storage server(s) in one embodiment. Offline recipient devices receive the message through the cloud storage server once the device is online. Periodically, messages can be stored in one more archives on cloud storage (e.g., device backup, etc.). The messages can be stored in an aggregated format. The aggregation can be performed on the client device or on the cloud storage server. Otherwise, the messages can be split in fixed size parts that will hide the real length of the message.

Figure 9A:
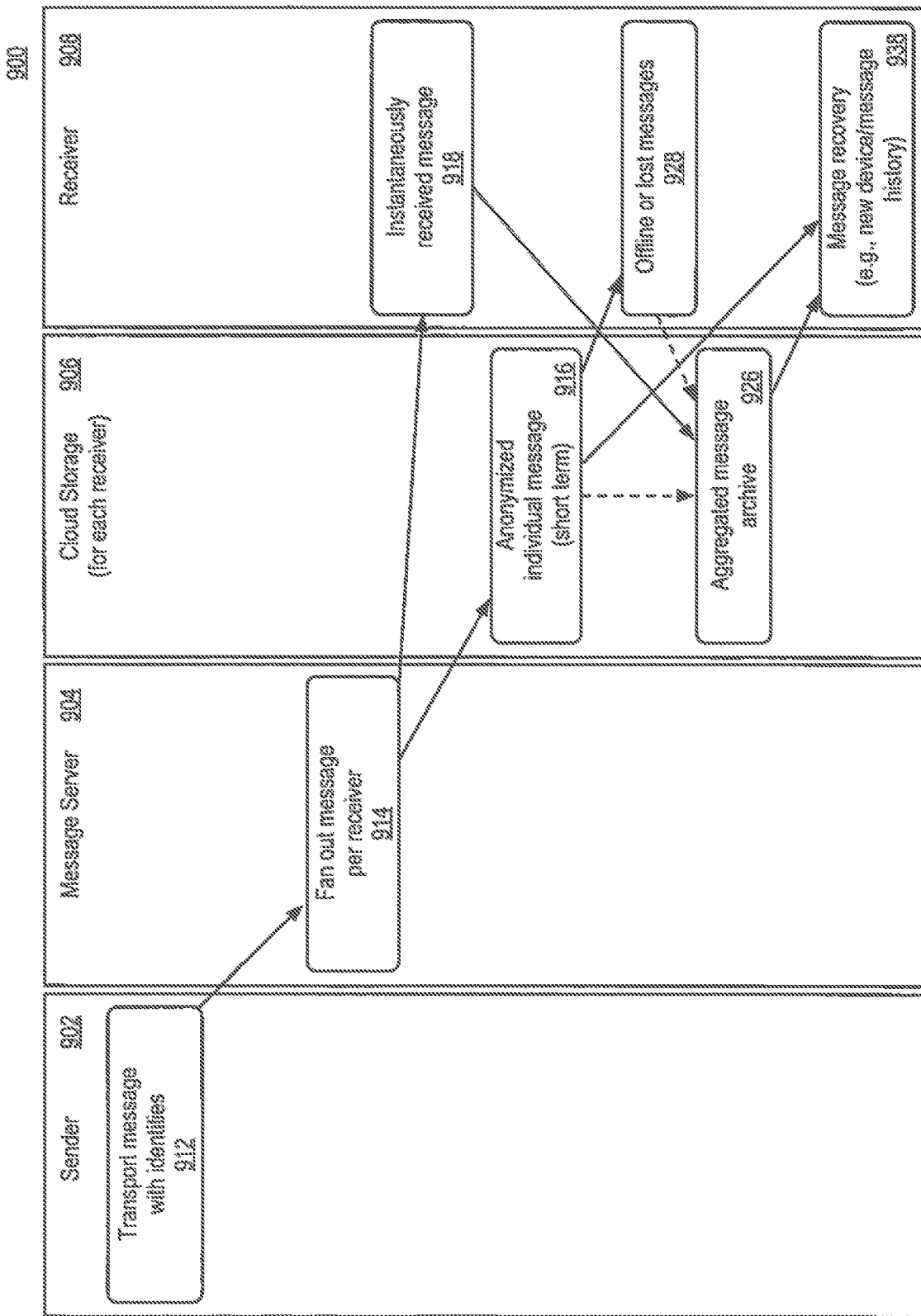
FIG. 9A illustrates messaging within a cloud-based messaging system for sending and receiving encrypted messages, according to an embodiment.

FIG. 9A illustrates messaging within a cloud-based messaging system 900 for sending and receiving encrypted messages, according to an embodiment. The cloud-based messaging system 900 includes a sender 902, message server 904, cloud storage 906 for each receiver, and a receiver 908. The sender 902 and receiver 908 are client devices of the cloud-based messaging system 900. One or more infrastructure servers of the cloud-based messaging system 900 can provide the message server 904 and cloud storage 906. The cloud storage 906 can be segregated into zones for each receiver, such as receiver 908; for example, cloud storage 906 for receiver 908 can include a transport zone to store the anonymized message in short term (e.g., less than 30 days) storage and a truth zone that can be a permanent (long term) truth zone that is used to synchronize to multiple devices associated with receiver 908.

The sender 902 can encrypt message content (msg) from a user as described above using the randomized message key (msgKey) (e.g., authEncSym_msgKey(msg||H4(Pmsi) ||rand_pad||sign dsmi(msg||rand_pad||group blob hash|| ENID:v))) and perform a transport operation (912) to the message server 904 to send the encrypted message and associated identities (e.g., {Uj, Uk, Ul, ... }) associated with the message. The message server 904 can perform a fan out operation (914) to send the message to each message receiver. The fan out operation (914) can include directly sending the message to the receiver 908 if the receiver is online (instantaneously received message 918). In one embodiment, the fan out operation 914 can use one or more push notification servers to push the message to each receiver that is currently online.

If the receiver 908 is offline, the message server 904 can temporarily store the message in cloud storage 906 associated with the receiver 908. The message server 904 can store the message (and optionally any attachments in one embodiment) as an anonymized individual message 916 in a short-term message storage zone of cloud storage associated with the user. The message in one embodiment is stored in the cloud storage system in an anonymized manner such that the ciphertext of the same message differs between the stored ciphertext of the sender and any of the receivers. Due to message anonymization, an adversary with access to the backing cloud storage volumes cannot generate a social graph that links the members of a group based upon the stored ciphertext of the members of the group. In one embodiment, message anonymization can be provided by re-encryption of each received message for each user/receiver in both short term and long term (archive) storage, and re-encryption can be performed by either a server(s) in the cloud storage system or client device of the user/receiver. Message anonymization in cloud storage systems is described further below. If the receiver 908 was offline at the time the message was sent or the message was lost in transit the receiver 908 can receive the message later as an offline message (offline or lost messages 928).

The instantaneously received message 918 can be stored in the cloud storage 906 of the receiver during a backup process which can store the message in an archive. The messages can be stored in a long-term message archive 926 on the cloud storage which can be in a "truth" zone for the cloud storage associated with each receiver, and this zone provides storage for data that is treated as correct and true so it can be used to restore or recover a previously used device or to initialize a new device of the user of the cloud storage account. In one embodiment, the offline or lost messages 928 from a receiver 908 are also be backed up to the long-term message archive 926 during the backup. In one embodiment, the anonymized individual messages 916 stored in short-term storage can be stored to the long-term message archive 926 as the messages expire from short-term storage. Message recovery (938) on a receiver 908 can be performed from the anonymized individual messages 916 as well as the long-term message archive 926. Message recovery 938 can be performed when restoring a device from backup, adding a new device to an account, or to access an account message history.

Each message in one embodiment can be uniquely identified with random universally unique identifier (UUID) that is at least 128-bits in length. The UUID can be used to identify duplicate messages. Duplicate messages can occur if the receiver 908 or the cloud storage 906 receives a message from multiple locations. For example, if the receiver 908 receives a message from the message server 904 and from the cloud storage 906, the duplicate message can be identified and discarded or otherwise prevented from being displayed to the user. Additionally, if the cloud storage 906 receives a message from both the message server 904 and the receiver 908, the duplicate message can be identified and will not be stored. To avoid storing duplicate messages on the cloud storage 906, the cloud storage 906 has access to a form of the UUID. However, to avoid privacy issues associated with exposing the message UUID to the cloud storage 906, the UUID is diversified into a record ID that is associated with the database record that is used to store the message in short-term storage in cloud storage 906. The record ID can be defined as RecID=MAC(MessageUUID, Salt). The salt is unique per account and is at least 160-bits. The MAC can be an HMAC or CMAC.

Anonymization of the individually stored records can be achieved by re-encrypting the messages that are stored on cloud storage in both short term storage and long-term storage (e.g. long-term message archive 926). The attachments to the messages can also, in one embodiment, be stored in the cloud storage system in anonymized form through re-encryption. Re-encryption can be performed on a server (e.g., message server, cloud storage server) or via a client device. Server re-encryption can be performed with encryption transparency that provides a verification method to the client to attest that the server performed a genuine encryption operation. For example, with the Elliptic Curve Integrated Encryption Scheme (ECIES) used in some instances for message encryption it is theoretically possible for an adversary to replace the ephemeral keys with fixed keys or key derived from a single known seed. Such replacement could allow the adversary to decrypt messages. The transparent encryption used for message re-encryption attempts to ensure that the encrypting server cannot later decrypt high entropy messages without storing per message information. To enable transparent encryption, Message-Locked Public Key encryption can be used and an example of the use of Message-Locked Public Key encryption is provided in the attached Appendix ("Message Lock Encryption for Server Side Re-Encryption"). With a random, unpredictable seed, Message Locked Public Key encryption has similar properties as ECIES. In one embodiment, transparent encryption can also be used when the group sponsor encrypts the group blob key KT, and a pair (dw, Pw) of keys is used in this case and the pair of keys is based on a seed verifiable by members of the group.

FIGS. 9B, 9C, and 9D show messaging within a cloud based messaging system which can include one or more identity servers such as an identity server 922, one or more group servers such as group server 924, one or more messaging servers such as messaging server 930, and a cloud storage system 932 that can be implemented using one or more cloud storage servers. In this description, a reference to FIG. 9B shall mean a reference to the set of FIGS. 9B1 and 9B2. FIGS. 9B1 and 9B2 together form FIG. 9B and were created by splitting a single sheet into FIGS. 9B1 and 9B2 in order to comply with formal drawing requirements. In this description, a reference to FIG. 9C shall mean a reference to the set of FIGS. 9C1 and 9C2. FIGS. 9C1 and 9C2 together form FIG. 9C and were created by splitting a single sheet into FIGS. 9C1 and 9C2 in order to comply with formal drawing requirements. In this description, a reference to FIG. 9D shall mean a reference to the set of FIGS. 9D1, 9D2 and 9D3. FIGS. 9D1, 9D2 and 9D3 together form FIG. 9D and were created by splitting a single sheet into FIGS. 9D1, 9D2 and 9D3 in order to comply with formal drawing requirements. In the examples shown in FIGS. 9B, 9C, and 9D, there are three (3) users (User 1 920, User 2 934, and User 3 936) who each have one or more devices registered to use the cloud based messaging system and have cloud storage accounts in which archives can be stored. FIG. 9B shows how User 1 920 creates a messaging group or conversation with Users 2 and 3 (User 2 934 and User 3 936). In operation 921, User 1 920 causes a device operated by User 1 (User 1's device) to create a conversation with Users 2 and 3, and the device requests identification information (also referred to as identities or identity data) from an identity server 922. In operation 923, the identity server 922 retrieves and sends the identification information for Users 2 and 3 to the requesting device (User 1's device); the identification information is received in operation 925 by User 1's device, and the identification information includes one or more cryptographic keys (e.g., public keys) for each of Users 2 and 3. Then in operation 927, User 1's device verifies the identification information and then, in operation 929, creates a group blob (which can be similar to group blob 800) and sends the group blob to group server 924. The group blob can be used by the devices of Users 1, 2, and 3 to create one or more group keys. In operation 931, the group server 924 receives the group blob from User 1's device, and then in operation 933 the group server 924 verifies the signature of the group blob and then, in operation 935, stores the group blob on storage coupled to the group server 924. The group server 924 can use the stored copy of the group blob to restore a device of Users 1, 2, or 3 (e.g., User 1's device is erased and data, including the group blob, is restored) and to update the group blob when the group is changed (such as the change shown in FIG. 9D). In operation 937, the group server 924 transmits a group identifier, such as ENID:1 described herein, to User 1's device (or an error message is transmitted if the verification of the signature fails in operation 933). User 1's device receives and stores the group identifier in operation 939, and the group identifier can be transmitted with all messages in the conversation among members of the group (initially Users 1, 2, and 3). Other devices of User 1 can, in operation 939, also recover (e.g., download from the group server 924) the group blob so that these other devices of User 1 can send and receive messages in the conversation among the group (which is initially Users 1, 2, and 3). While FIGS. 9B, 9C, and 9D show that the identity server 922 and the group server 924 and the messaging server 930 are three separate server systems, it will be appreciated that, in alternative embodiments, these servers can be combined into two or one server depending on the needs or goals of the messaging system.

FIG. 9C shows operations performed in a messaging system when User 1, who created the messaging group of Users 1, 2, and 3, sends the first message to the group through the messaging system. FIG. 9C is a continuation in time of the operations shown in FIG. 9B. In operation 941, User 1's device sends the first message and the group blob to the messaging server 930, and the messaging server 930 transmits, in operation 943, multiple separate messages (with the group blob), one to each of Users 2 and 3 (User 2 934 and User 3 936). As a result of these multiple separate transmissions from the messaging server 930, each of Users 2 and 3 receive and decrypt the message (using the group blob) in operations 948 and 949 respectively if they are online at the time of transmission. Other devices of User 1 also receive and decrypt the message in operation 945 if those other devices (of User 1) are online at the time of the transmission from messaging server 930. To the extent one or more devices of Users 1, 2, or 3 are offline at the time of the transmission, the messaging server 930 can forward, in one embodiment, the message and group blob to cloud storage system 932 for temporary storage in operation 950, and each offline device can, when the device comes back online, retrieve the message and group blob from the temporary storage, which can be anonymized as in the example in FIG. 9A (e.g., anonymized individual message 916). As shown in operations 947, 953, and 955, each device of Users 1, 2, and 3 can determine when to synchronize their message transcripts with their private store (e.g., a private archive) in their cloud storage accounts, and this synchronization can occur in operations 951, 954, and 956 shown in FIG. 9C. In one embodiment, the methods and systems described relative to FIG. 6 can be used to perform this synchronization (e.g., operations 951, 954, and 956) for each device with a user's private cloud storage account or archive. This synchronization creates a backup copy in the user's private cloud storage account which can be used to restore an existing device that has been erased or used to initialize a new device by "migrating" old data to the new device of a user.

FIG. 9D shows operations performed in a messaging system when one of the users changes the members of a group; in the example shown in FIG. 9D, User 2 removes User 3 from the group. It will be appreciated that other changes could alternatively be made, such as adding one or more other users or adding a user and removing a user, etc. In each case, the user making the change becomes a sponsor for the group. In operation 960, User 2's device requests identity data from the identity server 922 which, in operation 962, retrieves and sends that data to User 2's device. User 2's device then, in operations 964 and 966, receives and verifies the identity data. User 2's device in operation 968 creates an updated group blob to replace the group blob created by User 1's device in operation 929, and the updated group blob is then sent to the group server 924 which performs a transactional update on the group blob in operation 970 and then sends to User 2's device an updated group identifier (e.g., ENID:2 or an error message if the update fails) in operation 972. User 2's device receives the updated group identifier in operation 974 (and other devices of User 2 can recover the group identifier and other data either from the group server 924 or from User 2's private cloud storage archive after User 2's device synchronizes with its private cloud storage). In operation 976, User 2's device can send a message to the group server 930 which delivers (transmits) the message to Users 1 and 3 about the change to the group; the group server 930 fan outs (transmits) the message to Users 1 and 3 (and to other devices of User 2) in operation 978. These messages are received by online devices in operations 986, 982 and 980, and offline devices of Users 1, 2, and 3 can receive the messages from temporary storage in the cloud storage system 932 after the messaging server 930 forwards the message in operation 984 to the temporary storage for each user (in, for example, the private anonymized temporary storage for each user). The devices of each user can also, in operations 988, 990, 991, 992, 994, and 996, synchronize the updated group blob to archives in cloud storage for the device (to the private storage of each user); operations 988, 994, and 996 are similar to operations 947, 953, and 955, and operations 990, 991, and 992 are similar to operations 951, 954, and 956.

Figure 10:
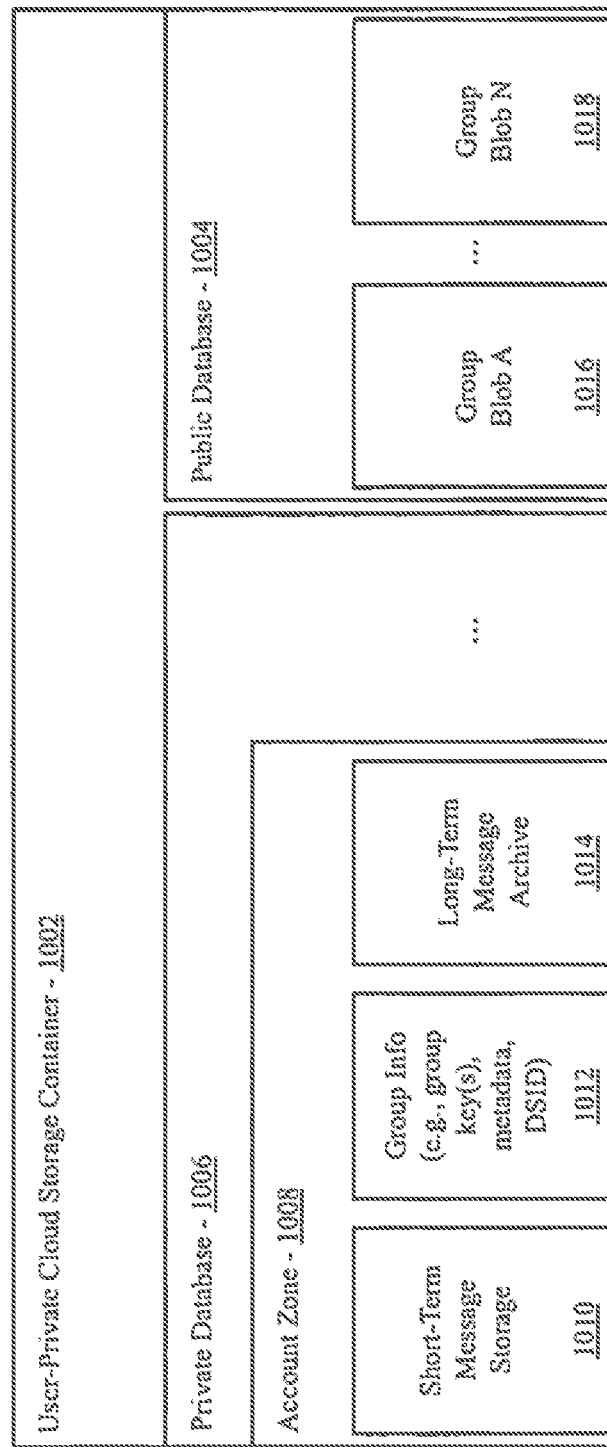
FIG. 10 is a block diagram of messaging system cloud storage, according to an embodiment.

FIG. 10 is a block diagram of messaging system cloud storage 1000, according to an embodiment. As shown in FIG. 9A and also FIGS. 9B-9D, cloud storage (e.g., cloud storage 906 or cloud storage 932) is used to store several pieces of data for the messaging system. To store messaging data on the messaging system cloud storage 1000, a user-private cloud storage container 1002 can be used. The user-private cloud storage container 1002 is a storage container that is encrypted using encryption keys that are not known to the cloud storage provider. Accordingly, any data stored in the user-private cloud storage container can only be accessed via an authorized user account and cannot be accessed by a system or agent of the cloud service provider or any third-party cloud storage vendors associated with the cloud service provider, such as a vendor associated with the data store 330 as in FIG. 3B.

Within the user-private cloud storage container 1002 is a public database 1004 and a private database 1006 in one embodiment. The public database 1004 stores one or more encrypted group blobs (group blob A 1016 through group blob N 1018) that can be accessed by a group server and/or other members of a group. The data of an encrypted group blob in one embodiment can only be decrypted by the current members of the group associated with the group blob. The private database 1006 includes an account zone 1008 that stores messaging system account data for the user of the account. The messaging system account data includes short-term message storage 1010 (which can be the same as short term storage 916), a long-term message archive 1014 (which can be the same as archive 926), and group information 1012 that is used to access group blobs.

The short-term message storage 1010 can include a set of database records that track message data for messages that could not be immediately delivered to a device. Each record tracks a single message. Storing the messages individually allows an offline device to easily receive messages once the device returns online. Additionally, the messages can be delivered to the device in the specific order in which the messages were received. The long-term message archive 1014 store in one embodiment messages as constant size blocks by padding or subdividing the stored messages. The constant size blocks of the archived messages are integrity protected to preserve the fidelity of the messages. Using constant size messages in the archive mitigates privacy risks associated with the long-term storage of the individual records associated with the message. Otherwise, sequence or metadata of individual records may be used to correlate the activity of various users and establish a social graph connection between those users. The account zone 1008 also includes group information 1012 that is used to access group blobs, such as one or more group key(s), metadata (e.g., diversified message UUID or Record ID), and a directory service identifier (DSID), which is a unique or quasi-unique identifier associated with an account. In one embodiment the DSID is be configured to be strictly unique. In one embodiment, the cloud storage account for a user can store only one instance of an asset for the account rather than storing multiple instances of the asset where each of the multiple instances is for one of the user's multiple devices that use the cloud storage account; for example, if the user has three (3) devices (a smartphone, a tablet computer, and a laptop computer) that use the cloud storage account, then rather than storing three instances of an asset (e.g. a photo or text document), where each of the three instances is for one of the three devices, the cloud storage account stores only one instance of the asset, and this can be done for all assets that the user stores on the cloud storage account.

Server Infrastructure

Figure 11:
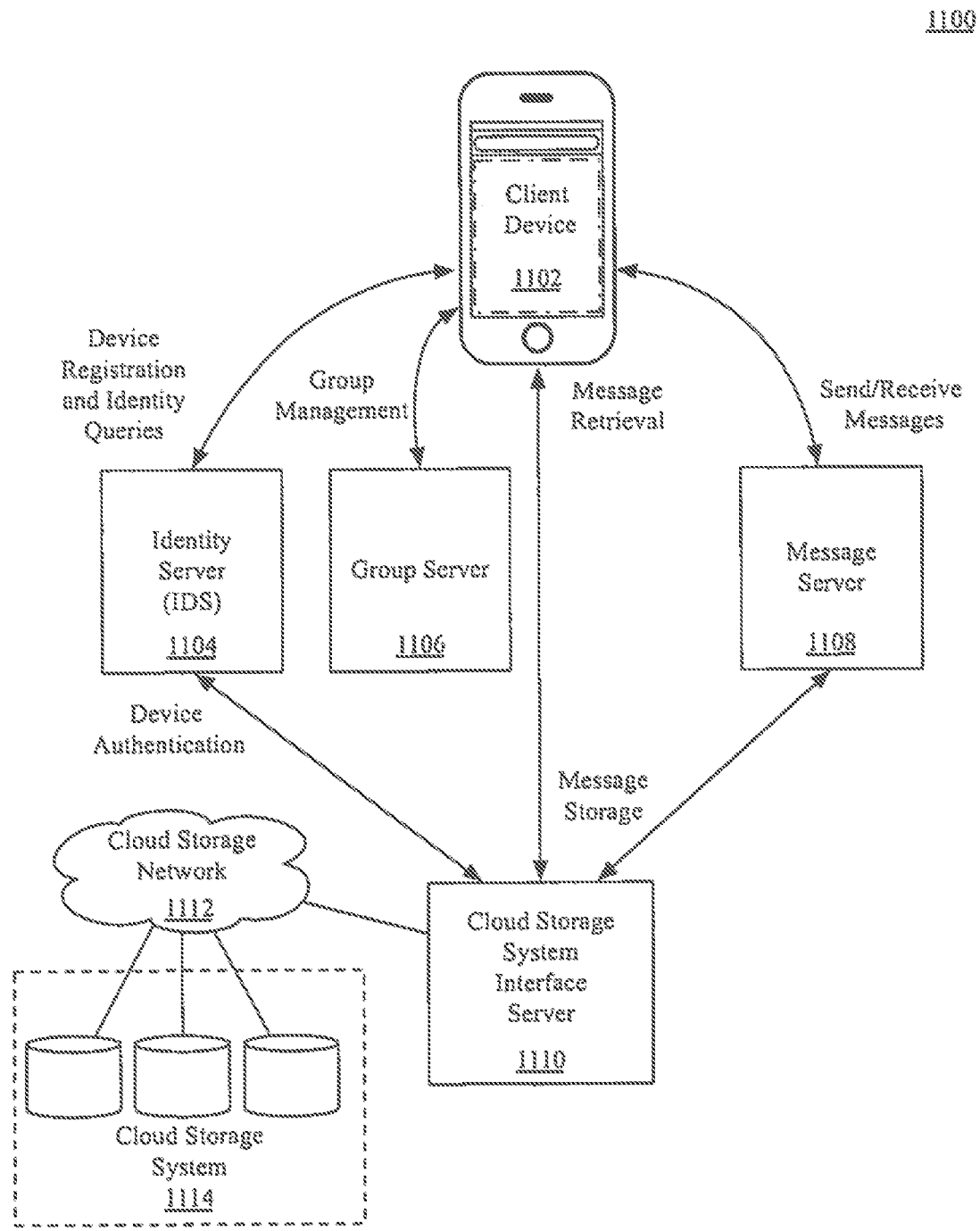
FIG. 11 illustrates an exemplary server infrastructure, according to an embodiment.

FIG. 11 illustrates an exemplary server infrastructure 1100, according to an embodiment. The message system described herein can use multiple servers to enable seamless transmission of encrypted messages and attachments. The servers can include one or more identity servers 1104, one or more group servers 1106, one or more message servers 1108, and one or more cloud storage system interface servers 1110. A client device 1102 of a user can register the device with the online account by uploading a set of long-term device keys to an identity server 1104. The identity server 1104 then associates the client device with the online account. The identity server 1104 can verify that the device is a legitimate device using device specific authentication keys associated with the device.

The group server 1106 can assist with group management for message groups. A cloud storage system can use a set of multiple group servers, where group server 1106 is one of several group servers in the set. To enable messaging between a group of users, a group key for the group is created in one embodiment. The device that creates the group is the group sponsor and sponsors the creation of the group via the group server 1106 in one embodiment. The group server 1106 can store an anonymous blob containing the cryptographic material that allows the members of the group to recover the group key. Once a group blob for the group has been created and accepted by the group server 1106, the group blob is sent to all the devices involved in the group, to allow the devices to derive the group key.

Subsequent changes to the group, such as membership changes, are also performed via the group server 1106 to ensure group changes are atomic. In the event that multiple group members attempt to change a group, the group server 1106 coordinates the changes. The coordinated changes are then propagated to the group members. If a member does not have the current state of a group, attempted group changes from the member will be rejected until the member receives the updated group information. Additionally, the group server 1106 enables garbage collection of group blobs. A locked group blob can be garbage collected, as the locked group blob indicates that the group has moved on to a new group blob.

The message server 1108 enables instantaneous encrypted messaging between online client devices. In the event a receiving device is offline or message delivery cannot be verified, the message server 1108 can temporarily store the message to a cloud storage system. The message server 1108 can be configured to re-encrypt the encrypted message and attachments before storing the message to create an anonymized encrypted message to prevent an adversary having access to the cloud storage system from generating a social graph between users based on the presence of identical encrypted messages within the cloud storage accounts of the users.

The cloud storage system interface server 1110 provides an interface mechanism for the client device and the message server 1108 to access cloud storage associated with the online accounts of users that send messages via the messaging system. The cloud storage system interface server 1110 connects to a cloud storage network 1112 that abstracts a distributed cloud storage system 1114. The cloud storage system 1114 can be a single cloud storage system from a single storage provider or can be a collection of multiple cloud storage systems managed by multiple cloud storage providers. The cloud storage system interface server 1110 can communicate with the identity server 1104 to retrieve key material that is used to authenticate an account and client device before access is granted to the cloud storage associated with the account. The cloud storage system interface server 1110 can also enable short term message storage for the message server 1108 and long-term message storage for the client device 1102. Short-term message storage is provided to the message server 1108 in the event a receiving device cannot be reached to deliver a message. These undelivered messages can be stored in a private database associated with the user account that is to receive the message. The client device can then retrieve the messages when the client device is online. Long term message storage can be provided to the client device in the form of device backups and both messages and attachments of the user's cloud storage account can be anonymized by re-encrypting as described herein. The messages stored on the client device can be aggregated and stored within an account specific cloud storage location within the cloud storage system. The aggregation can be performed by the client device 1102, the cloud storage system interface server 1110, or the cloud storage system.

Message Transmission Logic

Figure 12:
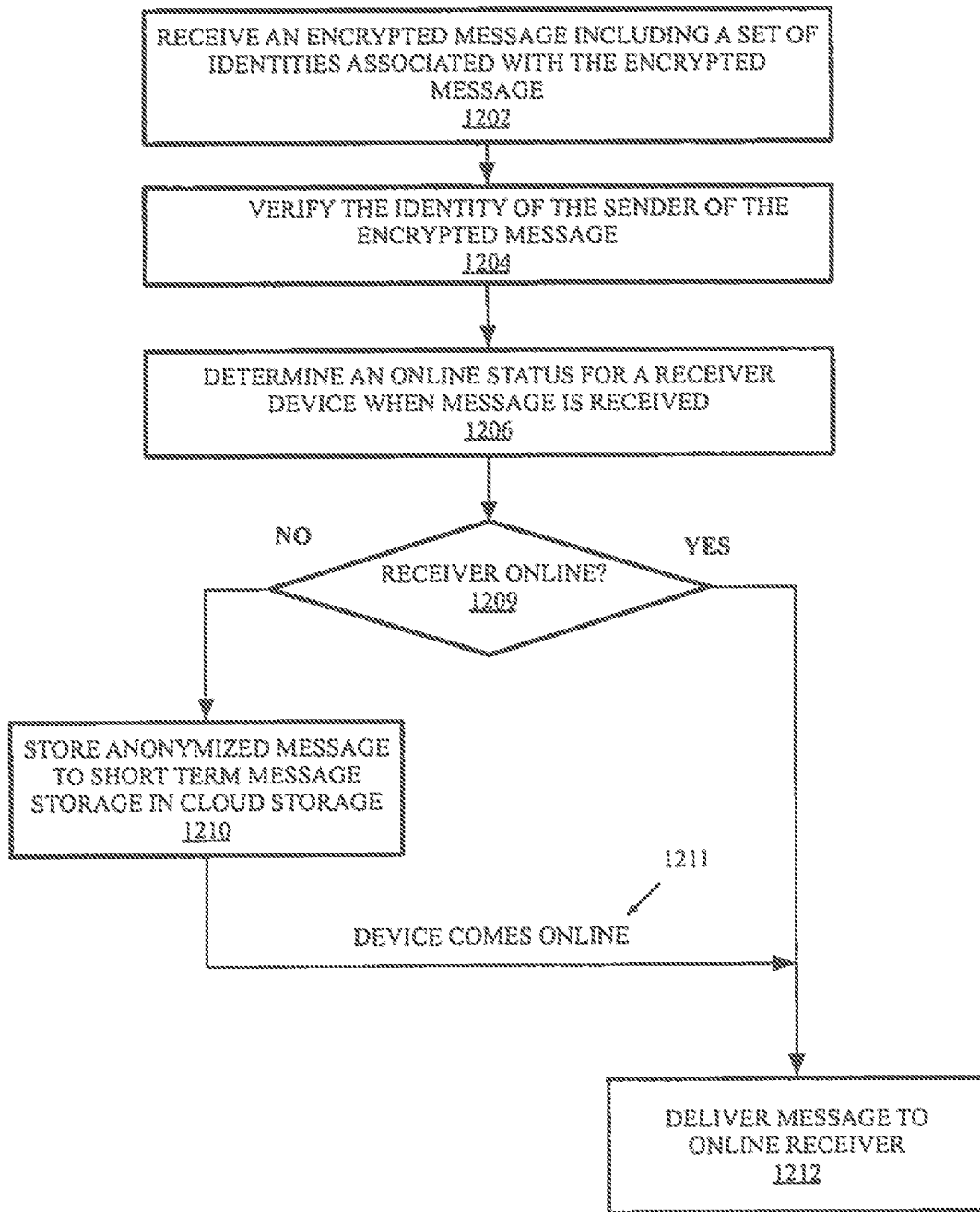
FIG. 12 is a flow diagram of message transmission logic 1200, according to an embodiment.

FIG. 12 is a flow diagram of message transmission logic 1200, according to an embodiment. The message transmission logic 1200 can be performed by a message server, such as the message server 1108 in FIG. 11 and/or the message server 904 in FIG. 9. The message transmission logic 1200 can configure the message server to receive an encrypted message including a set of identities associated with the encrypted message, as shown at 1202. The identities associated with the encrypted message include the sender of the message and each intended recipient of the message. The message transmission logic 1200 can configure the message server to verify the identity of the sender of the encrypted message to ensure that the message has not been tampered with during transmission to spoof a different sender. The message transmission logic 1200 can then determine an online status for a receiver device when message is received, as shown at 1206. If the receiver is online, as determined at 1209, the message transmission logic 1200 can deliver the message to the online receiver, as shown at 1212. If the receiver device is not online, the message transmission logic 1200 can store anonymized message to short term message storage in cloud storage, as shown at 1210. When the offline device comes online (1211), the message transmission logic 1200 can deliver the message to online receiver, as shown at 1212.

Privacy Protection for Stored Assets

Although the message and asset data described herein is encrypted to protect the privacy of the messaging participants, an adversary having access to a storage volume on the cloud storage system may be able to generate a social graph between users by correlating the encrypted data stored in the cloud storage system. For example, if a sender encrypts an asset (e.g., a photo, video, image data, or other document attached as an attachment to a message) to send to a recipient, the encrypted asset may be uploaded to a cloud storage system for distribution to the recipient. Additionally, the sending and the receiving devices may be configured to perform periodic backups to the cloud storage system. These periodic backups can also include the encrypted message and/or asset data that is exchanged between the sender and the receiver. Should an adversary gain possession of the private user databases hosting the message and backup data of the sender and receiver, the presence of the same encrypted data can be used to link the sender and the receiver within a social graph. This privacy vulnerability may be exacerbated where the cloud service provider contracts with third party hosting services to host a portion of the user databases, such as the data store 330 as in FIG. 3.

To preserve user privacy, some embodiments described herein use a single uploaded instance of each asset along with server side management of reference counting for the asset. In such embodiments a user cloud database maintains an access record including an encrypted reference to the asset and cryptographic material used to gain access to the asset. To access or delete the file, a participant (e.g., sender or receiver) presents user credentials that can be verified by the server based on the access record in the participant's private database. Each receiver and sender can download the attachment at any point after the asset is uploaded. For example, to restore messages on new device. Deletion by any participant does not impact the ability by other participants to download the content in the future.

Additionally, a malicious participant cannot prevent other participants from downloading the asset once the asset is uploaded by the sender. To delete an asset, a participant can delete the cryptographic material used to recover the asset. The deletion is a cryptographic deletion, such that neither the user, the cloud service provider, nor any associated storage vendors can recover the cryptographic material used to access or recover the asset. Furthermore, although the asset is not stored directly within the user cloud database, the size of the asset is applied to the user for storage quota computation. Additionally, garbage collection of asset data can be performed in response to user initiated asset deletion, although garbage collection may not be required in response to a server initiated deletion.

The single upload technique has several privacy and security benefits. Data at rest within the cloud storage system cannot be used to link users having access to the same asset. Having access to encrypted data cannot be used to confirm whether a user has access to particular plaintext. Read, write, and deletion access rights to an asset is verified before access is allowed. The access verification process is replay protected to prevent capture and re-play of an authorized access. Furthermore, the underlying data of the asset and the originator of the asset is authenticated. Asset data cannot be surreptitiously supplemented, modified, or otherwise altered after upload and the originator of the asset cannot be changed after upload. A reference count is used to determine the number of references that exist for an asset. However, the reference count is anonymous and does not provide a method to determine which users hold references to an asset.

As an alternative to the single asset upload technique, some embodiments described herein enable server side re-encryption of stored asset data based on client-side key material. In such embodiments, assets sent between users, for example, as message attachments, can be stored in an encrypted format on the cloud storage system. In addition to the encryption applied by the sender or originator of the asset, additional server side re-encryption can be performed on the asset, such that the stored ciphertext for the same asset will differ across users. The server side re-encryption can be performed using keys derived from client side key material, such that the client devices can derive the encryption keys used to access the re-encrypted assets.

Figure 13:
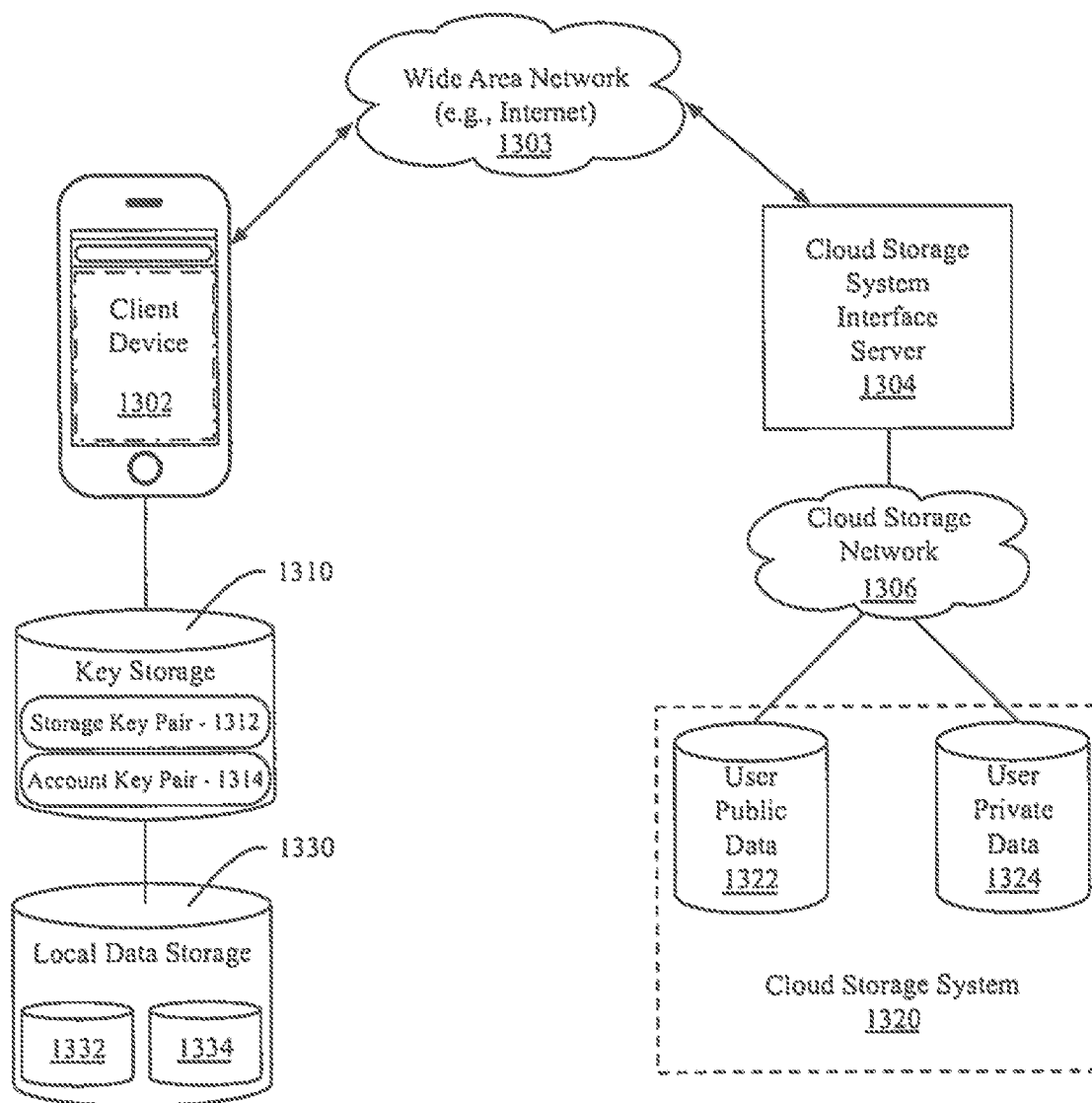
FIG. 13 illustrates a system that can enable privacy protection for stored assets, according to embodiments.

FIG. 13 illustrates a system 1300 upon which privacy protection for stored assets can be enabled, according to embodiments. In one embodiment the system 1300 shares common aspects with the operating environment 100 of FIG. 1, the system 200 of FIG. 2, and the exemplary server infrastructure 1100 of FIG. 11, in which a client device 1302 accesses network and/or cloud-based systems via a wide area network 1303, such as the Internet. As illustrated, the client device 1302 can access a cloud storage system 1320 via a cloud storage system interface server 1304. The cloud storage system 1320 can be abstracted behind a cloud storage network 1306. At least a portion of the cloud storage system 1320 can be hosted on storage devices or servers provides via a third-party storage vendor. For each user account, the cloud storage system 1320 can store user public data 1322 and user private data 1324. The user public data 1322 and user private data 1324 can be configured similar to the containers, databases, and zones illustrated in FIGS. 3A-B, although embodiments are not limited to any specific storage configuration.

The client device 1302 includes key storage 1310 that can contain various forms of cryptographic key material, including a storage key pair 1312 and an account key pair 1314. In one embodiment the storage key pair 1312 is an asymmetric encryption key pair that is used to encrypt and decrypt data to be stored within the cloud storage system 1320, while the account key pair 1314 is used to generate and verify signatures for the account. The client device 1302 also includes local data storage 1330. In one embodiment the local data storage includes a local public 1332 and private 1334 data that can be synchronized with the user public data 1322 and user private data 1324 of the cloud storage system.

The system 1300 can be used to implement privacy protection for stored assets using either a single upload of an asset with distributed reference counting or via server side re-encryption using client side key material. In the case of server side re-encryption, there can be an instance of the asset in each cloud storage account that received the asset which can be an attachment to a message.

Single Upload of Assets

Figure 14A:
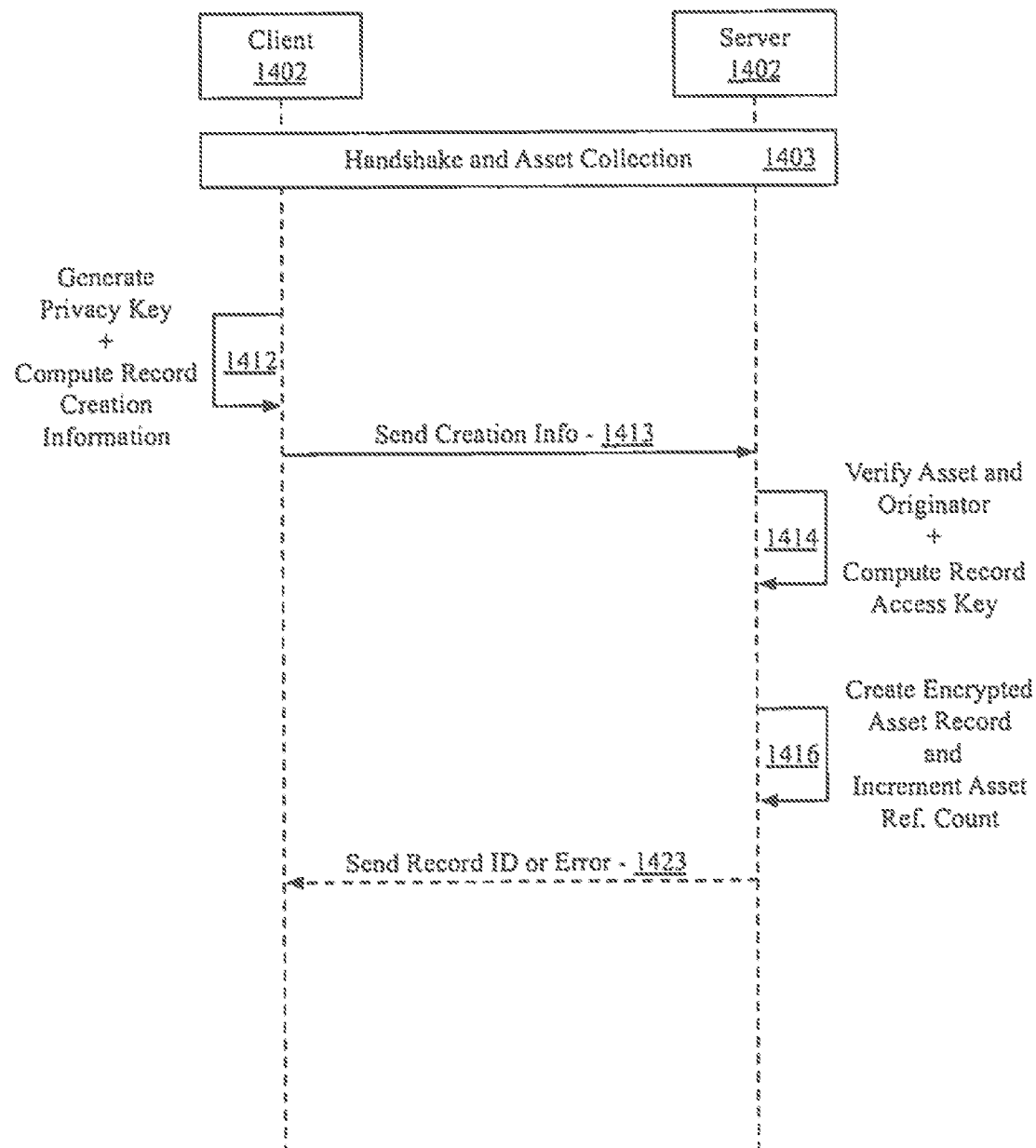
FIG. 14A-C illustrate sequences for creating, reading, and deleting records associated with a single upload of an asset, according to an embodiment.
Figure 14B:
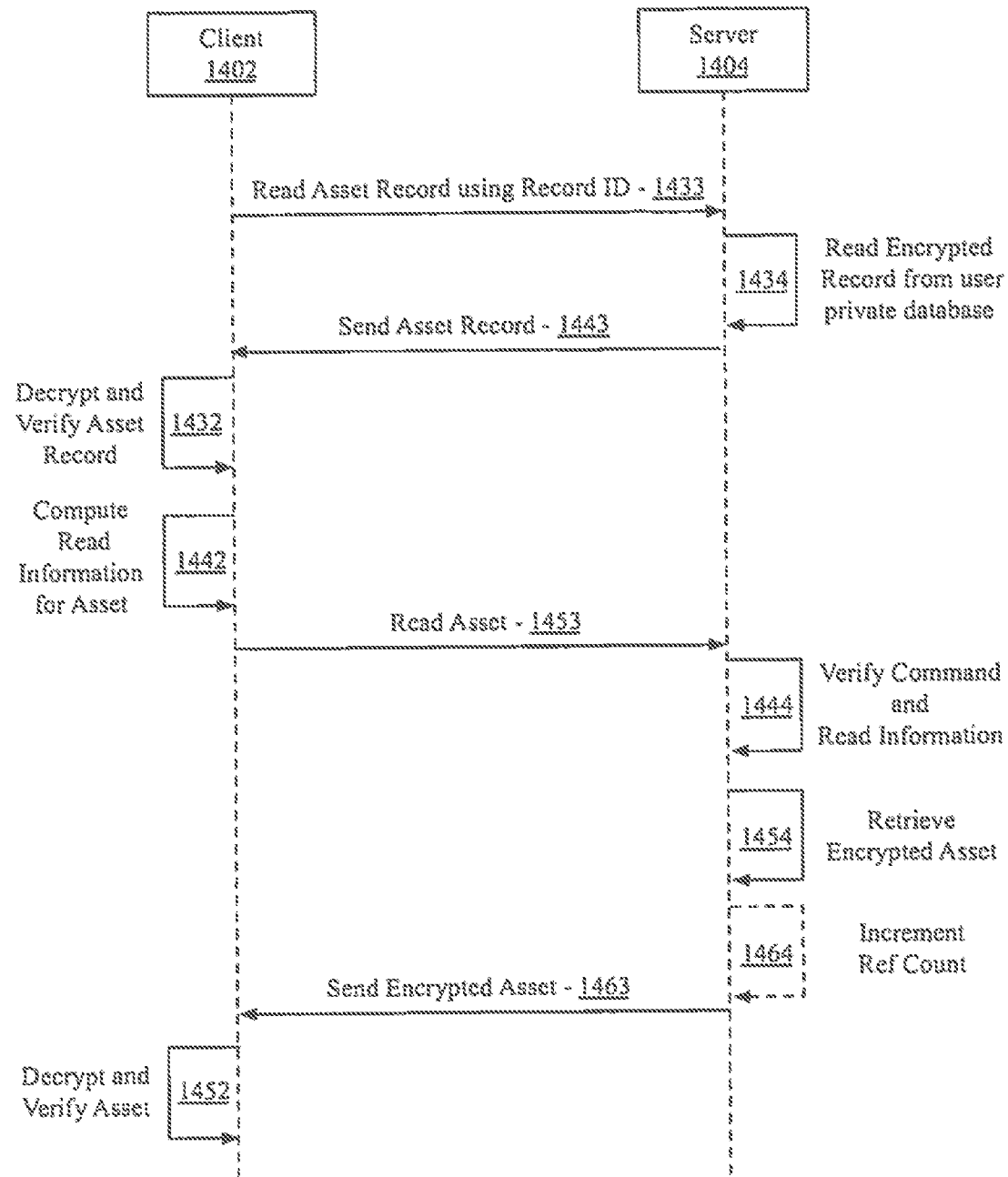
Figure 14C:
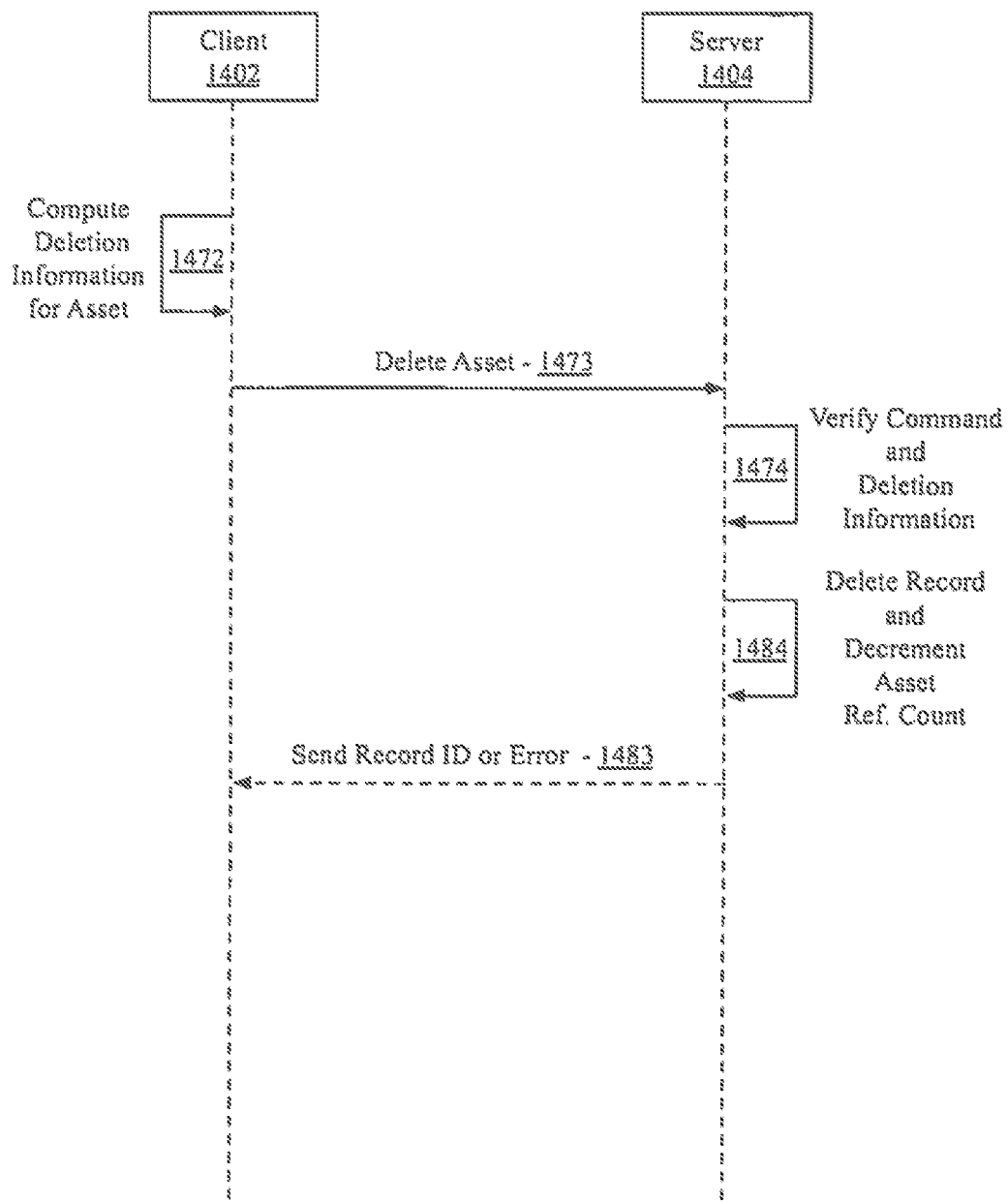

FIG. 14A-C illustrate sequences for creating, reading, and deleting records associated with a single upload of an asset, according to an embodiment. A single encrypted instance of an asset is stored and the cloud storage system provides encrypted access records to enable access to the asset. The sequence is illustrated and described with respect to a client 1402 and a server 1404, which can be variants of the client device 1302 and cloud storage system interface server 1304 of FIG. 13.

As shown in FIG. 14A, a client 1402 is in communication with a server 1404 for the cloud storage system. The client 1402 can be any client device as described herein. In one embodiment the server 1404 is a variant of the cloud storage system interface server 1110 as in FIG. 11. The server 1404 enables the client 1402 to access cloud storage for a cloud storage account associated with the user of the client 1402. A handshake and asset collection (1403) occurs between the client 1402 and the server 1404. During the handshake the client and the server are mutually authenticated to verify that both the client device and the server devices are authentic. This process can be performed via a variety of methods including but not limited to device and server keys and/or certificates that enable signature authentication to be performed between the client and the server. Once the client and the server are mutually authenticated via the handshake, the asset collection occurs in which the client uploads an asset to the server 1404. The asset collection upload is the single upload that occurs for the asset. In one embodiment the asset is uploaded to a public cloud storage database associated with a user account on the client 1402. In such embodiment the client encrypts the asset before upload.

The client 1402 then generates a privacy key and computes record creation information (1412) to enable the server 1404 to create a record that enables retrieval of the asset. The privacy key is used to protect the privacy of user by preventing the creation of a cryptographic oracle that enables a user to be tied to a specific asset. The privacy key also prevents a sender or originator of an asset to be tied to a receiver of the asset based on record data for the sender, originator, and/or receiver that is stored in the cloud storage system. The record creation information includes one or more signatures that can be used to verify the asset and the originator and may be used to create a database record that identifies the location of the asset. The database record can also contain information to verify the authenticity and integrity of the asset. The database record also enables the asset to be securely and privately associated with specific accounts, for example, to enable verification of the originator of the asset.

The client 1402 can then send the creation information (1413) to the server 1404. The server 1404 then verifies the asset identified by the creation information and the originator of the asset (1414) by verifying account signatures included in the creation information. Once the asset and the originator are verified, the server 1404 can create a key that can be used to decrypt the record. The record can then be created and a reference account associated with the asset can be incremented (1416). The record can then be encrypted and stored in a private database associated with the cloud storage account of the user of the client 1402. In one embodiment the creation of the record and the incrementing of the asset reference count is performed as an atomic operation. A record ID or an error (1423) is then sent to the client 1402. If the record creation was successfully performed a record identifier can then be returned to the client 1402. The record identifier can be used to access the database record for the asset. The database record can then be decrypted by an authorized client for use in accessing the asset.

As shown in FIG. 14B, the record for the asset can be stored in an encrypted format in a private cloud database associated with each user account that has access to the asset. The record can be specifically encrypted for each account, such that the multiple references to the same asset will have different and user specific cipher text. The client 1402, which can be an originator or recipient of a message, can access the database record for an asset by sending a command to the server 1404 to read an access record using the record ID (1433).

The server 1404, in response to the command, can read the encrypted record for the asset (1434) from the private cloud database associated with the user account and return the encrypted asset record to a client device that is associated with the user account. The client 1402 can then decrypt and verify the asset record (1432) and, using the asset record, compute the appropriate read information for the asset (1442) that is used to access the asset from the server. The read information can include information including but not limited to signatures used to verify the account that is requesting access to the asset, the specific command to perform on the asset (e.g., read), timestamps associated with the command to prevent replay attacks, as well as cloud storage system specific keys that are used to access the specific cloud storage location that is used to store the asset. The client 1402 can then send a read asset command (1453) to the server 1404 that includes the computed read information for the asset. The server 1404 can verify the authenticity of the command and the read information supplied with the command (1444) and, upon verification of the command and read information, can retrieve the encrypted asset (1454). If the server 1404 determines that the read command is from a recipient of the asset the server 1404 can increment the reference count (1464) to indicate that an additional reference to the asset is outstanding. The server 1404 can then send the encrypted asset (1463) to the client 1402. The client 1402 can then decrypt the asset and verify the authenticity of the asset (1452).

FIG. 14C illustrates a process to "delete" an asset. A client 1402 cannot directly delete an asset, but merely delete the record used to access the asset. Once the reference count of an asset falls to zero, the server 1404 can perform the deletion process for the asset. To delete a record used to access an asset, a client 1402 can compute deletion information for the asset (1472). The deletion information can be similar to the read information, excepting that the deletion information specifies a deletion command instead of a read command. The client 1402 can send a deletion command to the server 1404. The server 1404 can verify the authenticity of the deletion command and the deletion information (1474) that is used to identify the record to be deleted. Once the deletion command and the deletion information is verified, the server can delete the record used to access the asset from the private cloud storage database associated with the user and decrement the reference count for the asset (1484). The deletion of the record and the decrementing of the reference count can be performed as an atomic operation. Furthermore, the deletion of the record can be a cryptographic deletion, such that the user, the cloud service provider, or any associated storage vendors will not be able to recover the record after deletion. The server 1404 can then send the record ID of the asset or an error notice (1483). The server 1404 can send the record ID with a success notification to the client 1402. If the command was not successful, an error notice can be returned to the client 1402.

Figure 15:
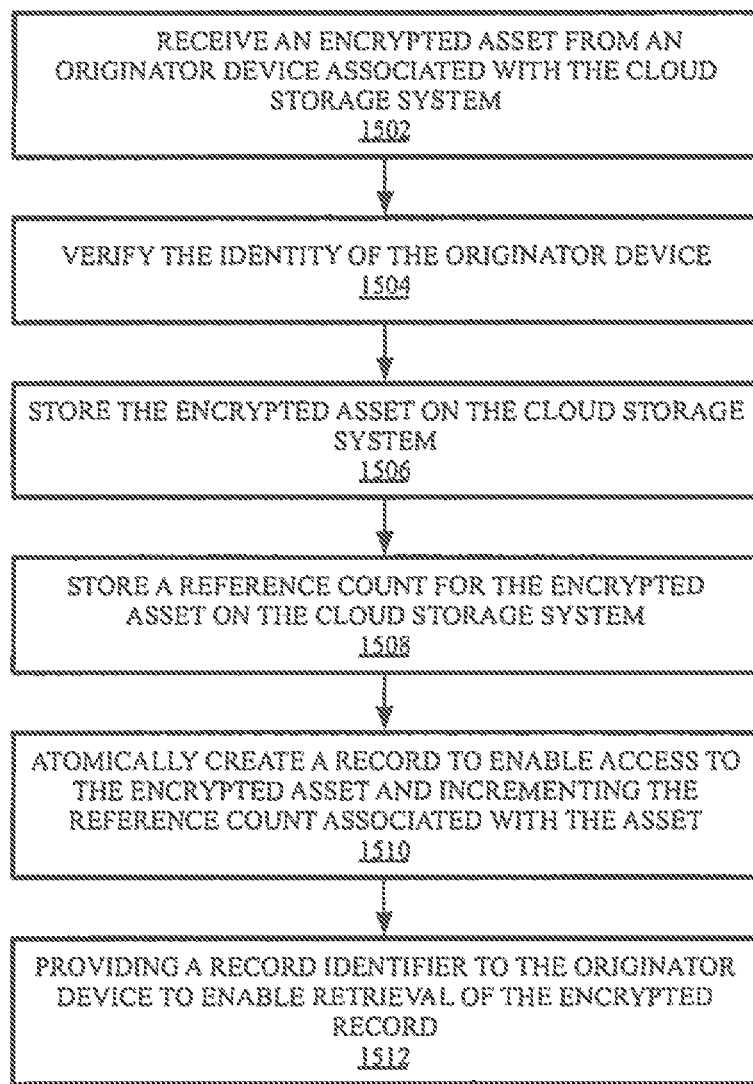
FIG. 15 illustrate logic to enable multi-user access to a single uploaded instance of an asset, according to an embodiment.

FIG. 15 illustrates logic 1500 to enable multi-user access to a single uploaded instance of an asset, according to an embodiment. The logic 1500 can be implemented on a server associated with a cloud storage system. Enabling the logic 1500 on the cloud storage server can prevent correlation between multiple users having access to an encrypted asset stored on a cloud storage system. In one embodiment the logic 1500 configures the server of the cloud storage system to receive a message from an originator device associated with the cloud storage system, as shown at 1502. The messages can include an encrypted asset and credentials for an online account that is associated with the cloud storage system. The credentials associated with the online account and enable the logic 1500 to verify the authenticity of the originator device at 1504. The logic 1500 can then store the encrypted asset on the cloud storage system, as shown at 1506. Storing the encrypted asset on the cloud storage system, in one embodiment, can include re-encrypting the asset before storage.

In one embodiment, in addition to storing the encrypted (or re-encrypted) asset on the cloud storage system, the logic 1500 can also store a reference count for the encrypted asset, as shown at 1508. The reference count can be used track the number of outstanding references to the asset. Once the number of references is decremented to zero, the asset may be deleted during a garbage collection operation. The logic 1500 can then perform an atomic operation to both create an encrypted record to enable access to the encrypted asset and increment the reference count associated with the asset, as shown at 1510. The logic 1500 can then provide a record identifier to the originator device to enable retrieval of the encrypted record, as shown at 1512. The encrypted record can enable multiple users to access to the encrypted asset without storing multiple instances of the encrypted asset on the cloud storage system.

Server Re-Encryption Using Client Key Material

As an alternative to using a distributed reference counting to achieve single asset upload, server side re-encryption can be enabled. The server side re-encryption can be performed using keys derived from client side key material, such that the client devices can derive the encryption keys used to access the re-encrypted assets.

Figure 16:
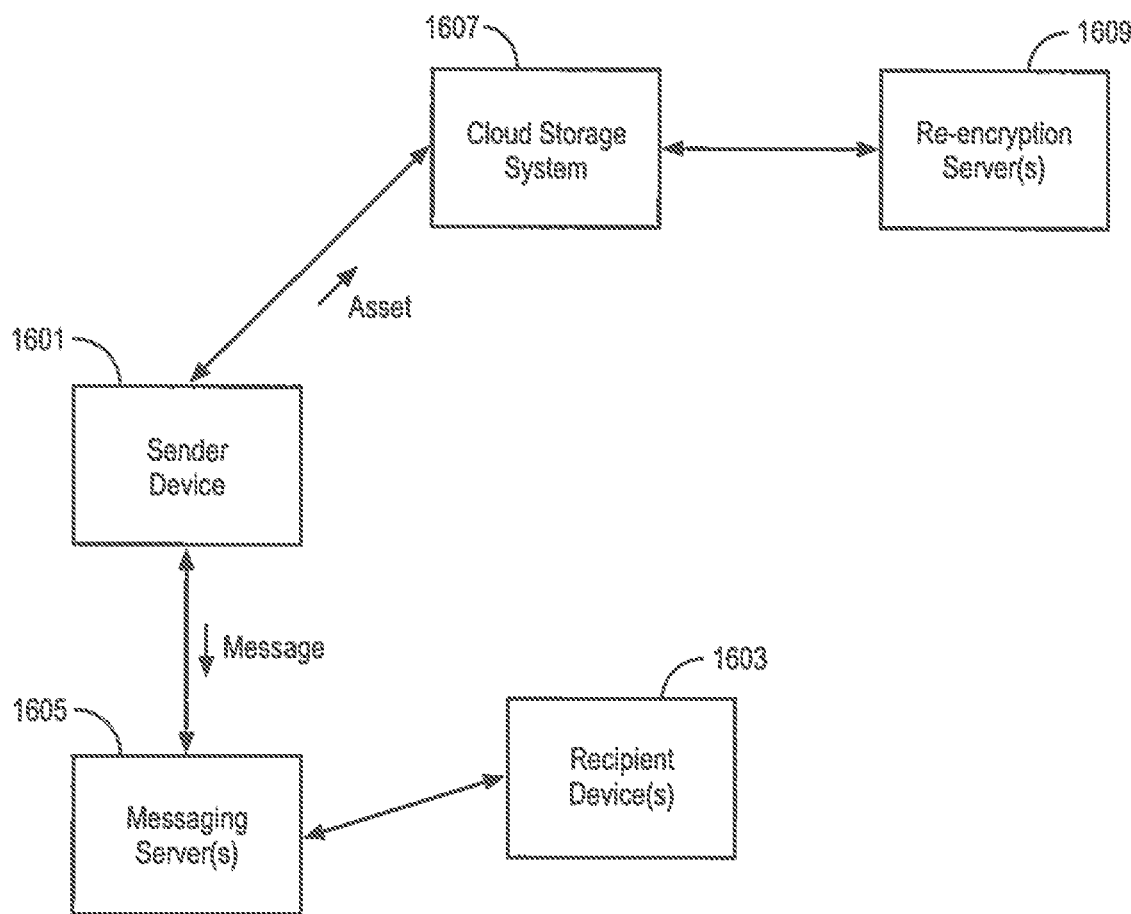
FIG. 16 illustrates a system for server-side re-encryption using client side key material, according to an embodiment.

FIG. 16 shows an example of a messaging system (such as iMes sage from Apple Inc. of Cupertino, Calif.) and a cloud storage system that can use server side re-encryption to anonymize data at rest in the cloud storage system so that the data (stored in the cloud storage system) does not leak social graphs (e.g. who communicates with whom, etc.). The messaging system and the cloud storage system shown in FIG. 16 can also use any of the one or more embodiments described herein to provide deduplication with boundary keys (e.g. FIG. 6) and anonymous group blobs (e.g. FIGS. 8A, 8B, 9A-9D, and 11) and other features and techniques described herein; thus, the messaging system and cloud system shown in FIG. 16 can also include one or more group servers (e.g. group server 1106) and one or more identity servers (e.g. IDS 1104). The sender device 1601 can create and send a message (e.g. an iMessage) along with an attachment (e.g. a photo) to a set of one or more recipients who use recipient devices 1603. The messages can be sent through one or more messaging servers 1605, which may use push notification to send the messages (and one or more URIs or URLs for one or more attachments) to online recipients as described herein; the offline recipients can, as described herein, receive their messages through, for example, an anonymized short term storage 916 ("transport zone") in the cloud storage system. The sender device 1601 also uploads the attachment (also referred to as an asset) to the cloud storage system 1607; the attachment can be associated with a URI or URL that is used by the recipient devices to retrieve the asset from the cloud storage system 1607. The message can include multiple attachments, each of which is processed as described herein. At some point, the assets associated with the message can be stored in the cloud storage account of each recipient as, for example, part of a backup operation in which the recipient device can upload the asset to the recipient's cloud storage (and the recipient device can also perform deduplication at this point). The uploaded asset can then be re-encrypted within each recipient's cloud storage account by the one or more re-encryption servers 1609 to anonymize the asset, so that data at rest in the various private cloud storage accounts cannot be used to create a social graph of users. In one embodiment, the re-encryption can use the method described in the Appendix under the heading: "Asset (e.g., Attachment) Processing and Re-Encryption."

Figure 17:
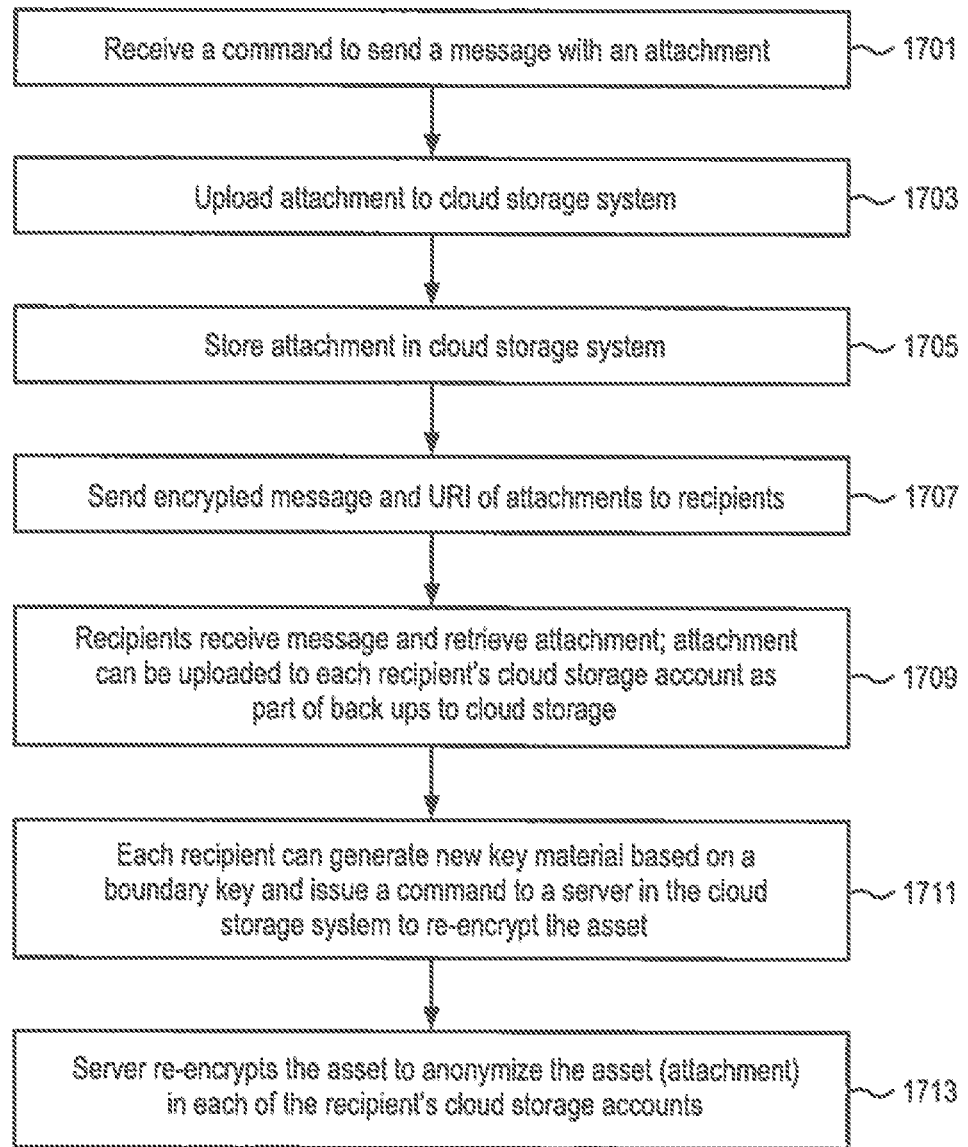
FIG. 17 illustrates a method to enable server-side re-encryption using client side key material, according to an embodiment.

FIG. 17 shows an example of a method that can be performed by the various devices in the messaging system and cloud storage system shown in FIG. 16. In operation 1701, the sender device 1601 can receive a command from the user of the sender device 1601 to send a message with one or more attachments (e.g. assets such as photos, etc.) to one or more recipients, such as recipient devices 1603. In operation 1703, the sender device 1601 uploads the one or more attachments (and a secret asset key to allow the attachment to be decrypted) to the cloud storage system (e.g. cloud storage system 1607); in one embodiment, the one or more attachments (and the secret asset key) can be encrypted by, for example, a random key that is provided with the message to each recipient (and the random key can be encrypted in one embodiment under the same encryption procedure described herein for the message). In operation 1705, the cloud storage system stores the asset so that recipient devices can retrieve the asset. In operation 1707, the one or more messaging servers send the encrypted message and the one or more URIs (Uniform Resource Identifiers) for the attachments to each online recipient (and offline recipients can receive the message in the manner described elsewhere in this description); operation 1707 may precede operation 1703 in one embodiment. In operation 1709, each recipient can receive the message and also retrieve the one or more attachments, and once retrieved, the attachments can then be uploaded to each recipient's cloud storage account (for example, they can be uploaded through a backup operation that backs up assets, including attachments, to the recipient's private cloud storage account). In operation 1711, each recipient can generate new key material (e.g., key material based on a boundary key such as a boundary key used for deduplication) and issue a command to a server (e.g. re-encryption server 1609) to re-encrypt the asset. Then in operation 1713, the server can re-encrypt the attachment in the recipient's private cloud storage account; this re-encryption can use the method described in the Appendix: "Asset (e.g. Attachment) Processing and Re-Encryption."

Exemplary Computing System Including Cryptographic Acceleration

Figure 18:
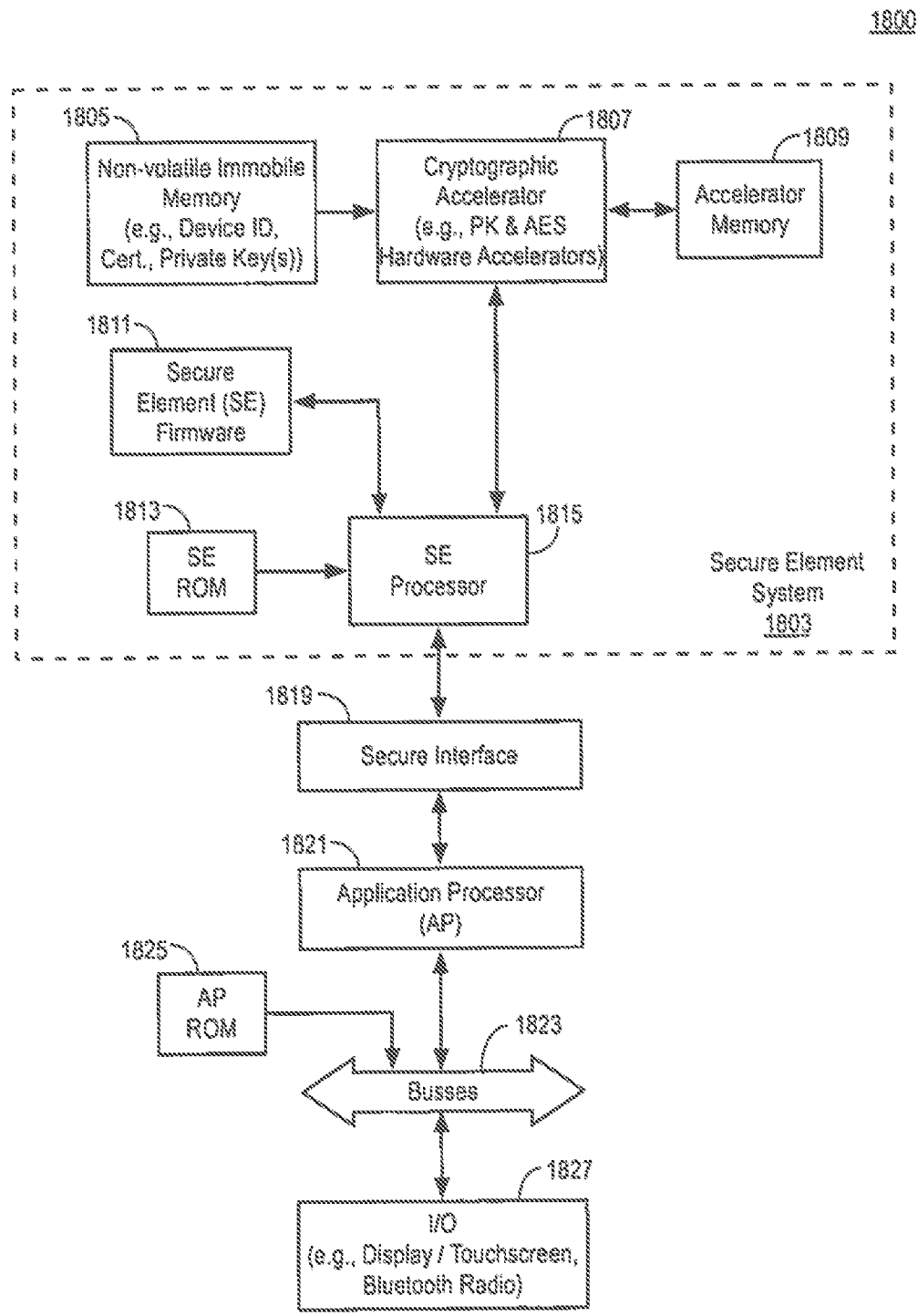
FIG. 18 shows an exemplary computing system, according to an embodiment.

FIG. 18 shows an exemplary computing system 1800, according to an embodiment. The computing system 1800 can enable a device to perform secure accelerated cryptographic operations. The computing system 1800 includes an application processor 1821 that is communicably coupled with a secure element system 1803 via a secure interface 1819. The computing system 1800 can be a portion of any of the client devices described herein. Additionally, the computing system 1800 can be included into one or more of the servers described herein. In one embodiment, the secure element system 1803 can be implemented as a system on chip. In another embodiment, the application processor 1821 and the secure element system 1803 can be implemented on a system on chip and include one or more processors and memory controllers and other components on a single integrated circuit.

The secure element system 1803 can perform cryptographic operations such as encrypting user files or verifying code signatures or processing user passcodes or performing other security operations by executing the software stored as firmware 1811 in the secure element system 1803. The firmware 1811 can store executable program instructions that execute on the secure element processor 1815 to provide the cryptographic operations or functions. The secure element processor 1815 can also be coupled to a secure element ROM 1813 which can be trusted software that can validate the software in the firmware 1811 before allowing that firmware to execute by checking a code signature of the firmware and verifying that the signature code indicates that the firmware is valid and has not been corrupted before allowing the firmware to be executed by the secure element processor 1815.

The secure element system 1803 can also include a cryptographic accelerator such as cryptographic accelerator 1807 which can perform asymmetric cryptography as well as symmetric cryptography using a hardware accelerator. The accelerator 1807 can be coupled to non-volatile and immutable memory 1805 which can store in a secure manner a device identifier or a set of device identifiers and a set of one or more certificates and private keys which are hidden from the rest of the system and are not readable by the rest of the system in one embodiment. The cryptographic accelerator 1807 has access to the private keys and other data within the memory 1805 and access to the memory 1805 is not allowed for components outside of the secure element system 1803. In one embodiment, the accelerator 1807 can be coupled to an accelerator memory 1809 which can be a scratch pad memory used to perform the cryptographic operations that are performed by the cryptographic accelerator 1807. The application processor 1821 can be coupled to one or more buses 1823 which are coupled to one or more input and output (I/O) devices 1827, such as a touchscreen display and a Bluetooth radio, etc. Other input and output devices can be included. The application processor 1821 is also coupled to an application processor ROM or read only memory 1825 that provides software to boot up the application processor. Similarly, the secure element ROM 1813 provides code to boot up the secure element processor 1815.

Application Programming Interfaces

Embodiments described herein include one or more application programming interfaces (APIs) in an environment in which calling program code interacts with other program code that is called through one or more programming interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables and/or use or instantiate constant values or pointers to constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 19:
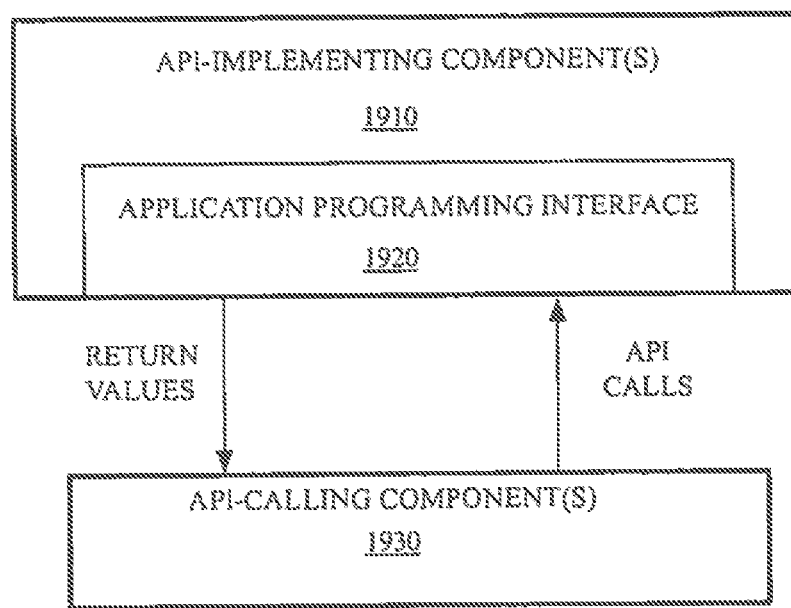
FIG. 19 is a block diagram illustrating an exemplary API architecture, which may be used in some embodiments.

FIG. 19 is a block diagram illustrating an exemplary API architecture, which may be used in some embodiments. As shown in FIG. 19, the API architecture 1900 includes the API-implementing component 1910 (e.g., an operating system, a library, a device driver, an API, an application program, software or other module) that implements the API 1920. The API 1920 specifies one or more functions, methods, classes, objects, protocols, data structures, formats and/or other features of the API-implementing component that may be used by the API-calling component 1930. The API 1920 can specify at least one calling convention that specifies how a function in the API-implementing component receives parameters from the API-calling component and how the function returns a result to the API-calling component. The API-calling component 1930 (e.g., an operating system, a library, a device driver, an API, an application program, software or other module), makes API calls through the API 1920 to access and use the features of the API-implementing component 1910 that are specified by the API 1920. The API-implementing component 1910 may return a value through the API 1920 to the API-calling component 1930 in response to an API call.

It will be appreciated that the API-implementing component 1910 may include additional functions, methods, classes, data structures, and/or other features that are not specified through the API 1920 and are not available to the API-calling component 1930. It should be understood that the API-calling component 1930 may be on the same system as the API-implementing component 1910 or may be located remotely and accesses the API-implementing component 1910 using the API 1920 over a network. While FIG. 19 illustrates a single API-calling component 1930 interacting with the API 1920, it should be understood that other API-calling components written in different languages (or the same language) than the API-calling component 1930 can use the API 1920.

The API-implementing component 1910, the API 1920, and the API-calling component 1930 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 20A:
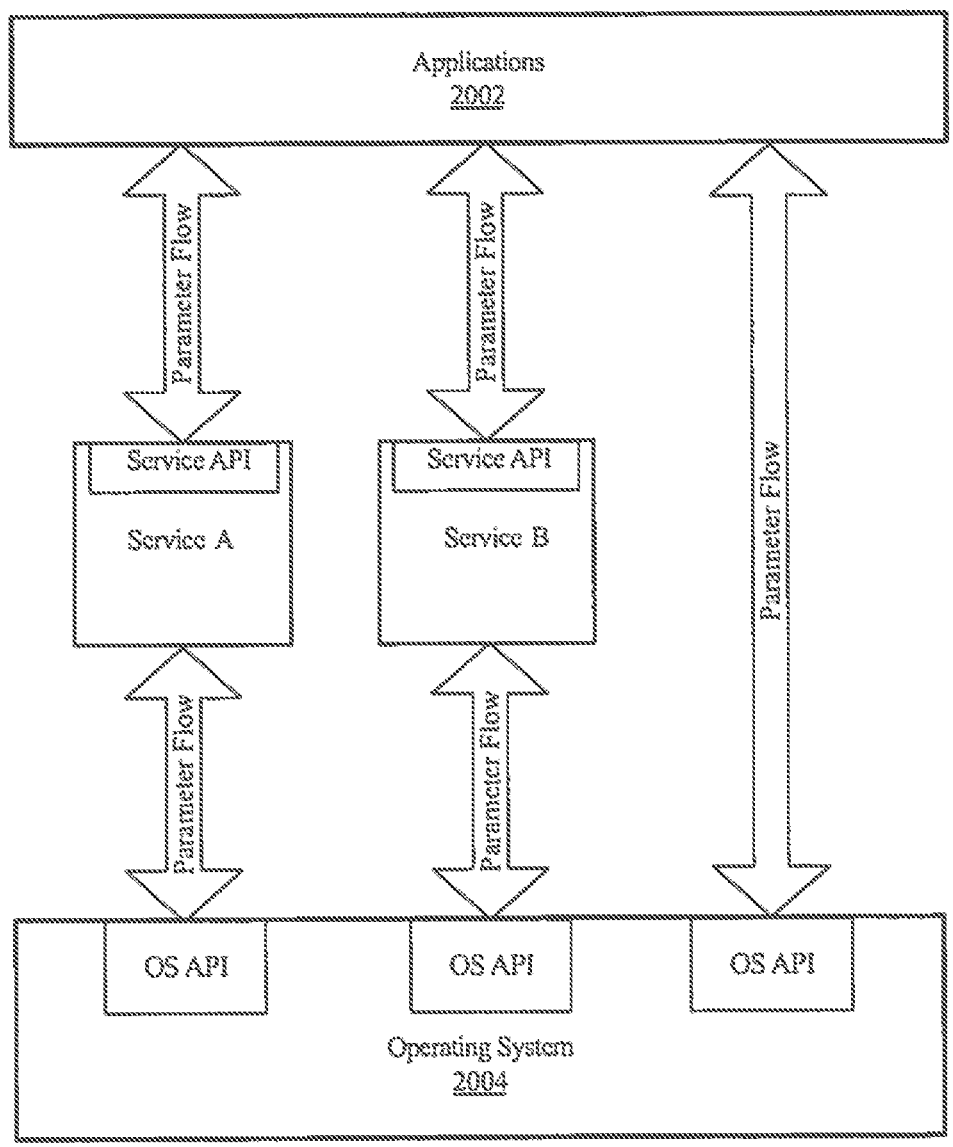
FIGS. 20A-B are block diagrams of exemplary API software stacks, according to embodiments.
Figure 20B:
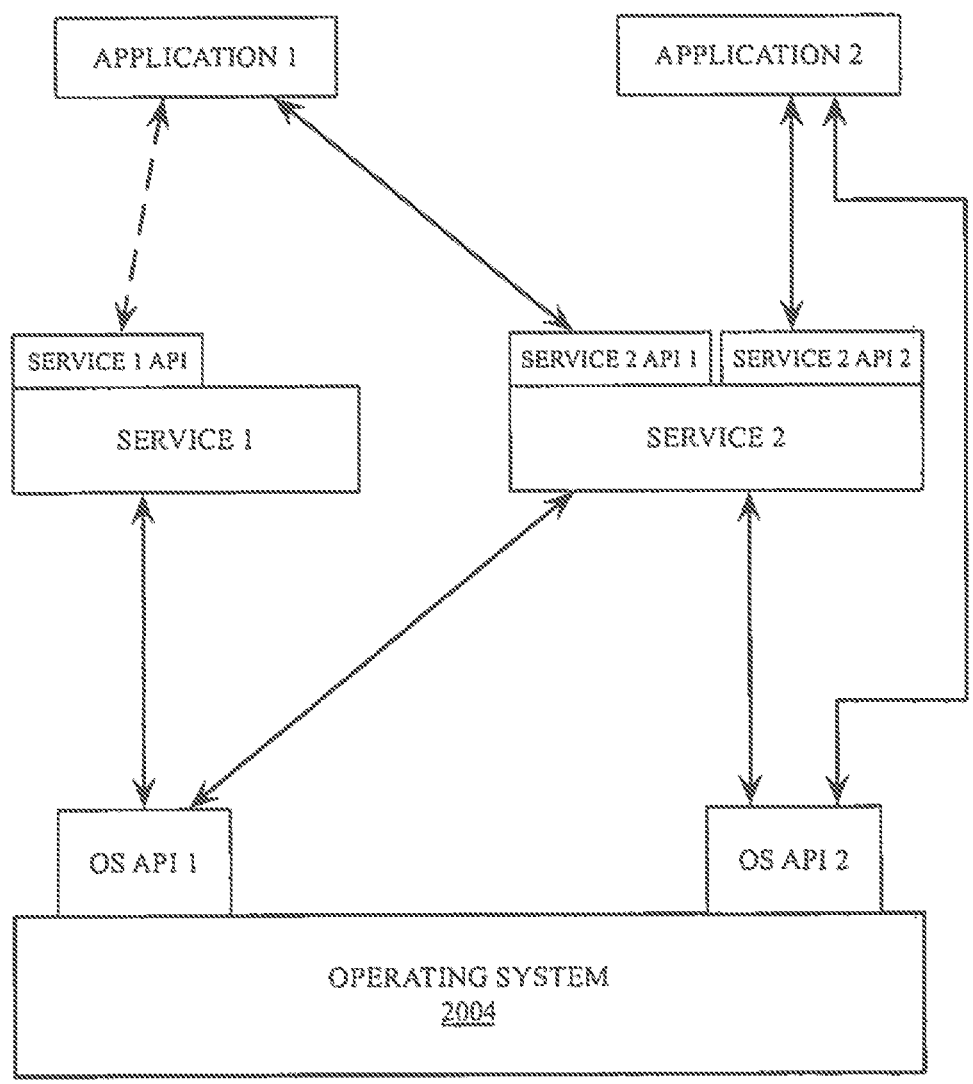

FIGS. 20A-B are block diagrams of exemplary API software stacks 2000, 2010, according to embodiments. FIG. 20A shows an exemplary software stack 2000 in which applications 2002 can make calls to Service A or Service B using Service API and to Operating System 2004 using an OS API. Additionally, Service A and Service B can make calls to Operating System 2004 using several OS APIs.

FIG. 20B shows an exemplary software stack 2010 including Application 1, Application 2, Service 1, Service 2, and Operating System 2004. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 21:
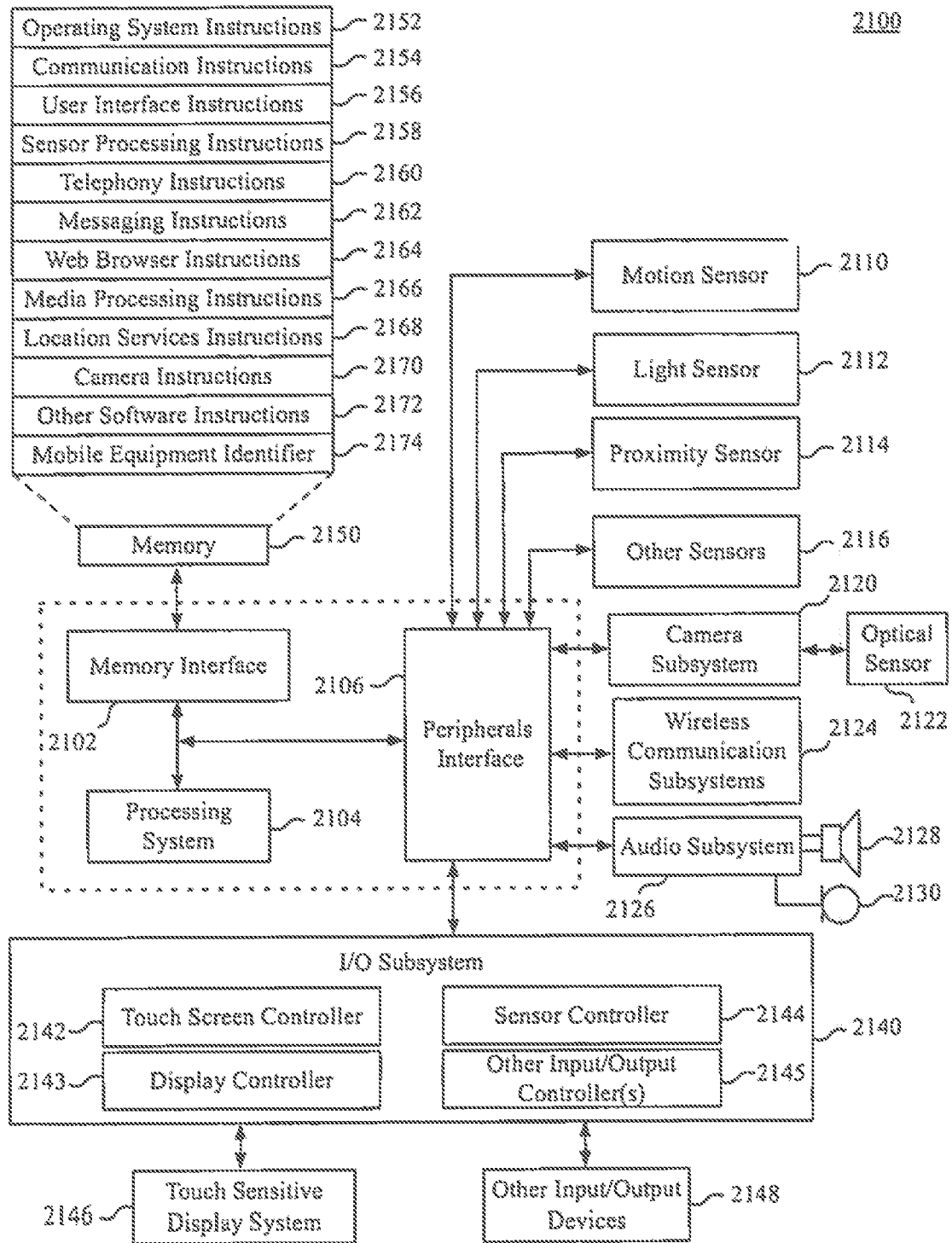
FIG. 21 is a block diagram of mobile device architecture, according to an embodiment.

FIG. 21 is a block diagram of mobile device architecture 2100, according to an embodiment. The mobile device architecture 2100 includes a include a memory interface 2102, a processing system 2104 including one or more data processors, image processors and/or graphics processing units, and a peripherals interface 2106. One or more communication buses or signal lines can couple the various components. The various components can be separate logical components or devices or can be integrated in one or more integrated circuits, such as in a system on a chip integrated circuit.

The memory interface 2102 can be coupled to memory 2150, which can include high-speed random access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 2106 to facilitate multiple functionalities. For example, a motion sensor 2110, a light sensor 2112, and a proximity sensor 2114 can be coupled to the peripherals interface 2106 to facilitate the mobile device functionality. Other sensors 2116 can also be connected to the peripherals interface 2106, such as a positioning system (e.g., GPS receiver), a temperature sensor, a biometric sensor, or other sensing device, to facilitate related functionalities. A camera subsystem 2120 and an optical sensor 2122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2124, which can include radio frequency receivers and transmitters and/or optical (e.g., infrared) receivers and transmitters. The specific design and implementation of the wireless communication subsystems 2124 can depend on the communication network(s) over which a mobile device is intended to operate. For example, a mobile device including the illustrated mobile device architecture 2100 can include wireless communication subsystems 2124 designed to operate over a GSM network, a CDMA network, an LTE network, a WiFi network, a Bluetooth network, or any other wireless network. In particular, the wireless communication subsystems 2124 can provide a communications mechanism over which a client browser application can retrieve resources from a remote web server.

An audio subsystem 2126 can be coupled to a speaker 2128 and a microphone 2130 to facilitate voice-enabled functions, such as voice recognition, voice replication, digital recording, and telephony functions.

The I/O subsystem 2140 can include a touch screen controller 2142 and/or other input controller(s) 2145. The touch screen controller 2142 can be coupled to a touch sensitive display system 2146 (e.g., touch screen). The touch sensitive display system 2146 and touch screen controller 2142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 2146. Display output for the touch sensitive display system 2146 can be generated by a display controller 2143. In one embodiment the display controller 2143 can provide frame data to the touch sensitive display system 2146 at a variable frame rate.

In one embodiment a sensor controller 2144 is included to monitor, control, and/or processes data received from one or more of the motion sensor 2110, light sensor 2112, proximity sensor 2114, or other sensors 2116. The sensor controller 2144 can include logic to interpret sensor data to determine the occurrence of one of more motion events or activities by analysis of the sensor data from the sensors.

In one embodiment the I/O subsystem 2140 includes other input controller(s) 2145 that can be coupled to other input/control devices 2148, such as one or more buttons, rocker switches, thumb-wheel, infrared port, USB port, and/or a pointer device such as a stylus, or control devices such as an up/down button for volume control of the speaker 2128 and/or the microphone 2130.

In one embodiment, the memory 2150 coupled to the memory interface 2102 can store instructions for an operating system 2152, including portable operating system interface (POSIX) compliant and non-compliant operating system or an embedded operating system. The operating system 2152 may include instructions for handling basic system services and for performing hardware dependent tasks. In some implementations, the operating system 2152 can be a kernel.

The memory 2150 can also store communication instructions 2154 to facilitate communicating with one or more additional devices, one or more computers and/or one or more servers, for example, to retrieve web resources from remote web servers. The memory 2150 can also include user interface instructions 2156, including graphical user interface instructions to facilitate graphic user interface processing.

Additionally, the memory 2150 can store sensor processing instructions 2158 to facilitate sensor-related processing and functions; telephony instructions 2160 to facilitate telephone-related processes and functions; messaging instructions 2162 to facilitate electronic-messaging related processes and functions; web browser instructions 2164 to facilitate web browsing-related processes and functions; media processing instructions 2166 to facilitate media processing-related processes and functions; location services instructions including GPS and/or navigation instructions 2168 and Wi-Fi based location instructions to facilitate location based functionality; camera instructions 2170 to facilitate camera-related processes and functions; and/or other software instructions 2172 to facilitate other processes and functions, e.g., security processes and functions, and processes and functions related to the systems. The memory 2150 may also store other software instructions such as web video instructions to facilitate web video-related processes and functions; and/or web shopping instructions to facilitate web shopping-related processes and functions. In some implementations, the media processing instructions 2166 are divided into audio processing instructions and video processing instructions to facilitate audio processing-related processes and functions and video processing-related processes and functions, respectively. A mobile equipment identifier, such as an International Mobile Equipment Identity (IMEI) 2174 or a similar hardware identifier can also be stored in memory 2150.

Each of the above identified instructions and applications can correspond to a set of instructions for performing one or more functions described above. These instructions need not be implemented as separate software programs, procedures, or modules. The memory 2150 can include additional instructions or fewer instructions. Furthermore, various functions may be implemented in hardware and/or in software, including in one or more signal processing and/or application specific integrated circuits.

Additional Exemplary Computing Systems

Figure 22:
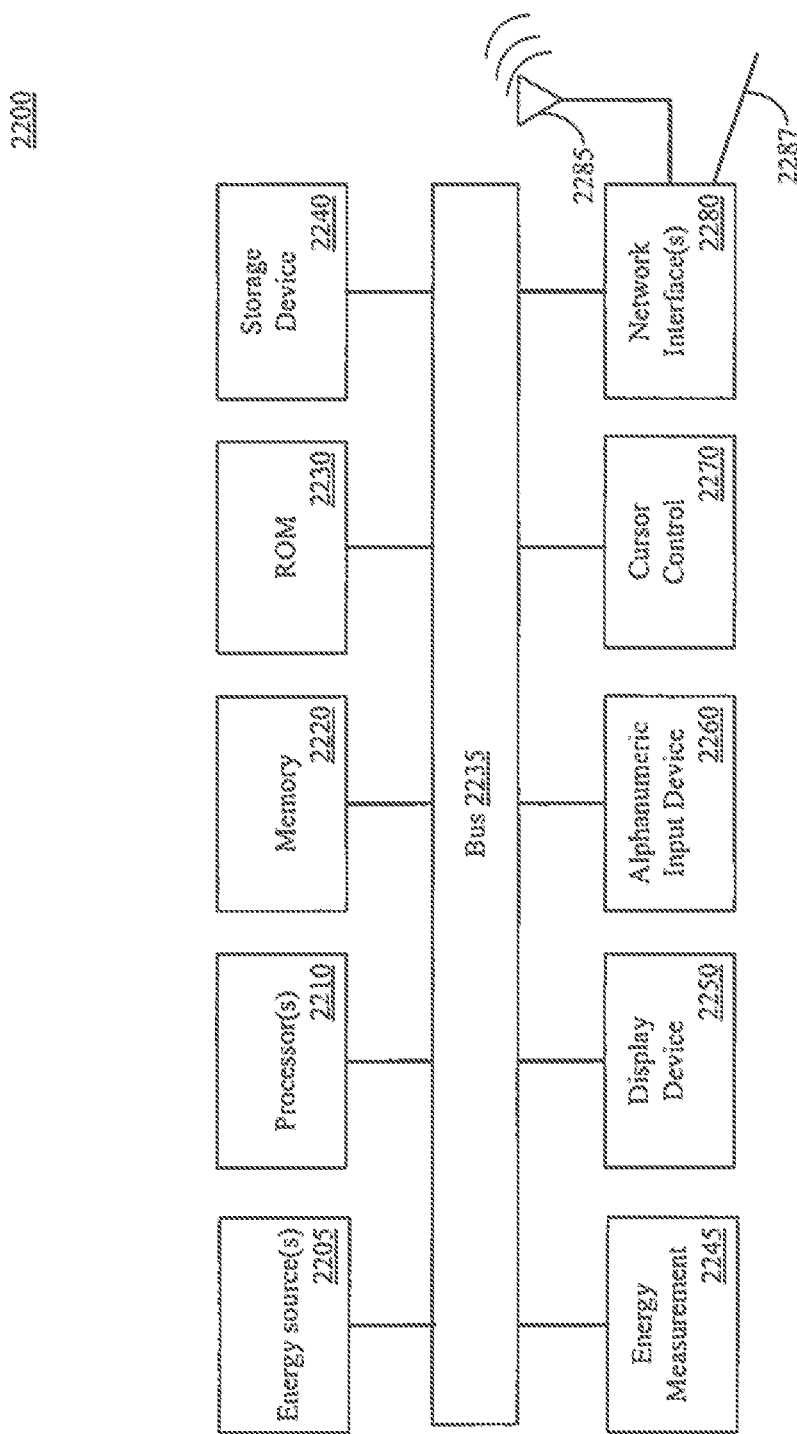
FIG. 22 is a block diagram of one embodiment of a computing system.

FIG. 22 is a block diagram of one embodiment of a computing system 2200. The computing system illustrated in FIG. 22 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 22 may be used to provide the computing device and/or the server device.

Computing system 2200 includes bus 2235 or other communication device to communicate information, and processor(s) 2210 coupled to bus 2235 that may process information.

While computing system 2200 is illustrated with a single processor, computing system 2200 may include multiple processors, including one or more co-processors. Computing system 2200 further may include main memory 2220 in the form of random access memory (RAM) or other dynamic storage device coupled to bus 2235 and may store information and instructions that may be executed by processor(s) 2210. Main memory 2220 may also be used to store temporary variables or other intermediate information during execution of instructions by processor(s) 2210.

Computing system 2200 may also include read only memory (ROM) 2230 and/or another data storage device 2240 coupled to bus 2235 that may store information and instructions for processor(s) 2210. Data storage device 2240 may be coupled to bus 2235 to store information and instructions. Data storage device 2240 such as flash memory or a magnetic disk or optical disc and corresponding drive may be coupled to computing system 2200.

Computing system 2200 may also be coupled via bus 2235 to display device 2250, such as a cathode ray tube (CRT), a liquid crystal display (LCD), or a light emitting diode (LED) display, to display information to a user. Computing system 2200 can also include an alphanumeric input device 2260, including alphanumeric and other keys, which may be coupled to bus 2235 to communicate information and command selections to processor(s) 2210. Another type of user input device is cursor control 2270, such as a touchpad, a mouse, a trackball, or cursor direction keys to communicate direction information and command selections to processor(s) 2210 and to control cursor movement on display device 2250. Computing system 2200 may also receive user input from a remote device that is communicatively coupled to computing system 2200 via one or more network interface(s) 2280.

Computing system 2200 further may include one or more network interface(s) 2280 to provide access to a network, such as a local area network. Network interface(s) 2280 may include, for example, a wireless network interface having antenna 2285, which may represent one or more antenna(e). Computing system 2200 can include multiple wireless network interfaces such as a combination of WiFi, Bluetooth®, near field communication (NFC), and/or cellular telephony interfaces. Network interface(s) 2280 may also include, for example, a wired network interface to communicate with remote devices via network cable 2287, which may be, for example, an Ethernet cable, a coaxial cable, a fiber optic cable, a serial cable, or a parallel cable.

In one embodiment, network interface(s) 2280 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 2280 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

Computing system 2200 can further include one or more energy sources 2205 and one or more energy measurement systems 2245. Energy sources 2205 can include an AC/DC adapter coupled to an external power source, one or more batteries, one or more charge storage devices, a USB charger, or other energy source. Energy measurement systems include at least one voltage or amperage measuring device that can measure energy consumed by the computing system 2200 during a predetermined period of time. Additionally, one or more energy measurement systems can be included that measure, e.g., energy consumed by a display device, cooling subsystem, WiFi subsystem, or other frequently used or high-energy consumption subsystem.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

APPENDIX

Sending and receiving messages

In one embodiment, for each new message (msg), a random key (msgKey) is generated and goes through the following operations:

1. Add padding (rand_pad) to rounded size, with a minimum size for small messages
   - De-correlate the size of ciphertexts for short messages ("yes"/"no").

2. Sign the data and group information with the sender iMessage signing key:
   sign_$d_{ms}i$(msg || groupBlobHash || ENID:v) || rand_pad)
   - signature authenticate sender (could be any one in the group otherwise)
   - full hash of the group blob which binds the message/signature to the group the message was sent to.

3. Authenticated-Encrypt with msgKey: authEncSym_msgKey(msg || rand_pad || sign_$d_{ms}i$(msg || groupBlobHash || ENID:v)))

4. Wrap (msgKey) with the group key (KG): wrapSym_KG(msgKey)

5. Compose the final message as:
   - BroadcastMessage = ENID:v || wrapSym_KG(msgKey) || authEncSym_msgKey(msg || H4($P_{ms}i$) || rand_pad || sign_$d_{ms}i$(msg || groupBlobHash || ENID:v))
     Send the final message to a messaging server. The server processes the list of recipients and breaks down (fan out) to each of the recipient devices:
   - Receive {U1, U2, U3, ENID:v, [GroupBlob], BroadcastMessage}
   - Transform and forward as
     {U1,U1, ENID:v, [GroupBlob], BroadcastMessage}
     {U1,U2, ENID:v, [GroupBlob], BroadcastMessage}
     {U1,U3, ENID:v, [GroupBlob], BroadcastMessage}
   - Store the message in a short term ("transport") zone (e.g. cloud storage 916) in each of the recipients storage.

6. Online recipients receive the message through a messaging server and attachments through a cloud storage system while offline recipients may only receive the message through the cloud storage system.

7. Periodically, aggregated messages are stored in one (or several) archive assets.

The server processes the list of recipients and breaks down (fan out) to each of the recipient devices:

1. Receive {U1, U2, U3, ENID:v, [GroupBlob], BroadcastMessage}
2. Transform and forward as:

{U1,U1, ENID:v, [GroupBlob], BroadcastMessage} {U1,U2, ENID:v, [GroupBlob], BroadcastMessage} {U1,U3, ENID:v, [GroupBlob], BroadcastMessage}

3. Store the message in a short-term zone in cloud storage in each of the recipients storage.

Message Lock Encryption for Server Side Re-Encryption

Assume this example uses an encryption method taking an input a message "m" and a recipient public key "Q". The decryption key is denoted "dq" and the key size is "n". The curve C is parametrized by a prime p, an order q and a generator point G. The encryption can be performed as follows:

1. Generate random r of t bits, with t>=256
2. Compute n+64 bit stream rm such as rm=PRF(r,M) with KDF a PRF
3. Compute an EC key pair {dk, Qk} such as dk = (rm mod (q-1))+1 and Qk = dk.G
4. Compute the shared secret Z = ECDH(dk, Q)
5. Compute the pair {Key, IV} = KDF(Z).
6. Authenticate and encrypt: C=Qk || AuthEncrypt(IV, Key, r || M)
7. Output C The receiver can recover and verify the encryption with the following:
1. Compute the shared secret Z = ECDH(dq, Qk)
2. Compute an pair {Key, IV} = KDF(Z).
3. Decrypt and Authenticate: r' || M = AuthDecrypt(IV, Key, C)
4. Verify the encryption:
   A. rm'=PRF(r',M)
   B. dk' = (rm' mod (q-1))+1 and Qk' = dk'.G
   C. Qk' == Qk?
5. Output message m.

Asset (e.g. Attachment) Processing and Re-Encryption

The transmission of an asset as a message attachment can proceed as follows:

1. Sender uploads the asset, referred to by a {ReferenceSignature,FileSignature} visible to the server and a secret AssetKey which allows recovery of the key material to decrypt the file; the ReferenceSignature can be a content address in storage 2. The message is used to transmit information (to the recipients) about the content uploaded by the sender:

a. AssetKey: necessary to decrypt the content of attachment b. FileSignature: to verify the integrity of the content and can be a cryptographic message authentication code c. URL: to access the content in the sender database without exposing the sender DSID 3. The receiver generates new key material based on a boundary key and issue a command re-encryption of the content.

a. ChunkList (each of the chunk signatures) are re-encrypted on the ContentServer b. CopySignature is computed on the ContentServer from the original file signature and a CopyKey derived key; the CopySignature can be a content address in storage for double encrypted content such as an attachment c. File Opaque Reference Data is re-encrypted at the vendor location; File Opaque Reference Data is metadata in storage associated with the asset and may include the chunk keys and the true size of each chunk and is encrypted by the AssetKey d. Chunks are re-encrypted at the vendor location

Key derivation

In order to prevent linking sender and receivers, while guaranteeing all devices the receiver derived an second level encryption based on the file information provided by the sender and his secret boundary key.

Inputs:

*Receiver: {boundary-key, <Additional API input - TBD>}*

*Sender: {SenderAssetKey,SenderFileSignature}*

Outputs:

*For Mover: {MoverCopyIV,MoverCopyKey}*

*For Content server: {SigCopyIV,SignatureCopyKey}*

Computations:

BKL4-1 = HKDF(boundary-key, label4)   // 32bytes output, see MMCS2.0. Label4 must be different from Label 1~3 already defined

```
BKL4-2 = HKDF(BKL4-1,SenderFileSignature,SenderAssetKey)

CopyKey= HKDF(BKL4-2,<Additional API input>) // 32bytes output

MoverCopyIV::MoverCopyKey=HKDF(CopyKey,"Mover")  // 40bytes
output

SigCopyIV::SignatureCopyKey=HKDF(CopyKey,"Signatures") //
40bytes output
```

AssetReference

On the sender side a record containing the asset will contain:

{PCSwrap(AssetKey), ReferenceSignature, FileSignature, ChunkList}

On the receiver side

{PCSwrap(AssetKey, CopyKey, FileSignature), CopySignature, EncryptedChunkList}

Provided 30404925 is achieved, the record can be implemented in a more compact form:

{PCSwrap(Data = {AssetKey, CopyKey}, AAD={CopySignature}), CopySignature, EncryptedChunkList}

Encryption

Chunk size must be $<2^{68}$ bytes.

Number of chunks must be $< 2^{64}$

The position of the index (left most half of the IV) is critical.

Encryption of the reference signature (Content server side)

```
Key = SignatureCopyKey

IV = (0xFFFFFFFFFFFFFFFF XOR SigCopyIV) << 64bit

CopySignature = AES256-CTR(IV, Key, SenderFileSignature)
```

Encryption of the signatures (Content server side)

```
Key = SignatureCopyKey

Index = 1

For all chunks in chunk list

IV = (index++ XOR SigCopyIV) << 64bit

If previous occurrence in the chunk list: Copy ciphertext
        of first occurrence
```

```
Else: AES256-CTR(IV, Key, data)
```

Decryption of the signatures (Client side)

```
Key = SignatureCopyKey
```

Index = 1

```
For all chunks in chunk list

IV = (index++ XOR SigCopyIV) << 64bit

If previous occurrence in the chunk list: Copy the
    corresponding plaintext

Else: AES256-CTR(IV, Key, data)
```

Encryption of the FORD (Mover server side)

```
Key = MoverCopyKey

IV = (0xFFFFFFFFFFFFFFFF XOR MoverCopyIV) << 64bit

EncryptedFORD = AES256-CTR(IV, Key, FORD)
```

Encryption of the chunk data (Mover server side)

```
Key = MoverCopyKey

Index = 1

For all chunks in chunk list

IV = (index++ XOR MoverCopyIV) << 64bit

AES256-CTR(IV, Key, data)
```

Decryption of the chunk data (Client side)

```
Key = MoverCopyKey

Index = 1

For all chunks in chunk list

IV = (index++ XOR MoverCopyIV) << 64bit

AES256-CTR(IV, Key, data)
```

Exemplary Detailed Reference Creation

In the following exemplary reference creation described below, "F" denotes a reference to an asset that is being sent as a message attachment. The reference can be a universal resource locator (URL) or another reference to the asset that can be stored in a user database. The reference is created as part of the upload of the asset. A link to the asset is sent to the recipient. Software on the recipient can automatically retrieve the asset via the link and present the asset to the recipient as an attachment. The keys within the creation information enable an authorized account to decrypt a retrieved asset.

Creation info: {

F, MAC_AssetKeyF(Asset), PrivacyKeyF[SEP]SigCU=Sig_PrivKeyUser(F || MAC_AssetKeyF(AssetF) || "Creation" || DSID || PrivacyKeyF || PubKeyZone), E_PubKeyZone(AssetKeyF, MAC_AssetKeyF(AssetF))

} where:

> user identity (*DSID*) and PubKeyZone in SigCU is used to tie the content to account so that the signature would be invalid if moved out of context (different cloud storage zone, or user account).
>
> *PrivacyKeyF* in SigCU is to prevent the creation of verification oracle based on the stored record information.

Stored record: recordF={

E_PubKeyZone(F,PrivacyKeyF,SigCU)), [SEP]E_PubKeyZone(AssetKeyF, MAC_AssetKeyF(AssetF)),[SEP]SigCU[SEP]}

Computing, storing the record and increasing the reference count for the asset is an atomic operation.

Exemplary Detailed Access Request

A user can request access to read or delete an asset by presenting a key "PrivacyKeyF" along with a valid signature with a timestamp that is verifiable by the server with "PubKeyF." PrivacyKeyF protects the privacy of user by preventing the creation of a cryptographic oracle (can more detail be provided on this aspect)?

Cmd info: {recordID,

F, MAC_AssetKeyF(Asset), PrivacyKeyF[SEP]CurrentTimeStamp, <cmd>[SEP]SigCF=Sig(F || MAC_AssetKeyF(Asset) || <cmd> || DSID || PubKeyZone || CurrentTimeStamp), PrivacyKeyF}

Upon successful verification of both SigCF and SigCU, the server can give access to the record.

In the case of deletion, decreasing the counter and deleting the record is performed as an atomic operation, otherwise there is a possibility that the reference count for an asset can become incorrect.

SigCF guarantees that interception of a read command cannot be replayed for other read commands or to enable deletion of the asset.

SigCU guarantees that the "F" requested by the user matches the created record and allows the client to verify that the data that is returned to the client is the actual data, rather than data that has been planted by an adversary.

What is claimed is:

1. A non-transitory machine-readable medium storing executable program instructions which when executed by a data processing system cause the data processing system to perform a method of sending a message via an online messaging system, the method comprising:
    receiving an encrypted message received from a sending device, the encrypted message including a first identity associated with a sender and a second identity associated with the sender and one or more receivers of the message;
    verifying the first identity of the sender of the encrypted message;
    sending the encrypted message to each of the one or more receivers, wherein sending the encrypted message to each of the one or more receivers includes:
        determining a network status of each of plurality of a devices associated with a receiver,
        in accordance with a determination that the network status of a first device of the plurality of devices is online, sending the encrypted message to the first device,
        in accordance with a determination that the network status of a second device of the plurality of devices is offline:
            generating an anonymized encrypted message by encrypting data at least including the encrypted message, and
            storing the anonymized encrypted message on cloud storage.

2. The medium as in claim 1 wherein the sending device encrypts the second identity associated with the sender and the one or more receivers using a different key than a key used to encrypt the content of the encrypted message, the sending device sends the encrypted message to a server system, the encrypted message content remains encrypted while on the server system, and the server system sends the encrypted message to each device of the plurality of devices of the one or more receivers that are online at the time that the encrypted message is sent.

3. The medium as in claim 2 wherein the server system fans out sending of the encrypted message by sending the encrypted message separately to each device of the plurality of devices of the one or more receivers that are online.

4. The medium as in claim 3 wherein the server system comprises a cluster of servers that distributes the sending of the encrypted message to each device of the plurality of devices of the one or more receivers that are online.

5. The medium as in claim 1 wherein the anonymized encrypted message is stored for a limited period of time and then deleted.

6. The medium as in claim 1 wherein a single copy of the anonymized encrypted message is stored on the cloud storage, and the sender or the one or more receivers access the anonymized encrypted message by presenting user credentials that are verified before permitting access to the anonymized encrypted message.

7. The medium as in claim 1 wherein the anonymized encrypted message is generated by encrypting data at least including the encrypted message using one or more keys derived from key material associated with the receiver associated with the second device, and the method further comprises:
    determining that the second device network status is online;
    retrieving the anonymized encrypted message from cloud storage;
    forwarding the anonymized encrypted message to a cloud storage associated with the receiver associated with the second device.

8. The medium as in claim 1, further comprising:
    for each one of the sender and the one or more receivers:
        re-encrypting the encrypted message, and
        storing the re-encrypted message on cloud storage associated with the one of the sender and the one or more receivers;
    wherein the re-encrypting uses a different public key to re-encrypt the same encrypted message to obtain different results for the same encrypted message for each of the sender and the one or more receivers.

9. The medium as in claim 8 wherein the encrypted message includes a set of group data that includes information used by devices in a conversation to create one or more group keys.

10. The medium as in claim 9 wherein the encrypted message includes a group identifier for use in recovering or changing the set of group data.

11. A method of sending a message via an online messaging system, the method comprising:
    receiving an encrypted message received from a sending device, the encrypted message including a first identity associated with a sender and a second identity associated with the sender and one or more receivers of the message;
    verifying the first identity of the sender of the encrypted message;
    sending the encrypted message to each of the one or more receivers, wherein sending the encrypted message to each of the one or more receivers includes:
        determining a network status of each of a plurality of devices associated with a receiver,
        in accordance with a determination that the network status of a first device of the plurality of devices is online, sending the encrypted message to the first device,
        in accordance with a determination that the network status of a second device of the plurality of devices of the receiver is offline:
            generating an anonymized encrypted message by encrypting data at least including the encrypted message, and
            storing an-the anonymized encrypted message on cloud storage.

12. The method as in claim 11 wherein the sending device encrypts the second identity associated with the sender and the one or more receivers using a different key than a key used to encrypt the content of the encrypted message, the sending device sends the encrypted message to a server system, the encrypted message content remains encrypted while on the server system, and the server system sends the encrypted message to each device of the plurality of device of the one or more receivers that are online at the time that the encrypted message is sent.

13. The method as in claim 12 wherein the server system fans out sending of the encrypted message by sending the encrypted message separately to each device of the plurality of devices of the one or more receivers that are online.

14. The method as in claim 13 wherein the server system comprises a cluster of servers that distributes the sending of the encrypted message to each device of the plurality of devices of the one or more receivers that are online.

15. The method as in claim 11 wherein the anonymized encrypted message is stored for a limited period of time and then deleted.

16. The method as in claim 11 wherein a single copy of the anonymized encrypted message is stored on the cloud storage, and the sender or the one or more receivers access the anonymized encrypted message by presenting user credentials that are verified before permitting access to the anonymized encrypted message.

17. The method as in claim 11 wherein the anonymized encrypted message is generated by encrypting data at least including the encrypted message using one or more keys derived from key material associated with the receiver associated with the second device, the method further comprising:
- determining that the second device network status is online;
- retrieving the anonymized encrypted message from cloud storage; and
- forwarding the anonymized encrypted message to a cloud storage associated with the receiver associated with the second device.

18. The method as in claim 11, further comprising:
for each one of the sender and the one or more receivers:
- re-encrypting the encrypted message, and
- storing the re-encrypted message on cloud storage associated with the one of the sender or the one or more receivers;

wherein the re-encrypting uses a different public key to re-encrypt the same encrypted message to obtain different results for the same encrypted message for each of the sender and the one or more receivers.

19. The method as in claim 18 wherein the encrypted message includes a set of group data that includes information used by devices in a conversation to create one or more group keys.

20. The method as in claim 19 wherein the encrypted message includes a group identifier for use in recovering or changing the set of group data.

* * * * *